United States Patent
Doyle et al.

(10) Patent No.: US 11,222,313 B2
(45) Date of Patent: *Jan. 11, 2022

(54) SYSTEM AND METHOD FOR MANAGING FINANCIAL TRANSACTIONS BASED ON ELECTRONIC CHECK DATA

(71) Applicant: DELUXE SMALL BUSINESS SALES, INC., Shoreview, MN (US)

(72) Inventors: Paul F. Doyle, Ada, MI (US); Dean Tribble, Bellevue, WA (US)

(73) Assignee: Deluxe Small Business Sales, Inc., Shoreview, MN (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/822,970

(22) Filed: Mar. 18, 2020

(65) Prior Publication Data

US 2020/0279231 A1 Sep. 3, 2020

Related U.S. Application Data

(63) Continuation-in-part of application No. 15/837,207, filed on Dec. 11, 2017, which is a continuation of
(Continued)

(51) Int. Cl.
| | |
|---|---|
| *G06Q 20/02* | (2012.01) |
| *G06Q 20/10* | (2012.01) |
| *G06Q 40/00* | (2012.01) |

(52) U.S. Cl.
CPC ........... *G06Q 20/02* (2013.01); *G06Q 20/108* (2013.01); *G06Q 40/00* (2013.01)

(58) Field of Classification Search
CPC .......................... G06Q 20/02; G06Q 20/108
(Continued)

(56) References Cited

U.S. PATENT DOCUMENTS 5,673,320 A   9/1997  Ray et al.
5,677,955 A * 10/1997  Doggett ................. G06Q 20/02
                                                        235/379
(Continued)

FOREIGN PATENT DOCUMENTS

CN    101051372 A    10/2007
EP    2250617        11/2010
(Continued)

OTHER PUBLICATIONS

"U.S. Appl. No. 15/837,207, Final Office Action dated Apr. 15, 2020", 15 pgs.
(Continued)

*Primary Examiner* — Robert R Niquette
(74) *Attorney, Agent, or Firm* — Stinson LLP

(57) ABSTRACT

A system and method of transmitting a check-type payment between a payor and a payee using a third-party service includes registering a payor, receiving a check-type payment request from the payor by the third-party service, generating a unique identifier for the check-type payment request and associating payment information with the unique identifier, transmitting a payment notice to the payee, receiving a deposit request to a deposit account from the payee by the third-party, generating a depositable item responsive to the deposit request, and depositing the depositable item into the deposit account by the third-party service.

16 Claims, 62 Drawing Sheets

Related U.S. Application Data application No. 14/561,458, filed on Dec. 5, 2014, now Pat. No. 9,852,406, which is a continuation-in-part of application No. 13/351,919, filed on Jan. 17, 2012, now Pat. No. 9,613,343, application No. 16/822,970, which is a continuation-in-part of application No. 15/450,471, filed on Mar. 6, 2017, now abandoned, which is a continuation of application No. 13/351,919, application No. 16/822,970, which is a continuation-in-part of application No. 16/529,238, filed on Aug. 1, 2019, now abandoned, which is a continuation of application No. 12/351,551, filed on Jan. 9, 2009, now Pat. No. 10,410,214.

(60) Provisional application No. 61/912,440, filed on Dec. 5, 2013, provisional application No. 61/432,995, filed on Jan. 14, 2011, provisional application No. 61/020,420, filed on Jan. 11, 2008.

(58) Field of Classification Search
USPC .................................................. 705/35–45
See application file for complete search history.

(56) References Cited

U.S. PATENT DOCUMENTS

| | | | |
|---|---|---|---|
| 5,884,271 A | 3/1999 | Pitroda | |
| 5,884,288 A * | 3/1999 | Chang | G06Q 20/0425 705/40 |
| 5,920,847 A * | 7/1999 | Kolling | G06Q 20/023 705/40 |
| 6,170,744 B1 | 1/2001 | Lee et al. | |
| 6,185,545 B1 * | 2/2001 | Resnick | G06Q 20/204 705/40 |
| 6,233,340 B1 | 5/2001 | Sandru | |
| 6,381,696 B1 | 4/2002 | Doyle | |
| 6,611,598 B1 | 8/2003 | Hayosh | |
| 7,017,046 B2 | 3/2006 | Doyle | |
| 7,047,415 B2 | 5/2006 | Doyle et al. | |
| 7,113,925 B2 | 9/2006 | Waserstein et al. | |
| 7,566,002 B2 | 7/2009 | Love et al. | |
| 7,792,748 B1 | 9/2010 | Ebersole et al. | |
| 8,010,424 B1 * | 8/2011 | Hamilton | G06Q 20/4016 705/35 |
| 8,315,929 B2 * | 11/2012 | Allen-Rouman | G06Q 40/02 705/35 |
| 9,613,343 B2 | 4/2017 | Doyle et al. | |
| 9,852,406 B2 | 12/2017 | Doyle et al. | |
| 10,410,214 B2 | 9/2019 | Doyle | |
| 2001/0037318 A1 * | 11/2001 | Lindskog | G06Q 20/401 705/78 |
| 2001/0044764 A1 | 11/2001 | Thomas | |
| 2002/0113122 A1 | 8/2002 | Brikho | |
| 2003/0084001 A1 * | 5/2003 | Chang | G06Q 20/0855 705/64 |
| 2004/0001568 A1 | 1/2004 | Impson et al. | |
| 2004/0128513 A1 | 7/2004 | Wu et al. | |
| 2005/0033685 A1 * | 2/2005 | Reyes | G06Q 20/04 705/39 |
| 2005/0222954 A1 * | 10/2005 | Keown | G06Q 20/02 705/40 |
| 2006/0112013 A1 | 5/2006 | Maloney | |
| 2006/0161501 A1 | 7/2006 | Waserstein et al. | |
| 2007/0088953 A1 | 4/2007 | Hilton et al. | |
| 2007/0112674 A1 | 5/2007 | Jones | |
| 2007/0156438 A1 | 7/2007 | Popadic et al. | |
| 2007/0170265 A1 | 7/2007 | Sinclair et al. | |
| 2007/0185822 A1 * | 8/2007 | Kaveti | G06Q 20/04 705/78 |
| 2007/0271183 A1 | 11/2007 | Foth | |
| 2007/0288518 A1 | 12/2007 | Crigler et al. | |
| 2008/0086421 A1 | 4/2008 | Gilder | |
| 2008/0249951 A1 * | 10/2008 | Gilder | G06Q 20/04 705/76 |
| 2008/0270304 A1 | 10/2008 | Brown | |
| 2008/0319874 A1 | 12/2008 | Levchin et al. | |
| 2009/0182672 A1 | 7/2009 | Doyle | |
| 2009/0210342 A9 | 8/2009 | Wilson | |
| 2009/0248555 A1 * | 10/2009 | Sada | G06Q 40/025 705/34 |
| 2009/0261158 A1 | 10/2009 | Lawson | |
| 2009/0319427 A1 * | 12/2009 | Gardner | G06Q 40/00 705/44 |
| 2010/0019873 A1 | 1/2010 | Mueller et al. | |
| 2010/0161466 A1 | 6/2010 | Gilder | |
| 2010/0198733 A1 | 8/2010 | Gantman et al. | |
| 2011/0264558 A1 * | 10/2011 | Alexandrou | G06Q 20/02 705/26.41 |
| 2012/0024946 A1 | 2/2012 | Tullis et al. | |
| 2012/0185387 A1 | 7/2012 | Doyle | |
| 2012/0310782 A1 * | 12/2012 | Konakanchi | G06Q 10/083 705/26.81 |
| 2013/0013456 A1 | 1/2013 | Boesch | |
| 2013/0060679 A1 * | 3/2013 | Oskolkov | G06Q 20/223 705/39 |
| 2015/0088740 A1 | 3/2015 | Doyle et al. | |
| 2016/0071088 A1 | 3/2016 | Chowdhury et al. | |
| 2017/0243174 A1 | 8/2017 | Doyle et al. | |
| 2018/0240081 A1 | 8/2018 | Doyle et al. | |
| 2020/0134619 A1 | 4/2020 | Doyle | |

FOREIGN PATENT DOCUMENTS

| | | |
|---|---|---|
| EP | 2663959 A2 | 11/2013 |
| IN | 49/2013 | 12/2013 |
| JP | 11503541 A | 3/1999 |
| JP | 2000113089 A | 4/2000 |
| JP | 2002245248 A | 8/2002 |
| JP | 2004005515 A | 1/2004 |
| JP | 2006268636 A | 10/2006 |
| JP | 2014502770 | 2/2014 |
| KR | 1020040063988 A | 7/2004 |
| TW | 200411596 A | 7/2004 |
| WO | WO-2010091184 A1 | 8/2010 |
| WO | WO-2010141501 A2 | 12/2010 |

OTHER PUBLICATIONS

"2014 Interim Guidance on Patent Subject Matter Eligibility", 79 Fed. Reg. 241 (Dec. 16, 2014), p. 74621-74624.
"U.S. Appl. No. 12/351,551, Appeal Brief filed Apr. 17, 2014", 25 pgs.
"U.S. Appl. No. 12/351,551, Decision on Pre-Appeal Brief Request mailed Mar. 19, 2014", 2 pgs.
"U.S. Appl. No. 12/351,551, Examiner Interview Summary dated Jul. 11, 2016", 3 pgs.
"U.S. Appl. No. 12/351,551, Final Office Action dated Jan. 24, 2012", 15 pgs.
"U.S. Appl. No. 12/351,551, Final Office Action dated Feb. 11, 2016", 40 pgs.
"U.S. Appl. No. 12/351,551, Final Office Action dated Aug. 18, 2017", 49 pgs.
"U.S. Appl. No. 12/351,551, Final Office Action dated Oct. 4, 2013", 15 pgs.
"U.S. Appl. No. 12/351,551, Final Office Action dated Oct. 9, 2018", 30 pgs.
"U.S. Appl. No. 12/351,551, Non Final Office Action dated Mar. 14, 2018", 48 pgs.
"U.S. Appl. No. 12/351,551, Non Final Office Action dated May 16, 2011", 15 pgs.
"U.S. Appl. No. 12/351,551, Non Final Office Action dated Jun. 11, 2015", 26 pgs.
"U.S. Appl. No. 12/351,551, Non Final Office Action dated Aug. 3, 2012", 14 pgs.
"U.S. Appl. No. 12/351,551, Non Final Office Action dated Dec. 8, 2016", 43 pgs.
"U.S. Appl. No. 12/351,551, Notice of Allowance dated Apr. 26, 2019", 19 pgs.

(56) References Cited

OTHER PUBLICATIONS

"U.S. Appl. No. 12/351,551, Pre-Appeal Brief Request filed Jan. 3, 2014", 7 pgs.
"U.S. Appl. No. 12/351,551, Response filed Jan. 18, 2018 to Final Office Action dated Aug. 18, 2017", 19 pgs.
"U.S. Appl. No. 12/351,551, Response filed Feb. 4, 2013 to Non Final Office Action dated Aug. 3, 2012", 20 pgs.
"U.S. Appl. No. 12/351,551, Response filed Mar. 11, 2019 to Final Office Action dated Oct. 9, 2018", 16 pgs.
"U.S. Appl. No. 12/351,551, Response filed Jun. 8, 2017 to Non Final Office Action dated Dec. 8, 2016", 20 pgs.
"U.S. Appl. No. 12/351,551, Response filed Jun. 25, 2012 to Final Office Action dated Jan. 24, 2012", 17 pgs.
"U.S. Appl. No. 12/351,551, Response filed Aug. 14, 2018 to Non Final Office Action dated Mar. 14, 2018", 21 pgs.
"U.S. Appl. No. 12/351,551, Response filed Oct. 17, 2011 to Non Final Office Action dated May 16, 2011", 8 pgs.
"U.S. Appl. No. 12/351,551, Response filed Dec. 9, 2015 to Non-Final Office Action dated Jun. 11, 2015", 16 pgs.
"U.S. Appl. No. 13/351,919, Response filed Mar. 27, 2014 to Final Office Action dated Jan. 27, 2014", 21 pgs.
"U.S. Appl. No. 13/351,919, Advisory Action dated Jul. 31, 2014", 7 pgs.
"U.S. Appl. No. 13/351,919, Final Office Action dated Jan. 27, 2014", 34 pgs.
"U.S. Appl. No. 13/351,919, Final Office Action dated Jun. 17, 2016", 8 pgs.
"U.S. Appl. No. 13/351,919, Non Final Office Action dated Feb. 14, 2013", 20 pgs.
"U.S. Appl. No. 13/351,919, Non Final Office Action dated Oct. 23, 2015", 29 pgs.
"U.S. Appl. No. 13/351,919, Notice of Allowance dated Nov. 18, 2016", 10 pgs.
"U.S. Appl. No. 13/351,919, Response filed Apr. 25, 2016 to Non-Final Office Action dated Oct. 23, 2016", 12 pgs.
"U.S. Appl. No. 13/351,919, Response filed Aug. 13, 2013 to Non Final Office Action dated Feb. 14, 2013", 17 pgs.
"U.S. Appl. No. 13/351,919, Response filed Oct. 17, 2016 to Final Office Action dated Jun. 17, 2016", 14 pgs.
"U.S. Appl. No. 14/561,458, Examiner Interview Summary dated Feb. 11, 2016", 3 pgs.
"U.S. Appl. No. 14/561,458, Examiner Interview Summary dated Jul. 21, 2017", 3 pgs.
"U.S. Appl. No. 14/561,458, Final Office Action dated Nov. 9, 2015", 18 pgs.
"U.S. Appl. No. 14/561,458, Non Final Office Action dated Apr. 21, 2017", 10 pgs.
"U.S. Appl. No. 14/561,458, Non Final Office Action dated Jun. 23, 2015", 17 pgs.
"U.S. Appl. No. 14/561,458, Notice of Allowance dated Aug. 16, 2017", 8 pgs.
"U.S. Appl. No. 14/561,458, Response filed Jul. 21, 2017 to Non Final Office Action dated Apr. 21, 2017", 9 pgs.
"U.S. Appl. No. 14/561,458, Response filed Oct. 23, 2015 to Non-Final Office Action dated Jun. 23, 2015", 11 pgs.
"U.S. Appl. No. 15/450,471, Final Office Action dated Dec. 2, 2019", 27 pgs.
"U.S. Appl. No. 15/450,471, Non Final Office Action dated May 17, 2019", 24 pgs.
"U.S. Appl. No. 15/450,471, Response filed Nov. 18, 2019 to Non-Final Office Action dated May 17, 2019", 9 pgs.
"U.S. Appl. No. 15/837,207, Non Final Office Action dated Oct. 18, 2019", 25 pgs.
"U.S. Appl. No. 15/837,207, Response filed Mar. 18, 2020 to Non Final Office Action dated Oct. 18, 2019", 8 pgs.
"U.S. Appl. No. 12/351,551, Response filed Aug. 11, 2016 to Final Office Action dated Feb. 11, 2016", 14 pgs.
"U.S. Appl. No. 13/351,919, Examiner Interview Summary dated Sep. 16, 2016", 3 pgs.
"U.S. Appl. No. 14/561,458, Response filed Apr. 6, 2016 to Final Office Action dated Nov. 9, 2015", 11 pgs.
"Canadian Application Serial No. 2,824,841, Office Action dated Jun. 13, 2019", 7 pgs.
"Canadian Application Serial No. 2,824,841, Office Action dated Jul. 3, 2018", 8 pgs.
"Canadian Application Serial No. 2,824,841, Office Action dated Jul. 20, 2017", 5 pgs.
"Canadian Application Serial No. 2,824,841, Response Filed Jan. 3, 2019 to Office Action dated Jul. 3, 2018", 13 pgs.
"Canadian Application Serial No. 2,824,841, Response filed Jan. 20, 2018 to Office Action dated Jul. 20, 2017", w/ English Claims, 8 pgs.
"Chinese Application Serial No. 201280013080.3, Office Action dated Dec. 21, 2015", w/ English Translation, 19 pgs.
"Compositing", Dictionary of International Business Terms, (2000), 2 pgs.
"Compositing", Webster's Dictionary© 2000, (2000), 1 pg.
"European Application Serial No. 09701458.3, Extended European Search Report dated Aug. 21, 2012", 4 pgs.
"European Application Serial No. 09701458.3, Response filed Mar. 15, 2013 to Extended European Search Report dated Aug. 21, 2012", 9 pgs.
"International Application Serial No. PCT/US2009/030627, International Preliminary Report on Patentability dated Jul. 22, 2010", 6 pgs.
"International Application Serial No. PCT/US2009/030627, International Search Report dated Jul. 27, 2009", 3 pgs.
"International Application Serial No. PCT/US2009/030627, Written Opinion dated Jul. 27, 2009", 4 pgs.
"Japanese Application Serial No. 2013-549610, Notice of Reason for Refusal dated Nov. 5, 2015", With English translation, 5 pgs.
"Maker", Dictionary entries, 3 pgs.
"Md5Checker", [Online] Retrieved from the internet: <http://getmd5checker.com/>, (Oct. 24, 2019).
Et al., "Methven & Associates", California Business, Contract, Securities, Estate and Probate Law, Retrieved From Internet:<http://www.methvenlaw.com>, (Accessed Apr. 19, 2016), 4 pgs.
"Methven and Associates", (Accessed Feb. 8, 2013), 3 pgs.
"Statement in Accordance With the Notice From the European Patent Office Dated Oct. 1, 2007 Concerning Business Methods", Epc / Erklaerung Gemaess Der Mitteilung Des Europaeischen Patentamts Vom 1.Oct. 2007 Ueber Geschaeftsmethoden—Epu / Declaration Conformement Au Communique De L'office Europ, (Nov. 1, 2007), 592-593.
"Time Stamp—Proofspace.com", [Online] retrieved from the internet: <http://www.proofspace.com/technology/timestamping.php>, (Jan. 15, 2009), 2 pgs.

\* cited by examiner

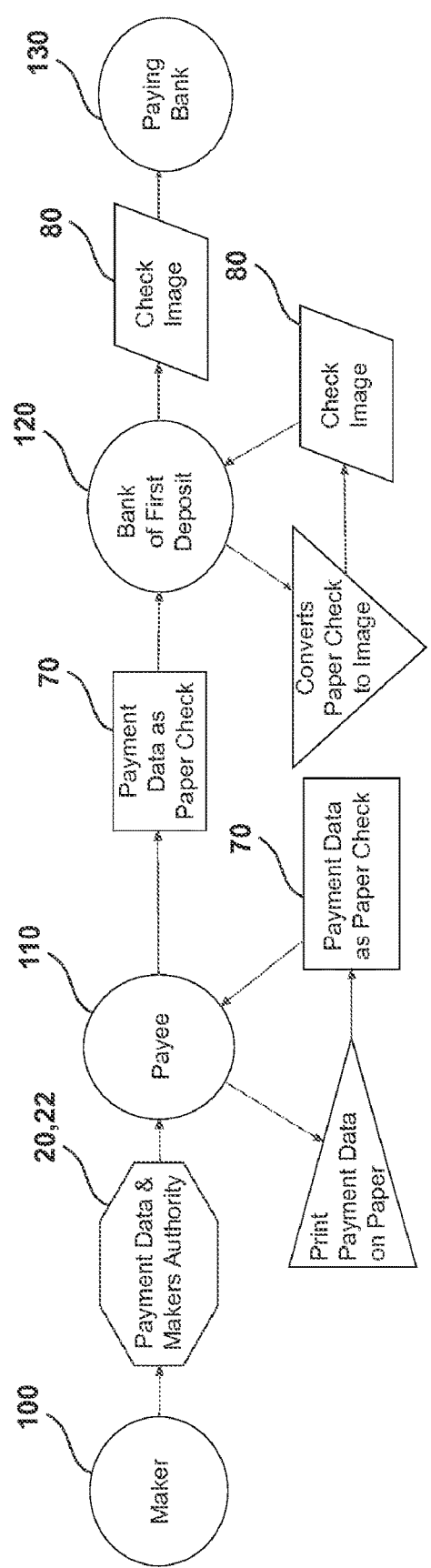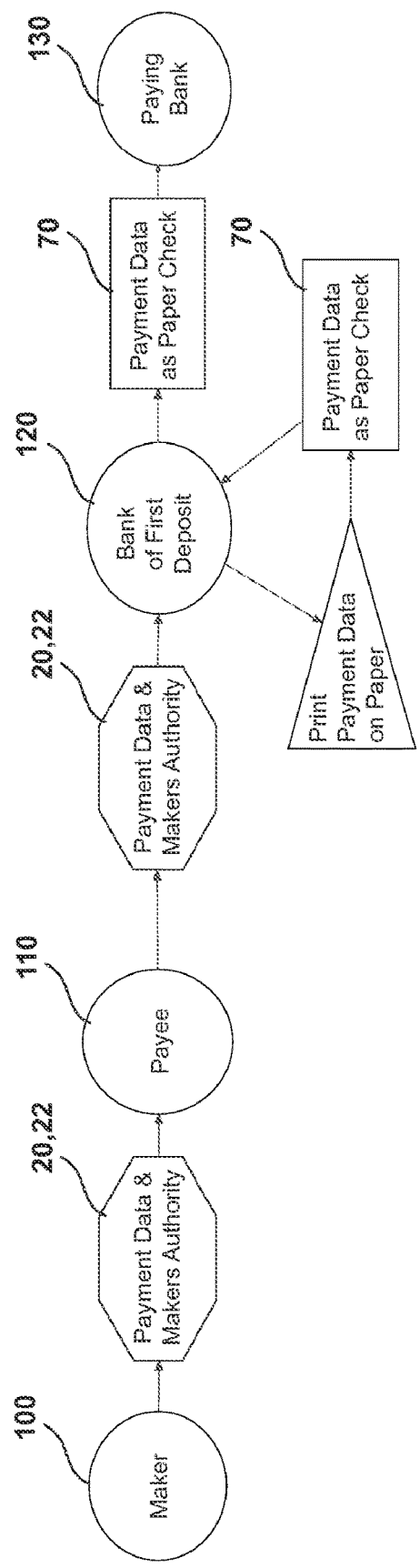
FIG. 3
FIG. 4

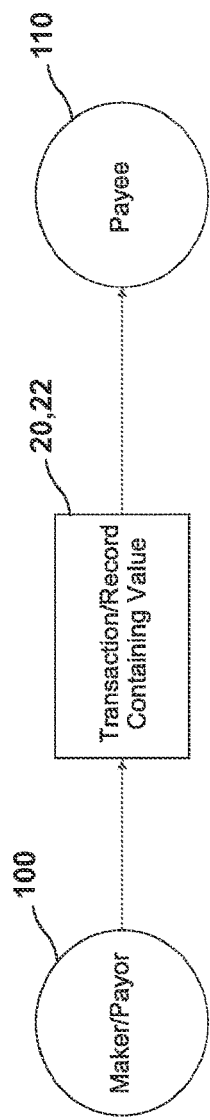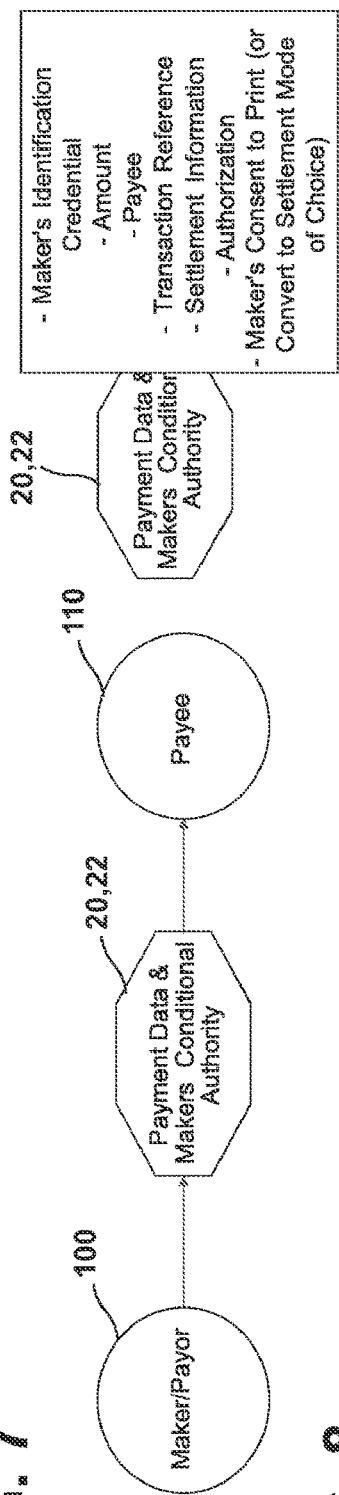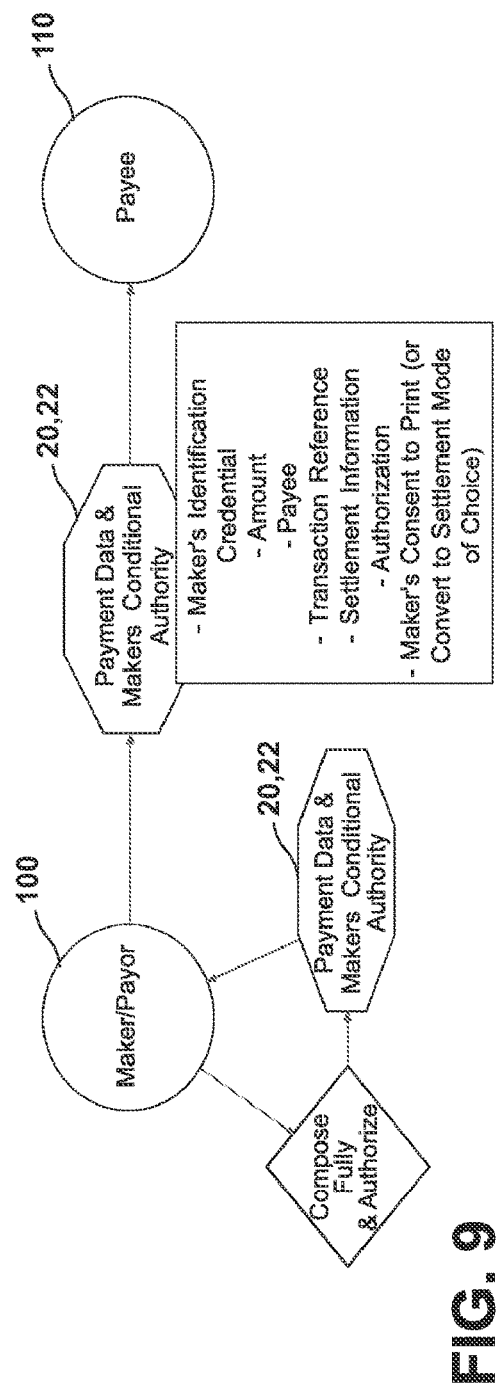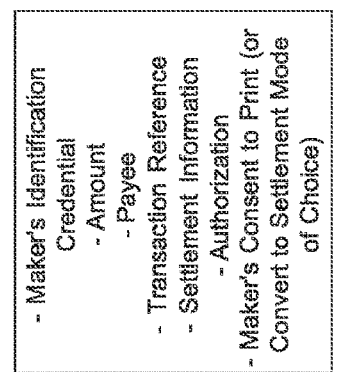
FIG. 7
FIG. 8
FIG. 9

| Remittance Fields | Columns From Upload |
|---|---|
| Memo | Memo |
| Invoice Number | G01138195 |
| Invoice Data | 48905 |
| Description | 2/09/2012 |
| Subtotal | 400 |
| N/A | do not import |
| N/A | do not import |
| N/A | do not import |

830

☑ Automatically Email Checks  All imported checks with an email will be delivered upon signing.

[Cancel]  [Create Checks]

840    842    844

VerifyValid

892 → New Import

VerifyValid | Checking Accounts | Lockbox | Verify Check

Single Check | Check Run | Check Import | Account Activity | Transactions

John Doe Profile | Logout

Settings ▼

Import Processing - Creating Checks

[View Import History]

| 1 | 2 | 3 | 4 | 5 |
|---|---|---|---|---|
| Upload File | Review & Mapping | Review Checks | Complete Payment | Finished |

Summary

| STATISTICS | VALUE |
|---|---|
| Starting Check Number | A0214657 |
| Ending Check Number | A0214661 |
| Number of Checks | 2 |
| Amount Total | $2,158.00 |
| Number of Errors | 0 |
| Number of Checks to be emailed | 0 |

Checks We Created

| DATE | REGISTERED AT | CHECK NUMBER | PAYEE NAME | PAYEE EMAIL | AMOUNT | REGISTERED | ISSUER |
|---|---|---|---|---|---|---|---|
| 07/12/2013 05:55 PM | 07/12/2013 05:56 PM | A0214661 | Company LLC | email@gmail.com | $1,758.00 | Y | John Doe |
| 07/12/2013 05:55 PM | 07/12/2013 05:56 PM | A0214657 | Jane Public | email@gmail.com | $400.00 | Y | John Doe |

VerifyValid

900 — VerifyValid — http://www.verifyvalid.com/ — John Doe Profile | Logout

VerifyValid | Checking Accounts | Lockbox | Verify Check | Transactions | Settings ▼

Single Check   Check Run   Check Import   Account Activity

Check#: A0214661
ZZ Test 3A

902 — Check Review Screen

John Doe
123 Easy Street
Any City, State 12345

A0214661
Date 7/012/2013

PAY TO THE ORDER OF   Company LLC     $1758.00

One thousand, seven hundred and fifty-eight and 00/100 _____ DOLLARS

Mythical Bank

Memo  G00696940                  *John Doe*

⑆012345⑆  ⑈123456789⑈  5555555555⑆

⊕ New Check
🖨 Print Check
⊘ Void Check
✉ Send PDF via email

Remittance

904 →

| MEMO | INVOICE NUMBER | INVOICE DATE | DESCRIPTION | SUBTOTAL |
|---|---|---|---|---|
| G00696940 | 11-R2102 | 08/23/2011 | Subscription | 475 |
| G00696940 | 11-R2117 | 08/23/2011 | Services | 1283 |

Recent Activity
Friday, July 12, 2013 at 5:56 PM - John Doe signed this check

VerifyValid

SYSTEM AND METHOD FOR MANAGING FINANCIAL TRANSACTIONS BASED ON ELECTRONIC CHECK DATA

CROSS-REFERENCE TO RELATED APPLICATIONS

This application is a continuation-in-part of U.S. patent application Ser. No. 15/837,207, filed Dec. 11, 2017, which is a continuation of U.S. patent application Ser. No. 14/561,458, filed Dec. 5, 2014, which claims the benefit of priority to U.S. Provisional Patent Application No. 61/912,440, filed Dec. 5, 2013, and which is a continuation-in-part of U.S. patent application Ser. No. 13/351,919, filed Jan. 17, 2012, all of which are incorporated herein by reference in their entirety.

This application is also a continuation-in-part of U.S. patent application Ser. No. 15/450,471, filed Mar. 6, 2017, which is a continuation of U.S. patent application Ser. No. 13/351,919, filed Jan. 17, 2012, which claims the benefit of U.S. Provisional Patent Application No. 61/432,995, filed Jan. 14, 2011, all of which are incorporated herein by reference in their entirety.

This application is also a continuation-in-part of U.S. patent application Ser. No. 16/529,238, filed Aug. 1, 2019, which is a continuation of U.S. patent application Ser. No. 12/351,551, filed Jan. 9, 2009, which claims the benefit of U.S. Provisional Application No. 61/020,420, filed Jan. 11, 2008, all of which are incorporated in their entirety by reference.

BACKGROUND

A monetary transaction typically involves a payor providing funds to a payee for goods or services rendered. One common way for a payor to provide funds to a payee is in the form of a check. A check is a physical document which includes payor account information and can be filled out by a payor to pay the payee. The payee is then required to go to a bank or other financial institution to deposit the check for payment in cash or into the payee's account. The bank uses the information provided on the check to determine the amount of funds to transfer from what account and to whom in order to deposit the funds in the payee's account or give directly to the payee.

This system of transferring funds between a payor and a payee using a physical document, such as a check, presents several challenges. First, the check is susceptible to fraud. The physical document can be tampered with to change what amount and to whom funds should be given to. In addition, there is no way for the payee, based on visual inspection of the check alone, to determine whether or not the account the check is drawing funds from has sufficient funds. Furthermore, it is not always convenient for a payee to travel to an appropriate financial institution to deposit the check. This can result in a delay in depositing the check by the payee which could lead to the check becoming lost or a decrease in the amount of funds available in the account to cover the amount written on the check in the interim.

In addition, the check clearing system based on the exchange of physical documents can be costly and add time delays to the check clearing process due to transportation and processing of large volumes of physical documents. In the United States of America, prior to 2004 if a payee deposited a check written by a payor from one bank into an account at a different bank, the banks would have to physically exchange the paper check before the money would be credited to the account. In 2004 the Check Clearing for the 21st Century Act (Check21 Act) was passed in the United States which makes the digital image of a check legally acceptable for payment purposes in the same manner as a traditional paper check. Under the Check21 Act, rather than exchanging paper checks between banks when a payee deposits a check, one bank can simply send an image of the check to the other bank.

Remote deposit capture (RDC) is a system by which payees can take advantage of the Check21 Act to deposit a check into a bank account from a remote location without having to physically deliver the check to the bank. RDC involves the payee taking a digital image of a check and transmitting that image to a bank for deposit. RDC is different than systems such as direct deposit, where an employee's earnings are posted directly to his or her bank account, or online deposit in which a retail banking service allows an authorized payee to record a check for deposit and have it posted to the payee's account prior to mailing in the physical check to the bank, giving the payee access to the funds before the check has been cleared by the bank.

The ability to pass value and payments remotely, quickly, efficiently, economically, and securely enables many conveniences of modern life including internet sales, and electronic peer-to-peer transactions, such as over eBay®. Physical payments, such as by mailing a check or cash, can be slow, expensive, and insecure. Additionally, users/check writers may make mistakes when writing checks, such as mistyping the payee's name. Carrying cash can be problematic from the standpoint of pickpocketing and other forms of theft that can present a personal security threat to an individual (i.e. armed robbery or muggings).

As a result, financial transactions are commonly made by way of electronic communications networks to purchase a variety of goods and services. Such transactions may be processed in a variety of methods using a variety of processors including, for example, credit card companies, debit card companies, automated clearing house (ACH) transactions, and other third party processors such as PayPal®.

Credit cards and debit cards operate on closed proprietary networks to which a payee has to subscribe, such as by having a merchant account. Furthermore, a merchant may be required to have specialized equipment to carry out transactions using credit cards and debit cards. Often times, credit card and debit card transactions can be very expensive (up to 3% of the transaction), due to fees charged by the credit card companies and the credit card processors. Due to the transaction fees, the risk of transaction reversals resulting from disputes, and other risks and inconveniences, some merchants are unwilling to accept credit cards and debit cards for transacting.

FIGS. 1 and 2 illustrate examples of conventional transactions between a maker 100 and a payee 110 in which a paper check 70 is physically sent to the payee 110 by the maker 100. The paper check 70 is presented to a bank of first deposit 120 and the paper check continues through the clearance process as a paper check (FIG. 1) or an image 80 of the paper check 70 (FIG. 2) until it reaches the maker's 100 paying bank 130.

BRIEF SUMMARY

A system and method for managing financial transactions based on electronic check data as described herein. method of transmitting a check-type payment between a payor and a payee using a third-party service comprising the steps of registering the payor with the third-party service, wherein the payor supplies at least one bank account identity to the third-party service, receiving a check-type payment request from the payor by the third-party service comprising payment information comprising at least a payee identifier, an amount for the check-type payment, and a bank account identifier representative of one of the at least one bank account identity supplied by the payor, and storing the payment information with the third-party service. A unique identifier for the check-type payment request can be associated with the check-type payment request and the payment information can be associated with the unique identifier. The payment notice can be transmitted to the payee. A deposit request to a deposit account can be received from the payee by the third-party for the check-type payment associated with the unique identifier of the payment information and a depositable item responsive to the deposit request can be generated by associating the payment information and the supplied bank account identity associated with the payment information. The depositable item can then be deposited into the deposit account by the third-party service.

A method of executing an electronic financial transaction involving at least two parties providing information for generating a transaction document and authorizing the document to execute the transaction. The method contemplates the maker electronically transmitting a data record representative of the financial transaction directly to a payee, such as by email or SMS. The payee can then convert the data record into a transaction acceptable to a bank of first deposit, such as by printing or imaging the data record into a form acceptable to the bank, such as a standard paper check.

In one aspect, the invention comprises a method of executing a financial transaction between a first and second party by the generation of an authorized transaction record comprising the steps of the first party providing a first set of information required for generating the transaction record, the second party providing a second set of information required for generating the transaction record, combining the first and second set of information to generate the transaction record, upon verification of both the first and second set of information, the first party authorizing the transaction record to generate an authenticated transaction record, and the second party providing access to the authorized transaction record to a third party to execute the financial transaction.

As a further aspect, the invention comprises a system for generating a transaction record comprising a first device running a first application software and a second device running a second application software, wherein the first device providing a first set of information required for generating the transaction record, the second device providing a second set of information required for generating transaction record, combining the first and second set of information to generate a transaction record, and upon verification of both the first and second set of information, the first device authorizing the transaction record to generate an authenticated transaction record.

In multiple aspects of the invention, the transaction record can be a physical document or check, or an electronic transaction record. Various embodiments of the invention are contemplated. In one aspect, a method for compositing information and authorizing a financial transaction can comprise the steps of: forming, by a maker, a data record representative of a financial transaction with a payee; electronically transmitting the data record representative of the financial transaction directly to the payee, wherein the electronic transmission includes an authorization by the maker to the payee to deposit or cash (negotiate) the financial transaction; wherein the payee can continue the processing of the financial transaction by presenting the transaction to a bank of first deposit.

In other aspects of the invention, the step of transmitting the data record can comprise sending an email to the payee. The step of transmitting the data record can include attachment of a file to the email which includes a printable representation of a check representative of the financial transaction. The step of transmitting the data record can include the step of emailing a data file which contains data that can be constructed into at least one of a physical check and an electronic image of a check compliant with Check21 standards. The method can further comprise the step of registering data representative of the financial transaction between the maker and the payee with a third party service, whereby a processing bank can verify the accuracy of the data representative of the financial transaction. The method can also include the step of sending a portion of the data record representative of the financial transaction to the payee with an identifier of where the remainder of the critical data to construct the data can be retrieved and submitted to the bank of first deposit as a complete transaction.

The method can also include the step of retrieving missing critical data constituting the financial transaction prior to or at the time of presentment to a bank of first deposit. The method can also include the step of electronically signing a graphical representation of the check at the time of making of the data record representative of the financial transaction, and the step of electronically transmitting the transaction includes the step of transmitting the graphical representation of the check to the payee. The method can also include the step of the payee physically printing the graphical representation of the check prior to presentment to a bank of first deposit.

The method can also include an interface located on a global computer network for performing at least one of: (a) receiving physical address information regarding at least one maker; (b) receiving bank account information regarding at least one maker; (c) receiving information regarding at least one payee for the at least one maker; (d) receiving payment information regarding a payee and an amount, wherein the payment information can be entered into an interface reflecting a standard paper check layout. The step of creating the data record representative of the financial transaction can also include the step of constructing the data record from stored information entered into the interface.

The method of creating a single data record can also comprise uploading a batch of data records and creating multiple transactions to at least one payee in a batch format. The upload file can comprise a well-known data format including, but not limited to, a Positive Pay file format.

Upon receiving the transmission, the payee can perform at least one of the following to present the payment transmission to a bank of first deposit: (a) printing the payment transmission into a form representative of a traditional paper check; and (b) transmitting a graphical representation of the payment transmission to the bank of first deposit. The method can further comprise the step of providing a cryptographic or trusted time stamp associated with the transaction to prevent tampering with, or multiple presentment of, the financial transaction to multiple banks of first deposit. The method can also include the step of the payee selecting the form of the transaction for presentment to the bank of first deposit. The method can also include the step of the maker providing a plurality of payment settlement modalities to the payee, and the payee can select from at least one of the provided plurality of payment settlement modalities for presentment to a bank of first deposit or other settlement representative based on the selected settlement mode to settle the transaction received from the maker.

BRIEF DESCRIPTION OF THE DRAWINGS

In the drawings:

FIG. 3 is a flow chart showing an exemplary system and method according to the invention of compositing transaction information and authorizing a transaction.

FIG. 3I is a message provided to a login user on the interface for the step of authorizing the check data record.

FIG. 3O is a sample of the content of the e-mail sent to the payees e-mail account by the web interface login user.

FIG. 4 is a flow chart showing the exemplary system and method of FIG. 3 according to the invention of compositing transaction information and authorizing a transaction in which the payee retransmits payment data and maker's authority to a bank of first deposit, wherein the bank of first deposit converts the payment data into a paper check.

FIG. 7 is an exemplary schematic showing a transaction/data record containing value transmitted from a maker to a payee.

FIG. 8 is an exemplary schematic of payment data and maker's conditional authority being transmitted from a maker to a payee in which the payment data and maker's conditional authority can include items such as a maker's identification credential, an amount, the payee, a transaction reference, settlement information, authorization, and maker's consent to print the payment data or convert to a settlement mode of the payees choice.

FIG. 9 is an exemplary schematic according to the invention of a maker composing and fully authorizing a data record representative of a financial transaction, indicating that the data record is payment data and the maker's conditional authority, transmitting the payment data and maker's conditional authority to a payee which includes maker's identification credential, an amount, a payee, a transaction reference, a settlement authorization, information, and authorization, and maker's consent to print the payment data or to convert to a settlement mode of the payees choice, to the payee.

FIG. 23-26 illustrate a user interface verification window according to an embodiment of the invention.

FIGS. 32-38 illustrate a user interface window for a check data import process according to an embodiment of the invention.

FIG. 39 illustrates a user interface check review window according to an embodiment of the invention.

DESCRIPTION OF AN EMBODIMENT OF THE INVENTION

Figure 1:
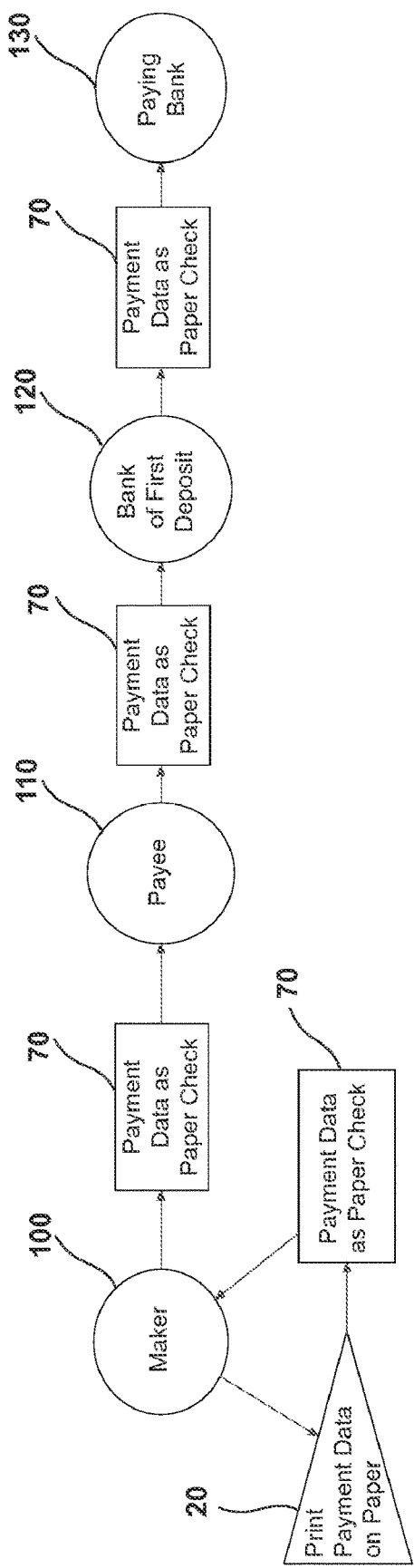
FIG. 1 is a flow chart illustrating a prior art method of submitting a paper check through a financial clearance process.
Figure 2:
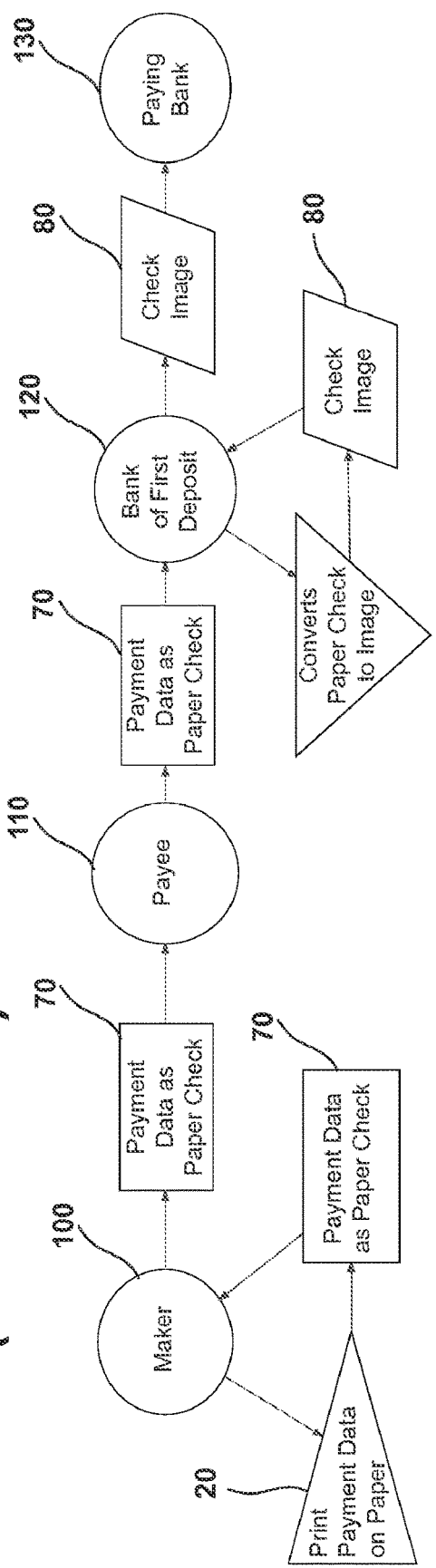
FIG. 2 is a flow chart illustrating another prior art method of submitting a paper check through a financial clearance process, in which a depositing bank images the paper check after presentment to a bank of first deposit.

In one embodiment, the invention is related to legally enforceable transactions, payments, agreements, instructions, contracts, stock certificates, bonds, prescriptions, laws, judgments, etc. Although the primary field of use of the invention is for financial transactions, the invention can be used for a variety of other transactions, such as for certifying a variety of other documents and contracts, or for iteratively filling a contractual agreement.

To be able to pass value, such as monitory value, to be sent to another party. The party to which value is sent (payee) may be located remotely from the party sending payment (payer). The value is passed and transacted between two or more parties using any communications network, including public and non-proprietary networks such as the internet. The invention, in effect, modernizes the well-established legal form of payment of the check.

The invention further allows parties to pass between themselves independent writings or information with memorialization or evidence of a transaction or contract.

For parties that are not remotely located from each other, the methods disclosed herein provide an economical, secure, user friendly, and easy to use method of executing transactions. As a result the parties need not carry cash, checks, or credit cards to make a financial transaction.

Referring now to FIG. 3, the method 10 of completing a financial transaction according to the invention is disclosed. The method 10 creates an electronic check by composition of information from at least one of a maker 100 and a payee 110. Additional information for the assembly of the check can be provided by one or more of a deposit bank 120, a paying bank 130, and a third party service 140. The method 10 to carry out the transaction may be carried out over a communications network such as the internet.

The maker 100 of the check 70 can send the critical data elements 20, such as bank routing number, account number, check number, dollar amount, payee, date, memo, and an instance of the maker's signature 22 or an electronic signature or a proxy/reference value derived from some or all the other data elements (i.e. a hash value or a cryptographic/trusted time stamp) (this can include the addition of data, such as a secret value, added to enhance the security or cryptographic properties by increasing numeric complexity) as a text and numerical objects over the communications network. From this information, a partially completed check 30 is generated along with a check form 40 and sent as an object or image of the partially completed check 50 to the payee 110 who can then composite it at their location for printing or imaging or they can send it on to their bank 130 who can composite it and either print or image it. Incremental check information and check form 40 along with the image of the partially completed check are used to form the complete and authorized check 70 after the maker is given an opportunity to review all associated information and then authorize the check. After authorizing the transaction and generating a complete check, the image 80 thereof may be printed or stored by the payee 110, the payee's bank 130, the maker's bank 130, or the maker 100.

As an alternative, the maker 100 may make the electronic check payable to himself or to cash, in which case there is no separate entity designated as the payee 110 (i.e. the maker 100 is also the payee 110) and therefore the maker 100 provides all of the information required to complete and authorize the check 70.

As a further alternative, the maker 100 and the payee may use a third party service 140 to aid in the transaction process, by for example, speeding up the process or by providing an additional level of security or verification of the information used to generate the check 70.

The maker 100 of the check need not be the party that causes the check 70, the partially completed check 30, or the partial image 50 thereof to be printed. The payee 110 or any other party involved in the completion of the check can print or store the image of the check 80, including, but not limited to the deposit bank 120, the paying bank 130, and the third party service 140.

Alternatively, the maker of the check completes the check in full via a computer and then skips the step of printing it onto paper to be conveyed physically to the payee who would then take it to their bank or image it and transmit it to their bank. The maker can generate an image directly from the computer application used to composite the check and then the maker can forward the check image to the payee who can then print it and deliver it to their bank or forward the image on to their bank. In either event, it will be understood that the invention contemplates presentment of the transaction record to a processing institution, such as a bank, in either tangible (e.g., a physical, printed document) or electronic form.

The maker may after completing the compositing of the check, send the some but not all the data elements together with a unique reference value designating a location where the omitted elements are stored thereby allowing the maker or a third party service to reconstitute the check exactly as it had existed at the time of its original authorization.

The maker 100 of the check composes the check by inputting into a computer all the information needed of an ordinary check, adding a signature (a recorded instance of the regular wet signature, or a signature generated by a signature pad, or an electronic signature (per ESIGN & UETA) or digital signature (per PK.I)). The check information can be a set of data objects and the check form can be a graphic object, set of graphic object instructions or image and the two are sent together such that the informational elements map to specific (and appropriate) designated areas (locations) on the check form object.

The two elements (information and check-form) can be sent as a bundle. The information can be sent by itself with the intention that the receiving party (the payee) associate it with an appropriate check-form and create a composite item which they then print, or image or forward on to their bank/financial institution to deposit.

Alternatively, the maker of the check could create the composite item and cause it to be imaged (i.e., Check21 or RDC guidelines) and then forward this on to the payee. The intended payee can initiate the process by sending check information—the payee, and/or amount, and/or any other relevant information (i.e., date, memo, etc.) to the maker for the maker to complete by adding the bank routing number, account number, and/or check number, and optionally the date and/or memo (or any other missing information) and then the maker authorizes the check and evidences same by any of the herein mentioned methods of adding a signature. The maker and the payee can work back and forth as needed in any combination of who adds what information or edits the information until the point that the maker is satisfied and authorizes the check.

Another example to transfer the payment authority and data would be an interaction between mobile devices. For example, a pair of handheld devices could be loaded with cooperating applications so that a maker 100 could construct a payment and a payee 110 could receive the payment on their handheld device by cellular network, wireless or local proximity interaction, such as Bluetooth protocol.

Alternatively, the maker could do all of the requisite steps disclosed above and leave the payee blank such that it could be completed later by the payee or it could be left blank and the item traded as if it were a form of currency with the ability for any legitimate holder to add a name as the payee and then cash it or deposit it or use it to acquire goods in trade (similar in nature to how a gift card or a traveler's check works), the difference being that the funds would not leave the maker's account until it is converted to cash, goods or deposited with a bank/financial institution.

Figure 3A:
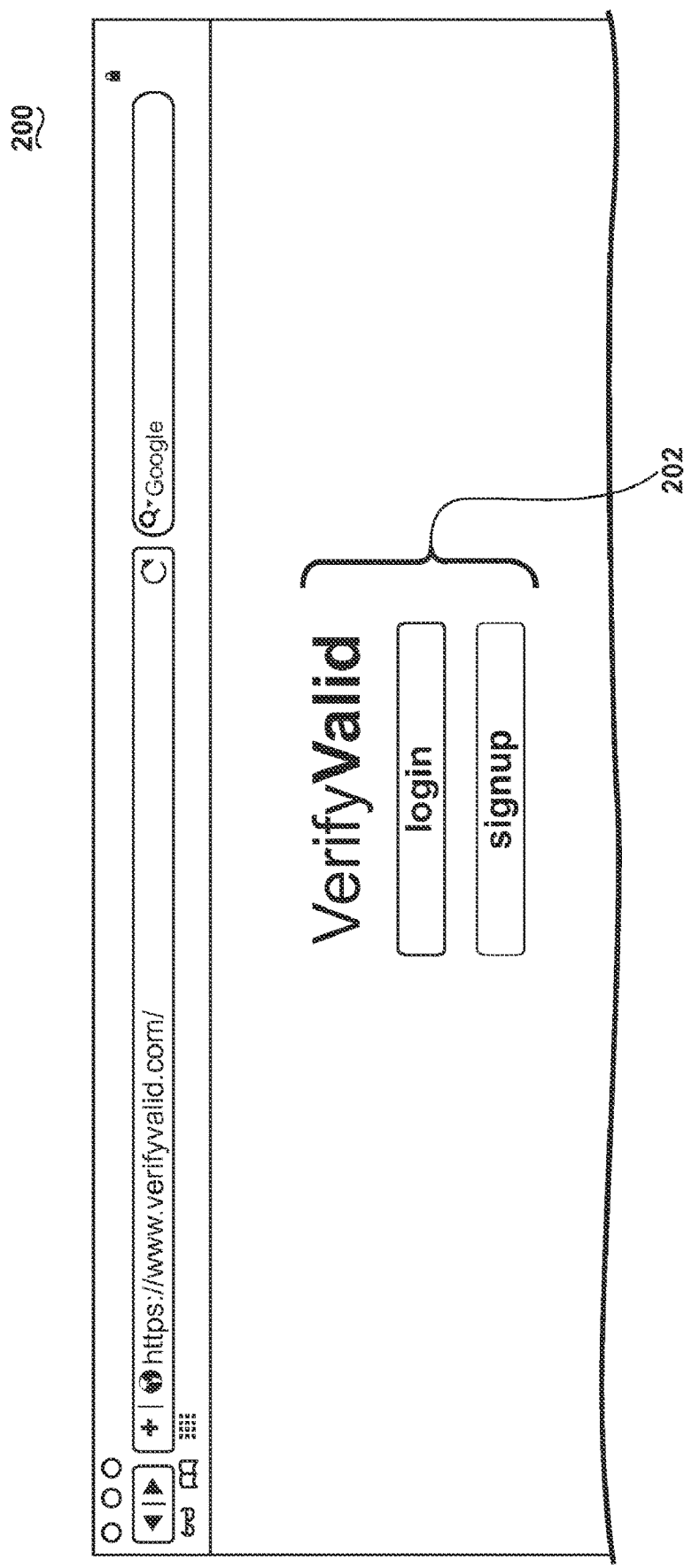
FIG. 3A is an example of the web interface contemplated for the invention including an initial screen.
Figure 3B:
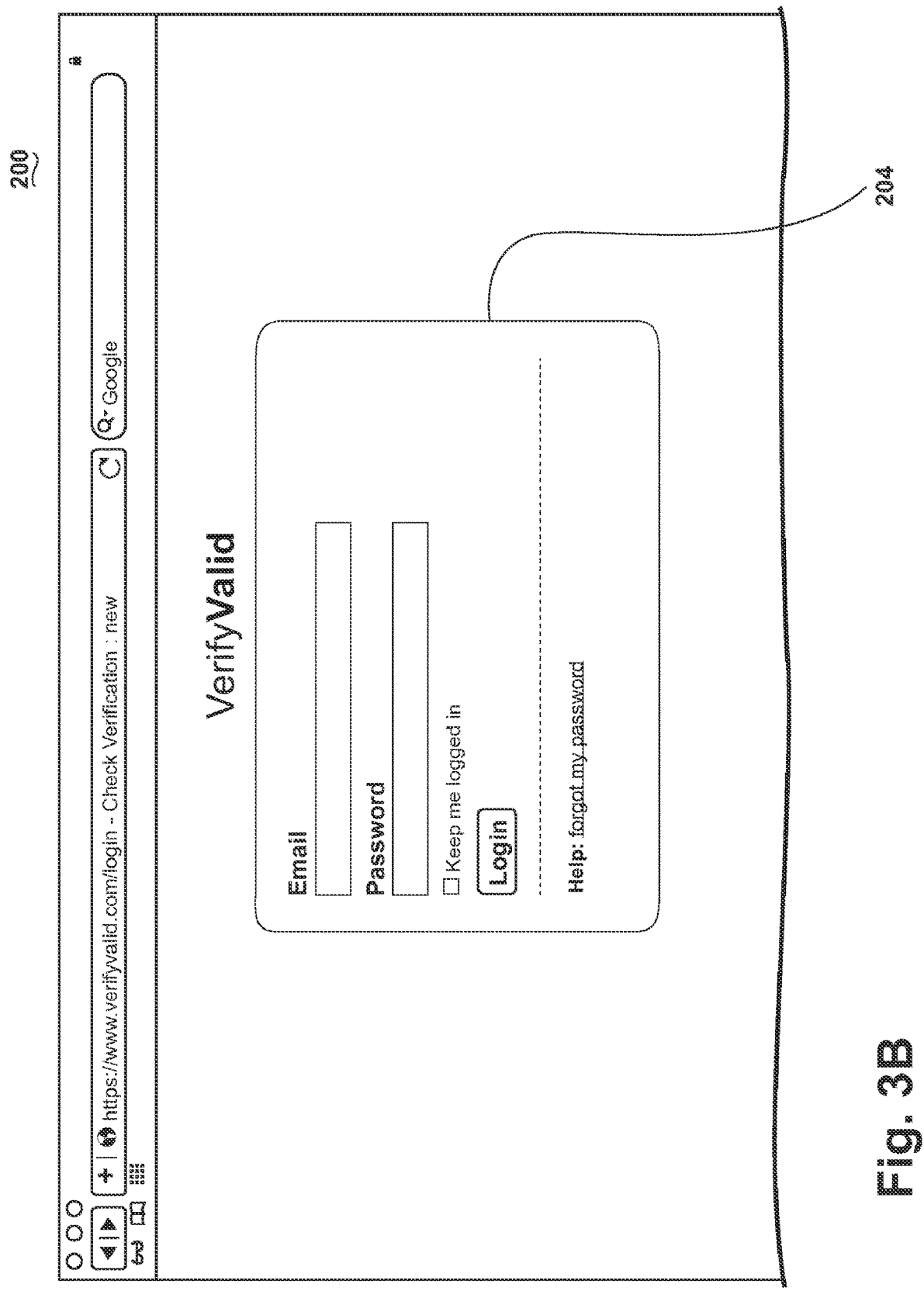
FIG. 3B is an example of the web interface containing a login form according to the invention.
Figure 3C:
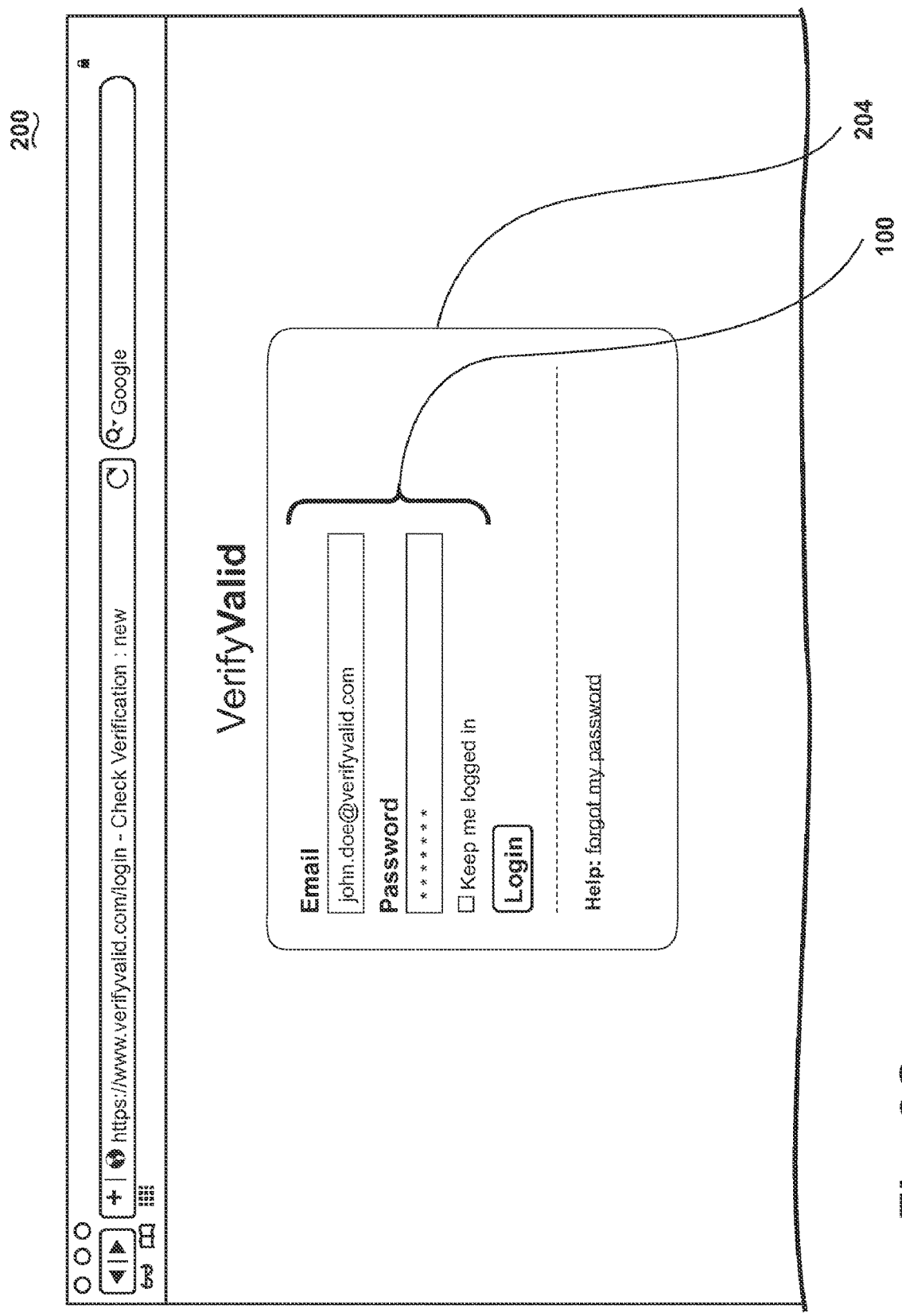
FIG. 3C is a completed login form for the web interface.
Figure 3D:
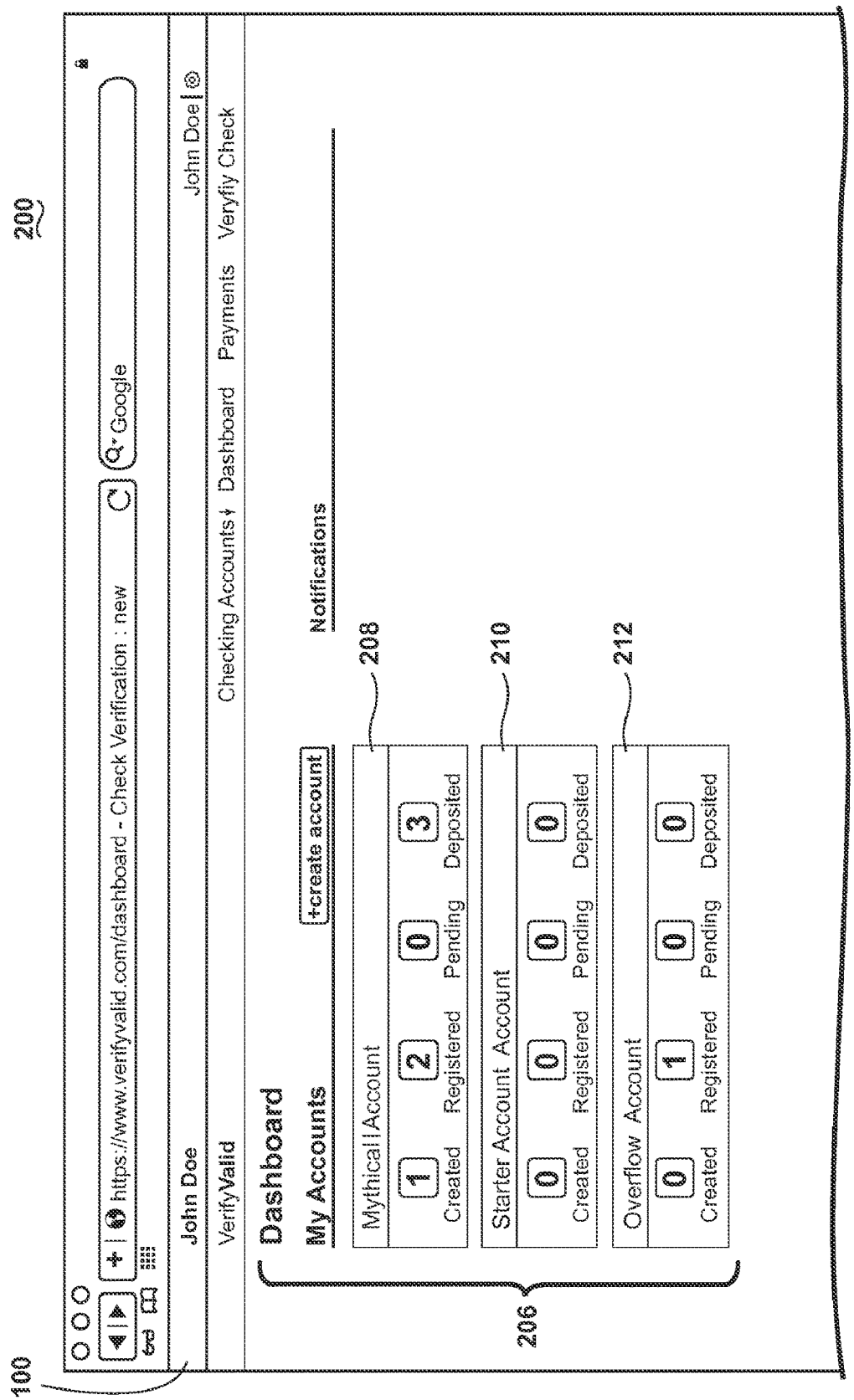
FIG. 3D is a dashboard for the web interface showing various information for a logged-in user.
Figure 3E:
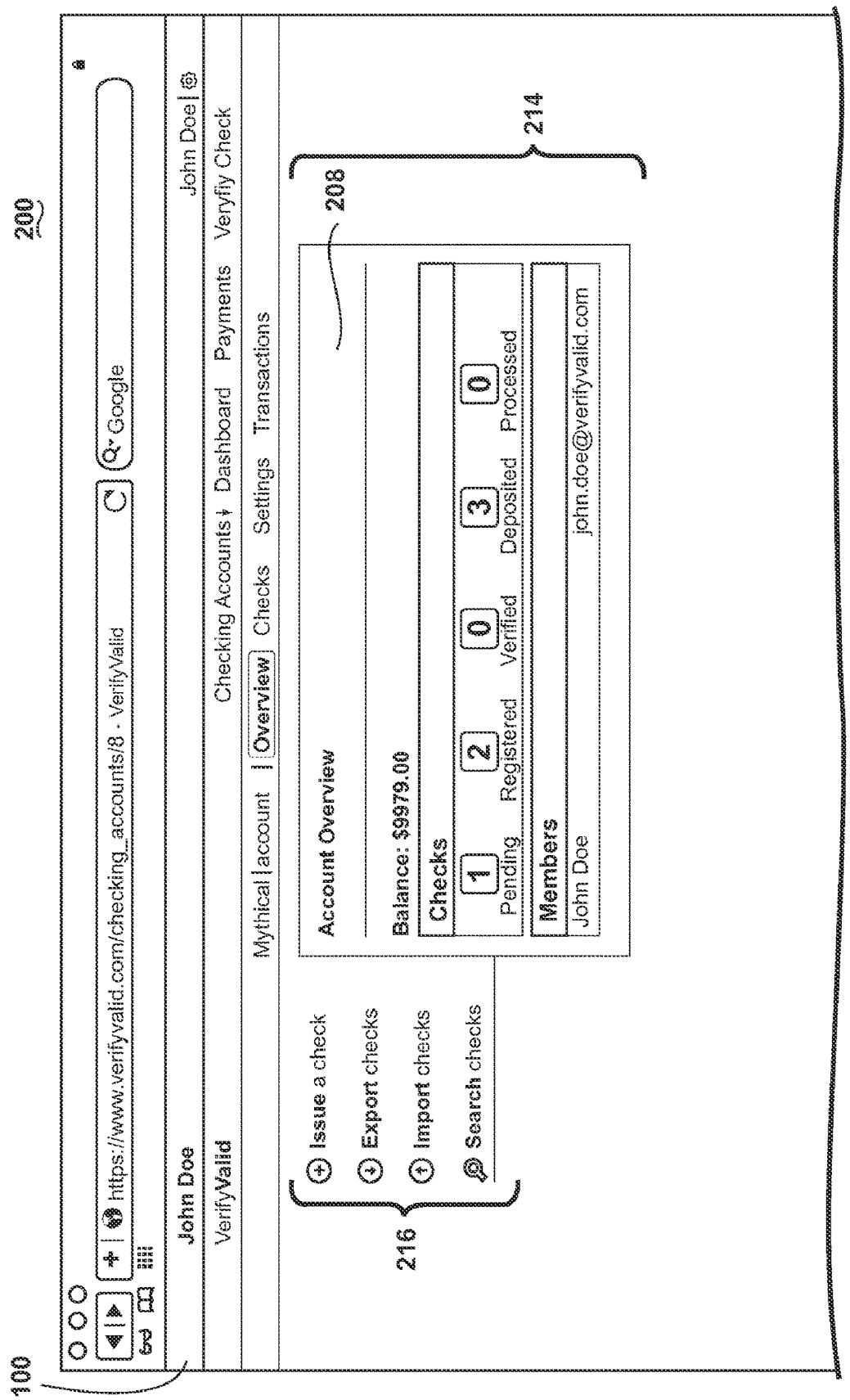
FIG. 3E is a bank account overview for the web interface showing the status of various checks drafted on a selected account.
Figure 3F:
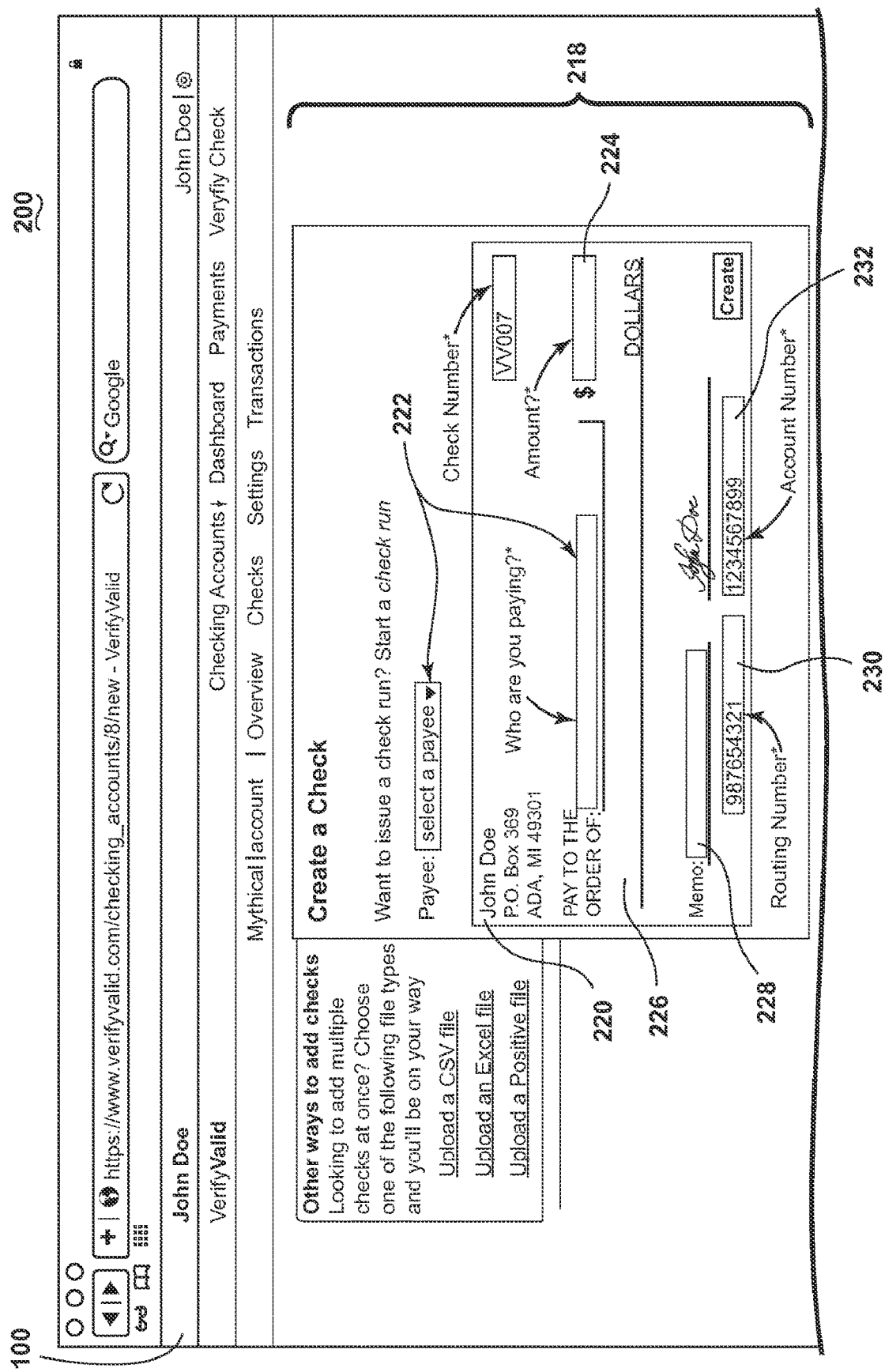
FIG. 3F is an initial form for the web interface for creating an electronic check transaction.
Figure 3G:
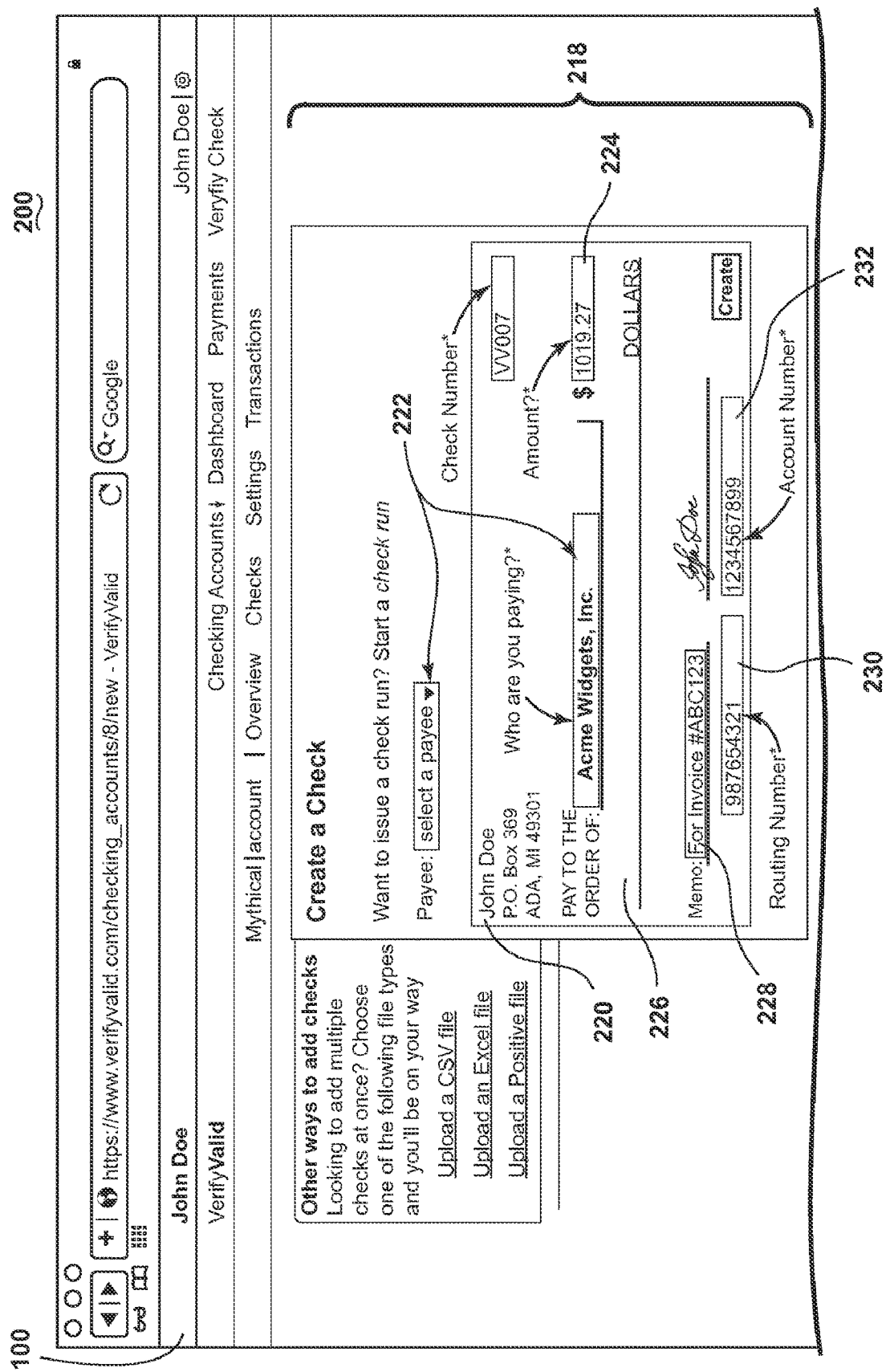
FIG. 3G is a completed form for creating a data record representative of a physical check in the web interface.
Figure 3H:
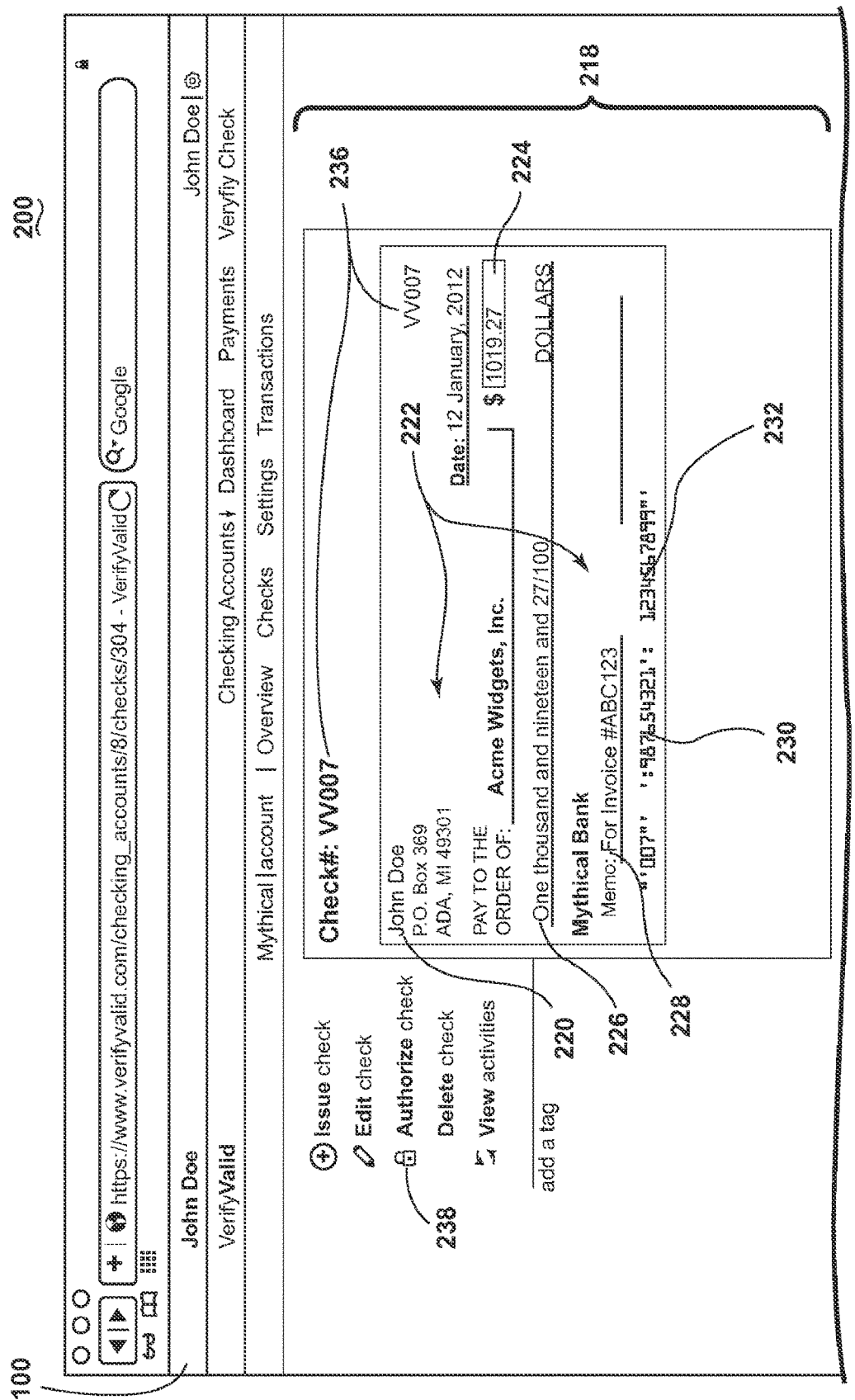
FIG. 3H is a graphical representative of a check incorporating financial data entered by the maker in the web interface.
Figure 31:
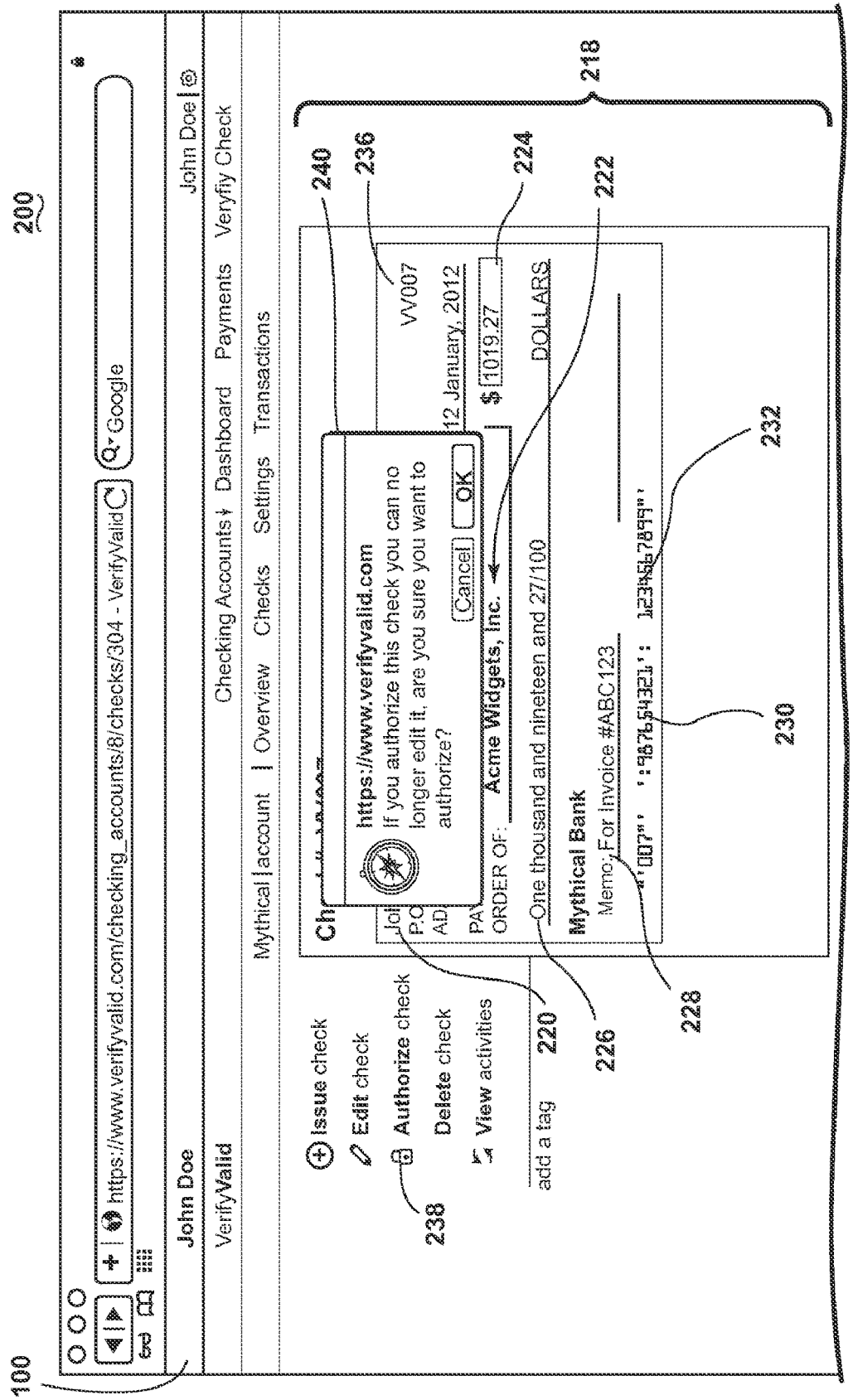
FIG. 31A is a flowchart illustrating a process for verifying a user's identity or authority according to an embodiment of the invention.
FIG. 31B is a flowchart illustrating a process for setting up a new account according to an embodiment of the invention.
Figure 3J:
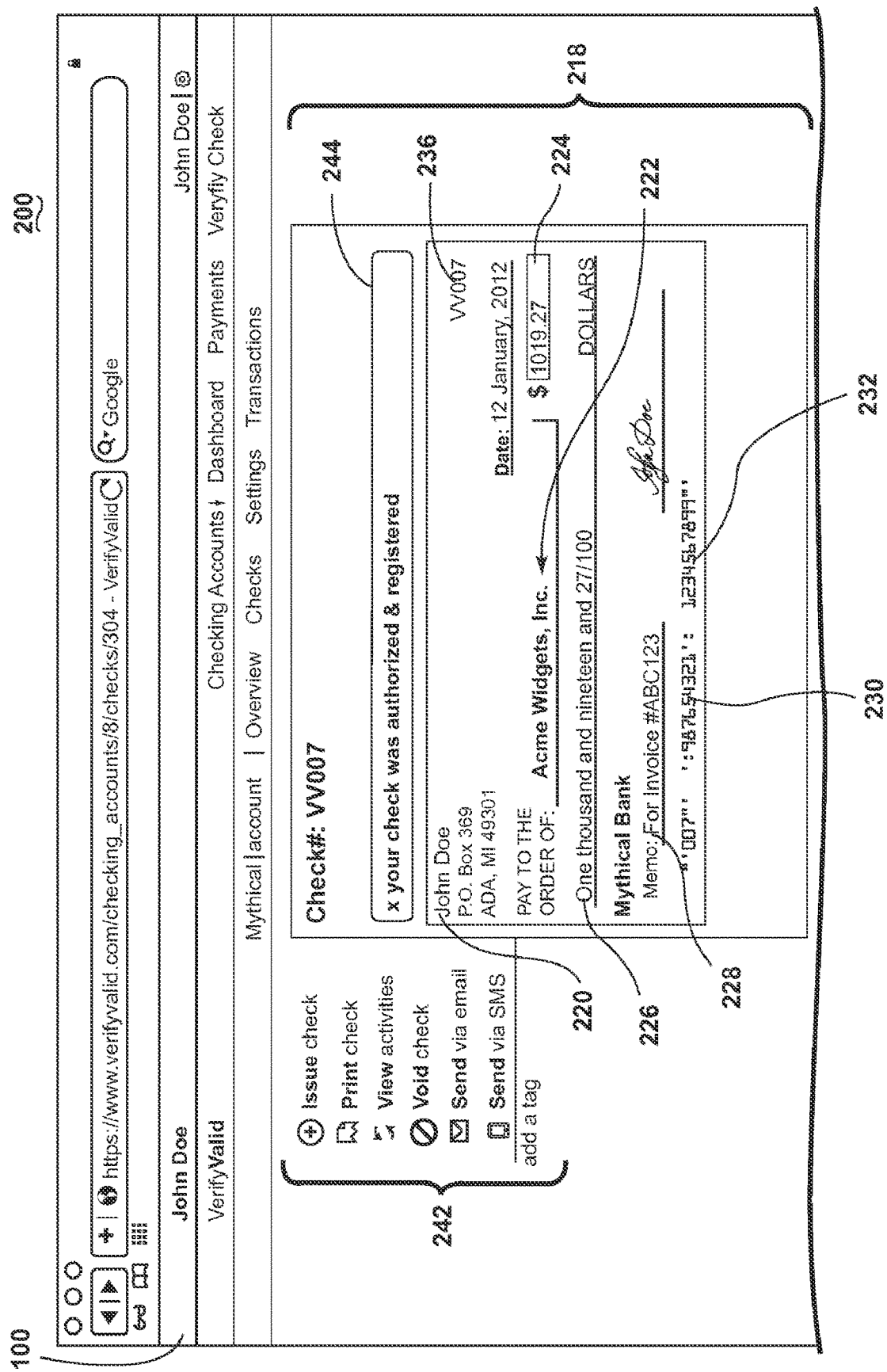
FIG. 3J is a message indicating that the check data was authorized and registered in the web interface.
Figure 3K:
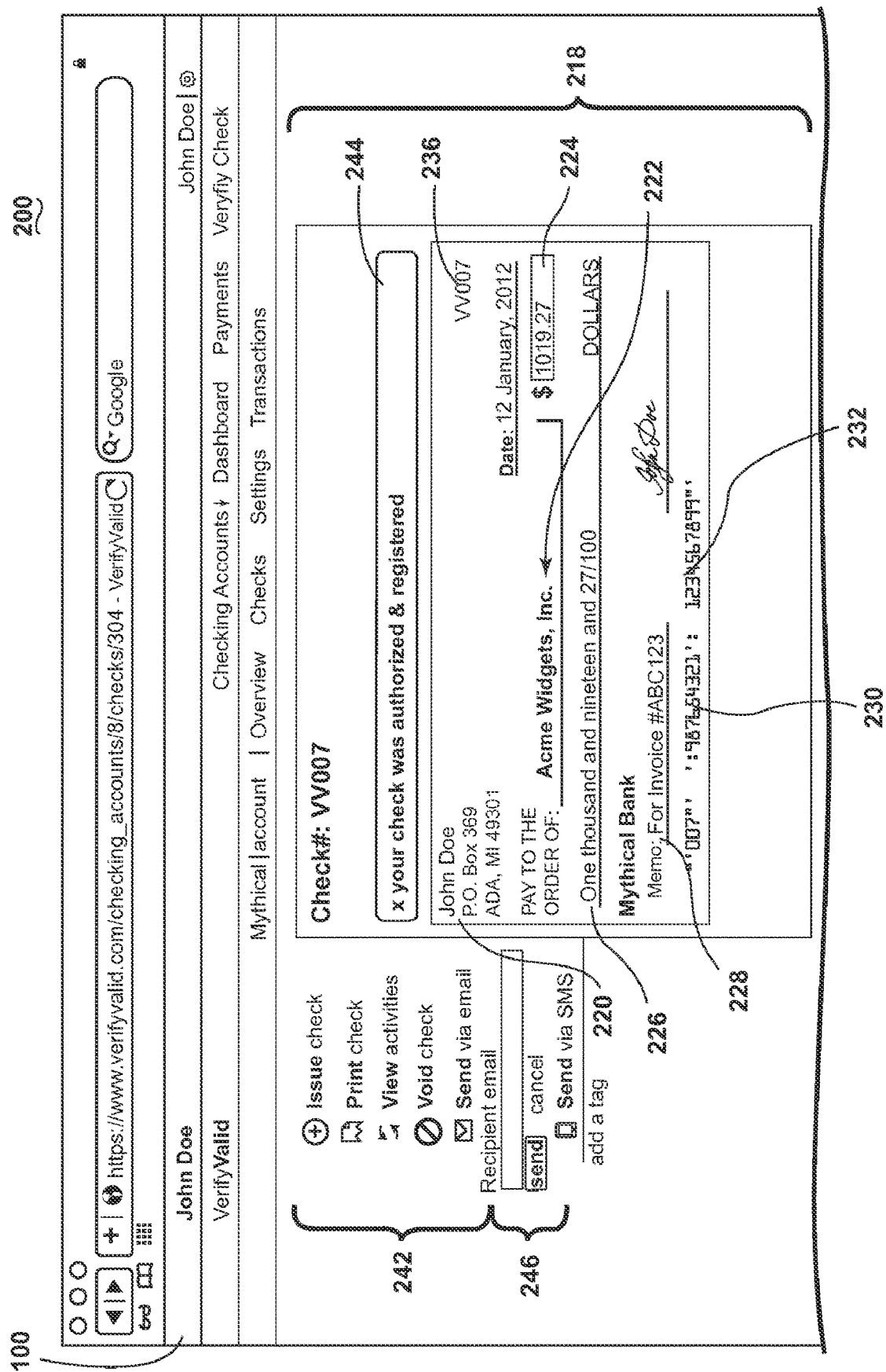
FIG. 3K is a web interface prompting the logged-in user for recipient e-mail information for sending the authorized check transaction to a payee.
Figure 3L:
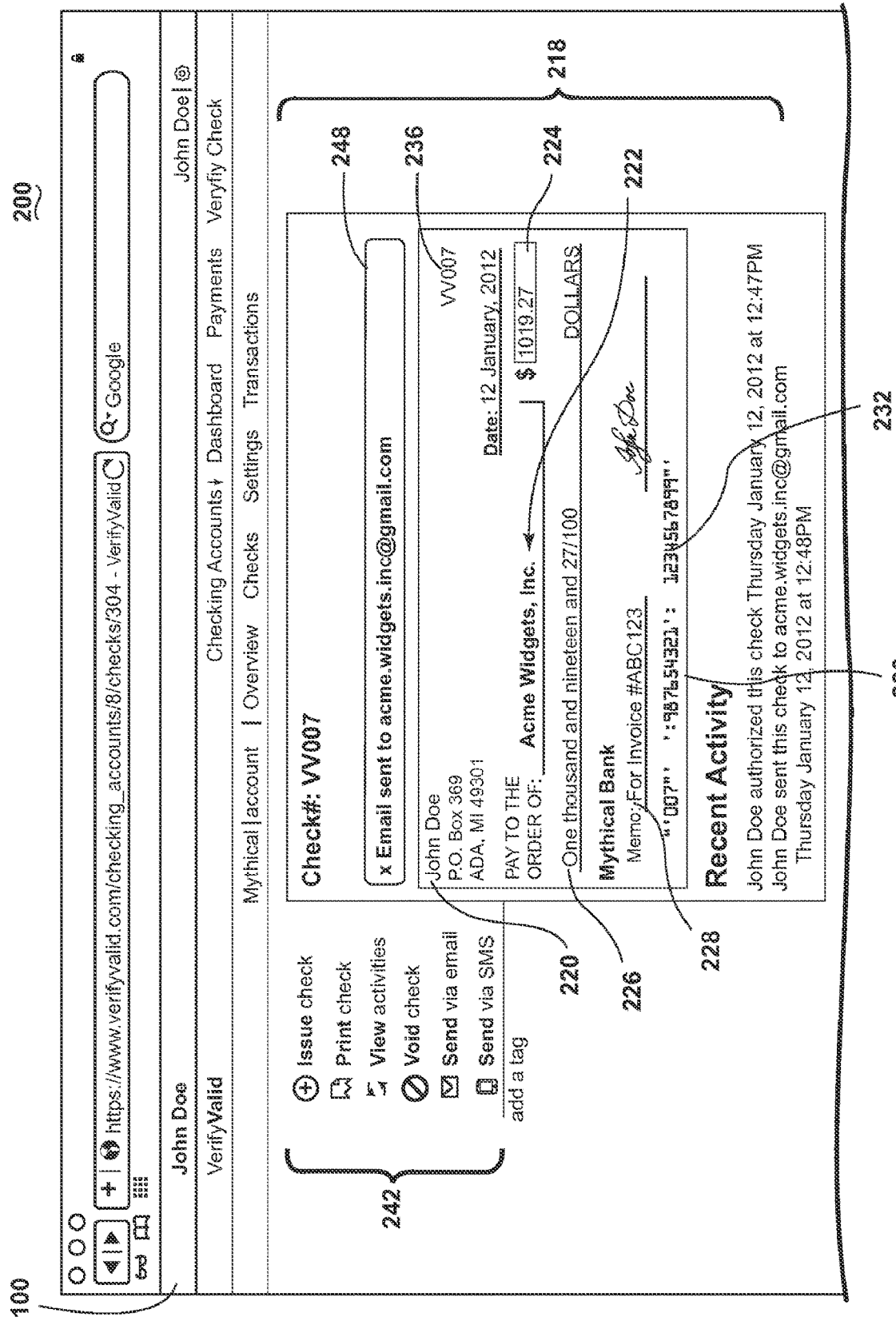
FIG. 3L is a confirmation message provided to the logged-in user that the check transaction was e-mailed to the indicated payee.
Figure 3M:
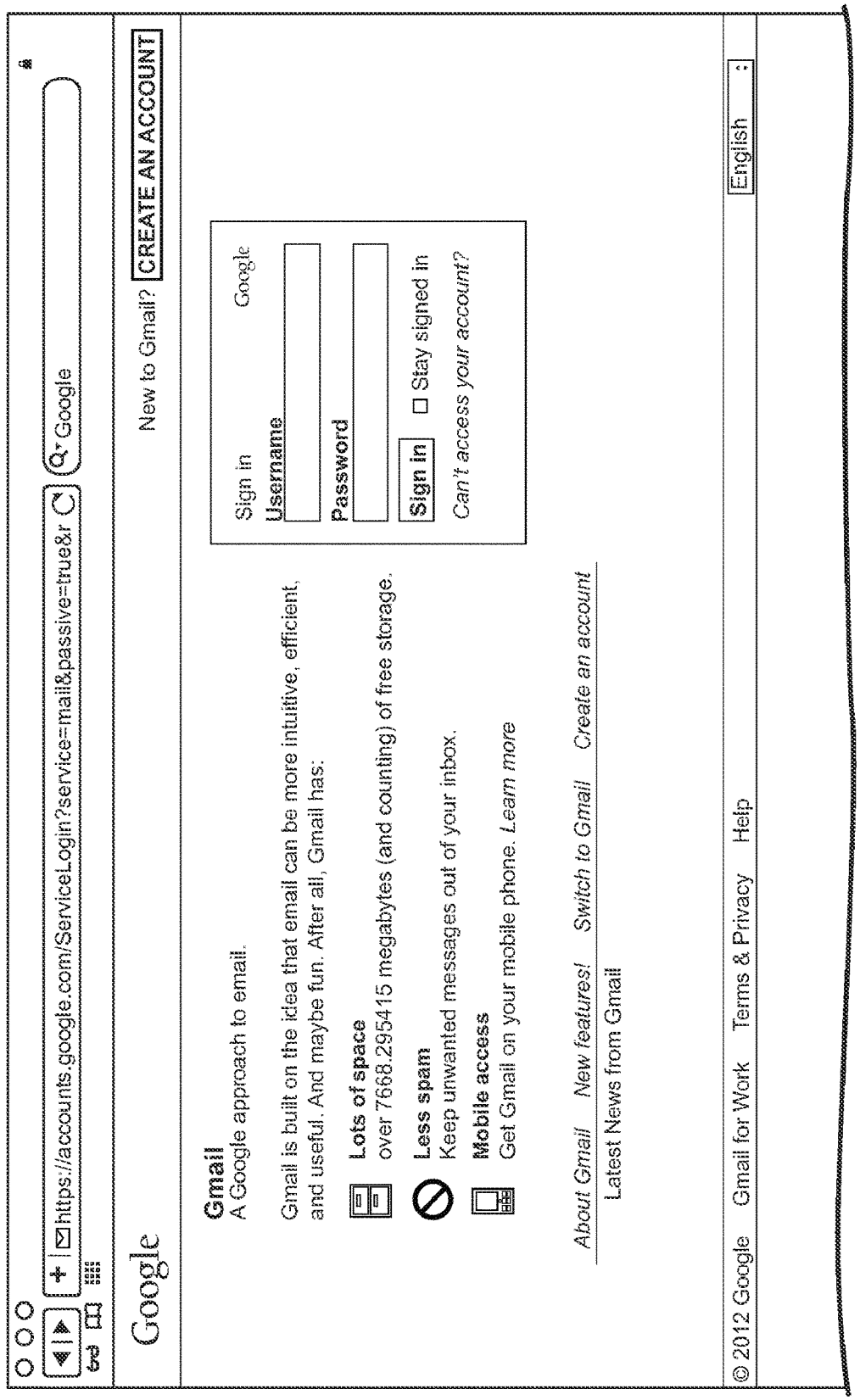
FIG. 3M is a sample login interface for a web-based e-mail provider for a payee which has received the e-mail check transaction from the maker from the web interface.
Figure 3N:
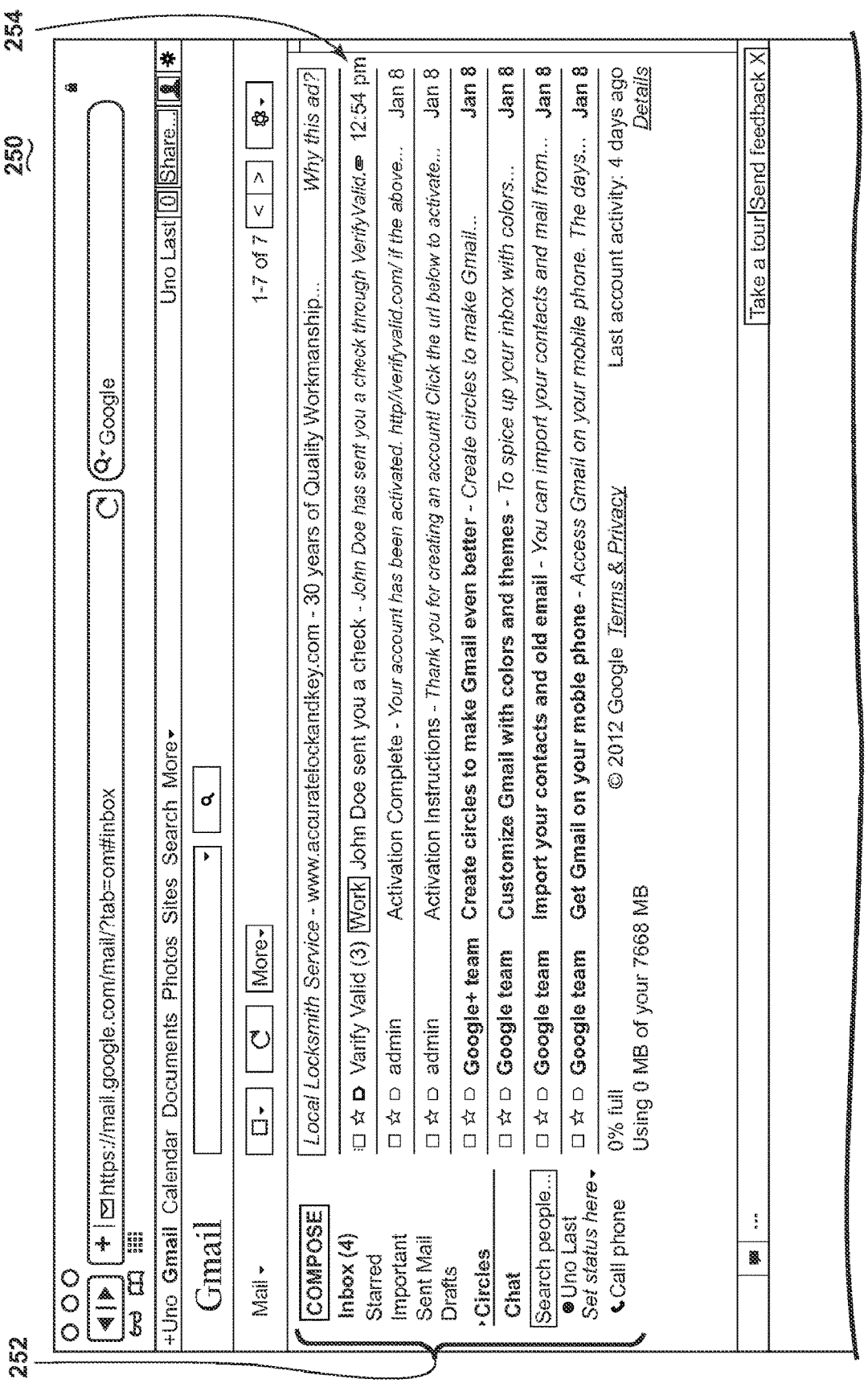
FIG. 3N is a sample e-mail inbox indicating that the e-mail check transaction has been received by the payee's e-mail account.
Figure 3P:
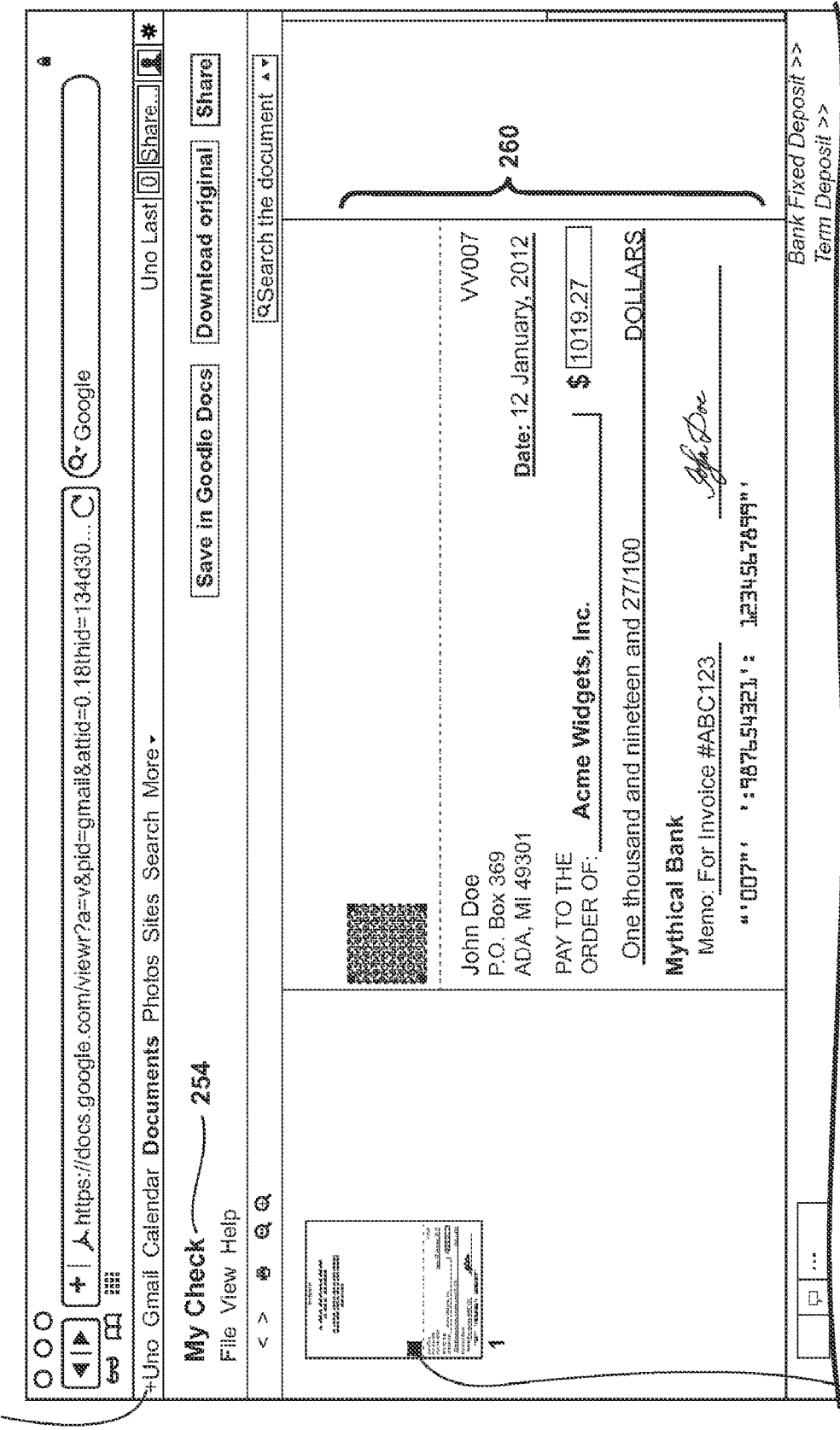
FIG. 3P is the contents of an e-mail attachment containing a graphical representation of a paper check received by the payees e-mail account.

An example website for performing all steps relating to creating, authorizing, completing, and transmitting the data record representative of the financial transaction by the maker 100 to the payee 110 is illustrated by example in FIGS. 3A-3P. It will be understood that these figures are illustrative, and should not be interpreted as limiting the steps and elements of the appended claims in any way. The examples set out in FIGS. 3A-3P assume that the maker has an account created on the example website, shown generally in FIGS. 3A-3P by reference numeral 200 and higher.

FIG. 3A shows an example of the web interface 200 contemplated for the invention including an initial screen 202, prompting a client to either login or sign up. FIG. 3B shows a login form 204 for the web interface 200, and FIG. 3C shows a login form 204 completed by a maker 100 on the web interface 200.

FIG. 3D shows a dashboard 206 for the web interface 200 showing various information for a logged-in maker 100. FIG. 3D shows that the example maker 100 has data representative of three bank accounts 208, 210, 212 stored in the interface 200, wherein two of the accounts have one or more checks in various stages of processing.

FIG. 3E shows a bank account overview for one of the example bank accounts 208 for the web interface 200 showing the status of various checks drafted on the selected account, and a balance of that bank account. The account overview includes several menu items 216 for issuing a check, exporting checks, importing checks, and searching checks.

FIG. 3F shows an initial check creation form 218 for the web interface 200 for creating an electronic check transaction when the "issue a check" menu option is clicked by the maker 100 in FIG. 3E. The check creation form 218 includes a graphical representation of a conventional check form document with various fields laid out on the form in a manner consistent with a typical physical check form: maker's name/address 220, payee name 222, amount 224, written-out word representation 226 of the amount 224 (auto completed by the form 218), optional memo field 228, account routing number 230 (auto-completed by the form 218 when the maker 100 selects a bank account), account number 232 (auto-completed by the form 218 when the maker 100 selects a bank account), and a representation of the maker's 100 signature 234 (which can be an accurate representation of the maker's signature by the maker 100 uploading an image file containing a graphical representation of the maker's signature. The maker's signature 234 can also be an electronic signature, including any number of well-known electronic signature methods.

FIG. 3G shows a completed form 218 for creating a data record representative of a physical check in the web interface 200. The data shows a sample payment of $1,019.27 (US dollars) from John Doe's (maker 100) bank account 230/232 (account ending in x899) to Acme Widgets, Inc. (payee 110). It will be understood that, in accordance with the invention, not all of the fields shown in web form 218 need to be completed in order to transmit the initial data record representative of the financial transaction to the payee 110. Rather, the form could only have 1-2 fields completed (such as the payee and bank account), and the partially-completed transaction could be sent to the payee for completion, whereby the transaction, after completion by the payee 110, would be re-routed back to the maker 100 for authorization and indication of authority to deposit the transaction (see FIGS. 7-13 for more examples of these types of partially-complete transactions).

FIG. 3H shows a graphical representative of a confirmation copy check 218 incorporating financial data entered by the maker in the web interface 200. The interface 200 has assigned a check number 236 (in the example shown in FIG. 3H, check # VV007) to the proposed transaction created by the maker 100. The maker 100 can then click the "Authorize check" menu item 238, whereby the maker 100 is prompted with the confirmation message 240 in FIG. 3I. Turning to FIG. 3J, once the maker 100 clicks "OK", the maker 100 is presented with additional transmission options 242, which allow the maker 100 to transmit the check in the form 218 to the payee specified in field 222 via physical check ("Print check"), email ("Send via email"), and text messaging ("Send via SMS"). There are also options to view the activities relating to the check in the form 218 and to void the check in processing ("Void check"). The maker 100 is also presented with a confirmation message 244 that the check in the form 218 "was authorized and registered." Data regarding the check in the form 218 can now be accessed with properly authenticated service calls to a service 140 contemplated by the invention. For example, a bank of first deposit 120 could call the service 140 and obtain verification or validation information on the accuracy of data being presented to the bank of first deposit 120, such as to confirm that the bank account information 230, 232 or the amount 224, or payee's name 220 is accurate with what is being presented to the bank 120.

Once the data record representative of the check transaction 218 has been authorized, processing moves to FIG. 3K in which the maker 100 is prompted for transmission information for the payee 110 (in whatever mode of transmission the maker 100 has selected). In this example, the maker 100 is prompted for email information relating to the payee 110 in email form 246. Once the payee's recipient email is entered into the email form 246, the maker 110 can press the "send" button to transmit data representative of the financial transaction in the form 218 to the payee 110. A confirmation message 248 that the transmission has been sent to the payee 110 is set forth in FIG. 3L.

The receipt of the transmission by the payee 110 will now be described with respect to FIGS. 3M-3P. FIG. 3M shows a sample email interface 250 for a web-based e-mail provider for a payee 110 which has received the e-mail check transaction from the maker 100 from the web interface 200. FIG. 3N shows the email interface 250 with a sample e-mail inbox 252 indicating that the e-mail check transaction 254 has been received by the payee's e-mail account 250. FIG. 3O shows content 256 (and an attachment 258) of the e-mail 254 sent to the payees e-mail account 250 by the maker 100. FIG. 3P shows the attachment 258 and its contents (including instructions for presentment and a link to the service 140 for verification of the check's data) containing a graphical representation of a paper check 260 received by the payees e-mail account 250. The payee 110 can elect now to print the graphical representation of the paper check 260 and present the printed copy to a bank of first deposit 120 or transmit an image of the graphical representation of the paper check 260 to the payee's bank 120.

Alternatively, the maker 100 could do all the requisite steps disclosed above and provide a designated paying bank with a set of the transaction data and evidence of the authorization such that the paying bank could confirm the presence of funds on deposit sufficient to clear the item at time of presentment, potentially providing attestation to the presence of sufficient funds, and reserving an amount from funds being held on deposit sufficient to pay the item when it is eventually presented for payment/settlement, thereby creating a "good funds" transaction.

The above could be implemented with a limited range of approved payees (i.e. a list of individuals or businesses, etc. from which only one of the list may be added at later time. All of the steps described can be executed using a telephone-based, voice-based service, including but not limited to a cellular/mobile network.

There are several examples of how this method 10 could work to transmit a transaction of value between a maker 100 and a payee 110. Illustrative, but not limiting, examples are shown in FIGS. 4-13 (in addition to the example shown in FIG. 3).

FIG. 4 is a flow chart showing the method 10 according to the invention of compositing transaction information and authorizing a transaction in which the maker 100 transmits payment data 20 (as shown by example in the web interface check creation form 218) and maker's authority 22 (a digital signature, imaged signature, text evidencing the authority, etc.) to the payee 110. The payee 110 retransmits the payment data and maker's authority 20, 22 to a bank of first deposit 120, wherein the bank of first deposit 120 converts the payment data 20, 22 into a paper check 120. Processing continues with the payment data 22 converted to a paper check 70 to the paying bank 130.

Figure 5:
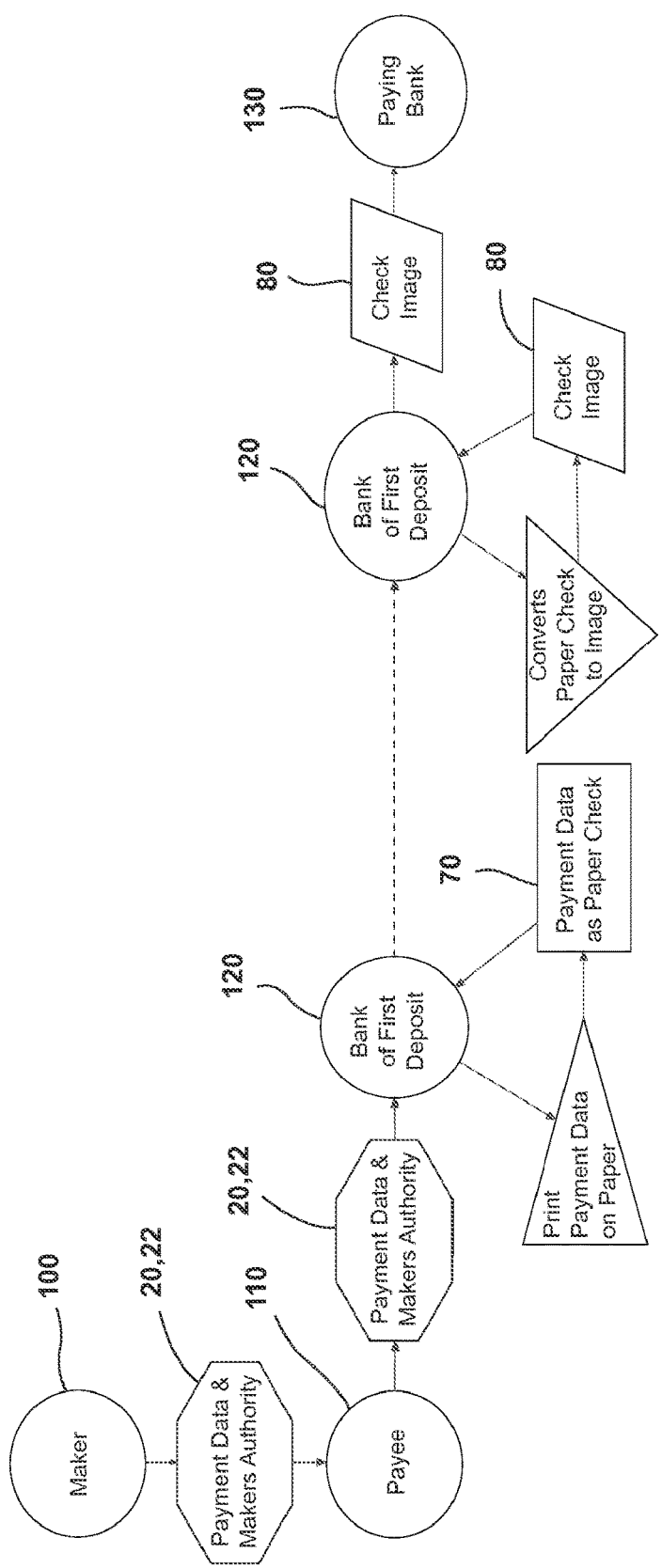
FIG. 5 is a flow chart showing the exemplary system and method of FIG. 3 according to the invention of compositing transaction information and authorizing a transaction in which the payee has forwarded the maker's payment data and authority to the bank of first deposit and the bank of first deposit has printed the payment data as a paper check or converted the paper check to a check image and continued processing of the financial transaction.

FIG. 5 shows a flow chart showing the method 10 (having many of the same steps as FIG. 4) in which the bank of first deposit 120 converts the maker's payment data and authorization 20, 22 to a paper check 70 and then images the paper check 70 into a check image 80. Processing continues with the payment data 22 converted to a check image 80 to the paying bank 130.

Figure 6:
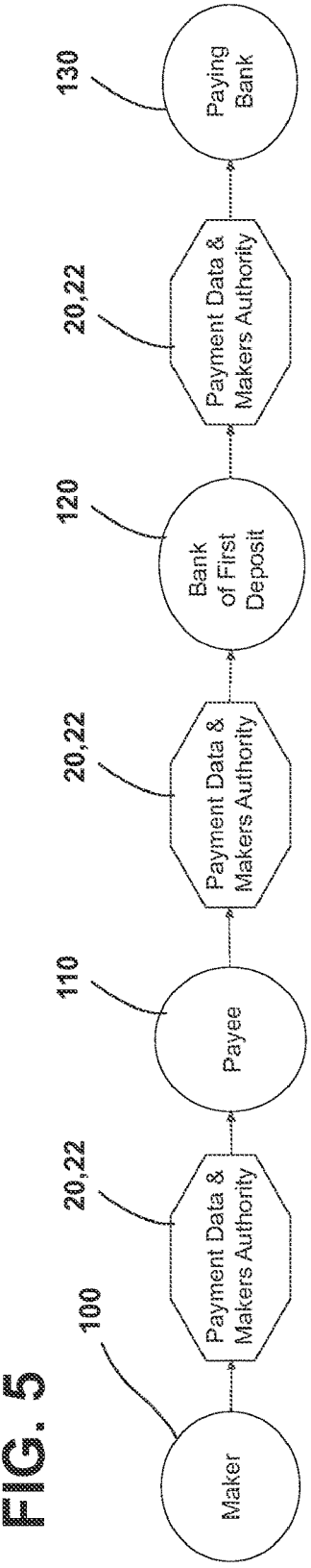
FIG. 6 is an exemplary flowchart in which the payee and the bank of first deposit have both forwarded the payment data and maker's authority of the financial transaction generated by the maker to continue processing the financial transaction according to the invention.

FIG. 6 shows another example of the method 10 in which the payee 110 forwards the maker's 100 payment data and authorization 20, 22 to the bank of first deposit 120. Processing continues with the payment data and authorization 20, 22 to the paying bank 130.

FIG. 7 shows an example schematic showing a transaction/data record containing value 20, 22 transmitted from a maker 100 to a payee 110. FIG. 8 shows an example schematic of payment data and maker's conditional authority 20, 22 being transmitted from a maker 100 to a payee 110 in which the payment data and maker's conditional authority 20, 22 can include items such as a maker's identification credential, an amount, the payee, a transaction reference, settlement information, authorization, and maker's consent to print the payment data or convert to a settlement mode of the payee's choice.

FIG. 9 shows another example according to the method 10 of a maker 100 composing and fully authorizing a data record representative of a financial transaction, indicating that the data record contains payment data 20 and the maker's conditional authority 22, transmitting the payment data and maker's conditional authority 20, 22 to a payee 110. The payment data and maker's conditional authority 20, 22 can include maker's identification credential, an amount, a payee, a transaction reference, settlement information, authorization, and maker's consent to print the payment data or to convert to a settlement mode of the payee's choice, to the payee 110.

Figure 10:
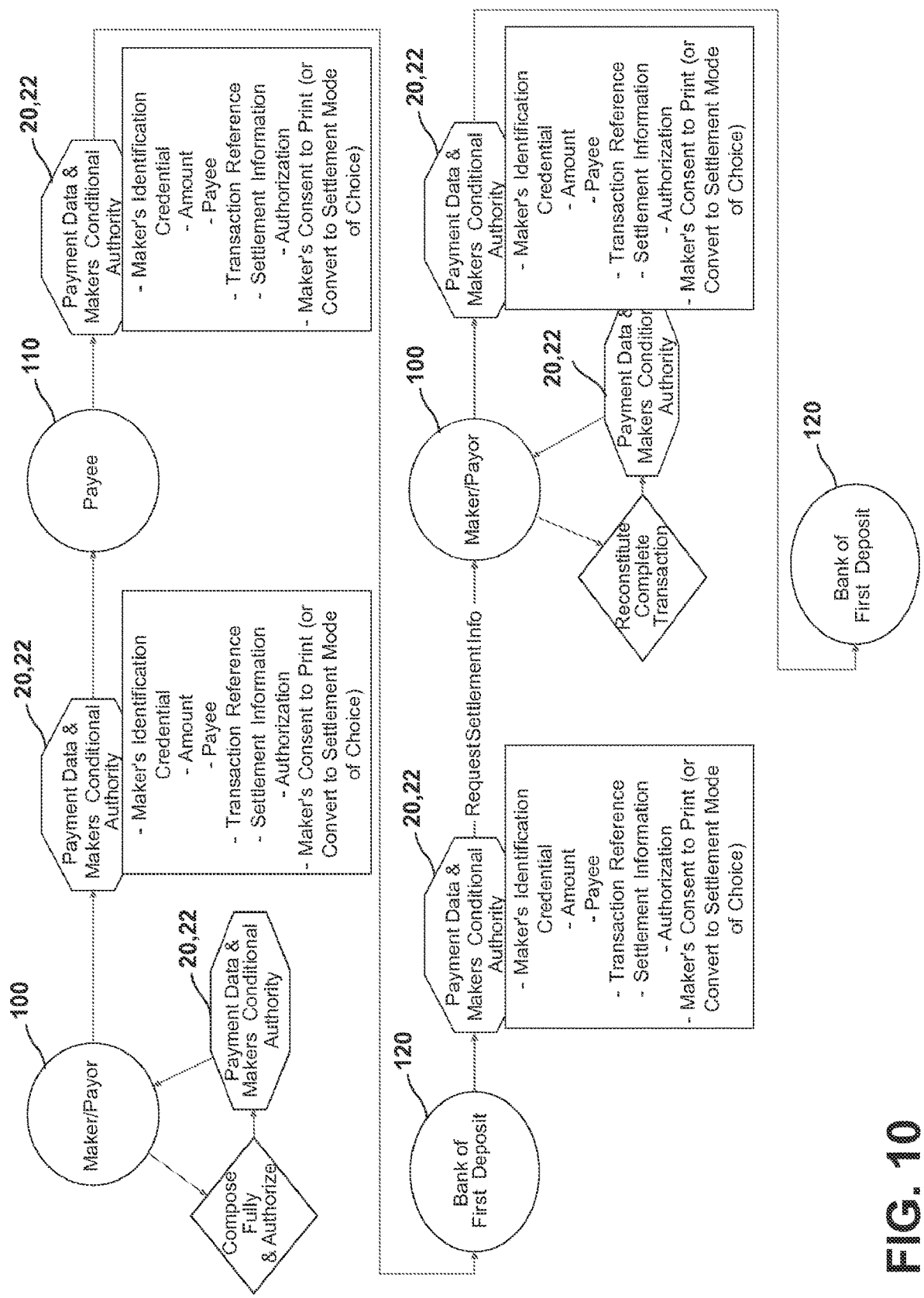
FIG. 10 is an exemplary schematic similar to that shown in FIG. 9 in which the payment data and maker's conditional authority are transmitted from the maker to the payee and then transmitted by the payee to the bank of first deposit when indicating the settlement mode of choice by the payee, and then the bank of first deposit requests settlement information from the maker who re-constitutes the complete transaction and sends the payment data and maker's conditional authority to answer the request for settlement information by the bank of first deposit.

FIG. 10 illustrates a continuation of the example shown in FIG. 9 in which the payment data and authority 20, 22 of the maker 100 are transmitted by the payee 110 to a bank of first deposit 120. In this example, the bank of first deposit 120 contacts the maker 100 and re-routes a request for verification or authorization of the transaction data 20, 22 to the maker 100. Once maker 100 has provided the proper indication to the bank of first deposit 120, processing of the transaction (payment to payee 110) will continue to the paying bank 130 as has been previously described.

Figure 11:
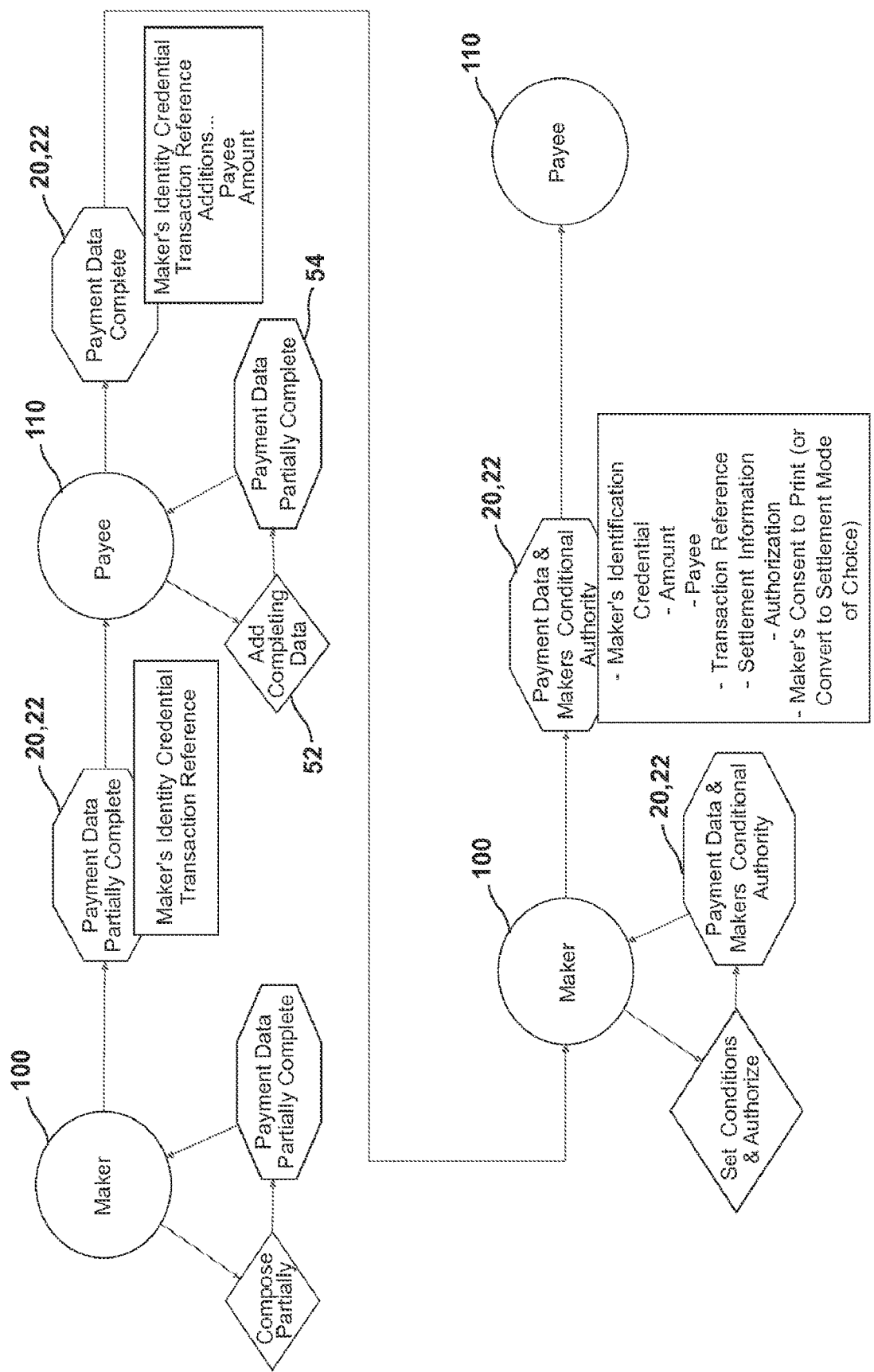
FIG. 11 illustrates another example of the invention of FIGS. 1-10 in which the maker transmits a partially complete set of payment data to the payee, who then adds additional information to the payment record and thus transmits the complete payment record back to the maker who may then set conditions and authorize the transaction, and then the maker retransmits a complete set of payment data in the maker's conditional authority to the payee.
Figure 12:
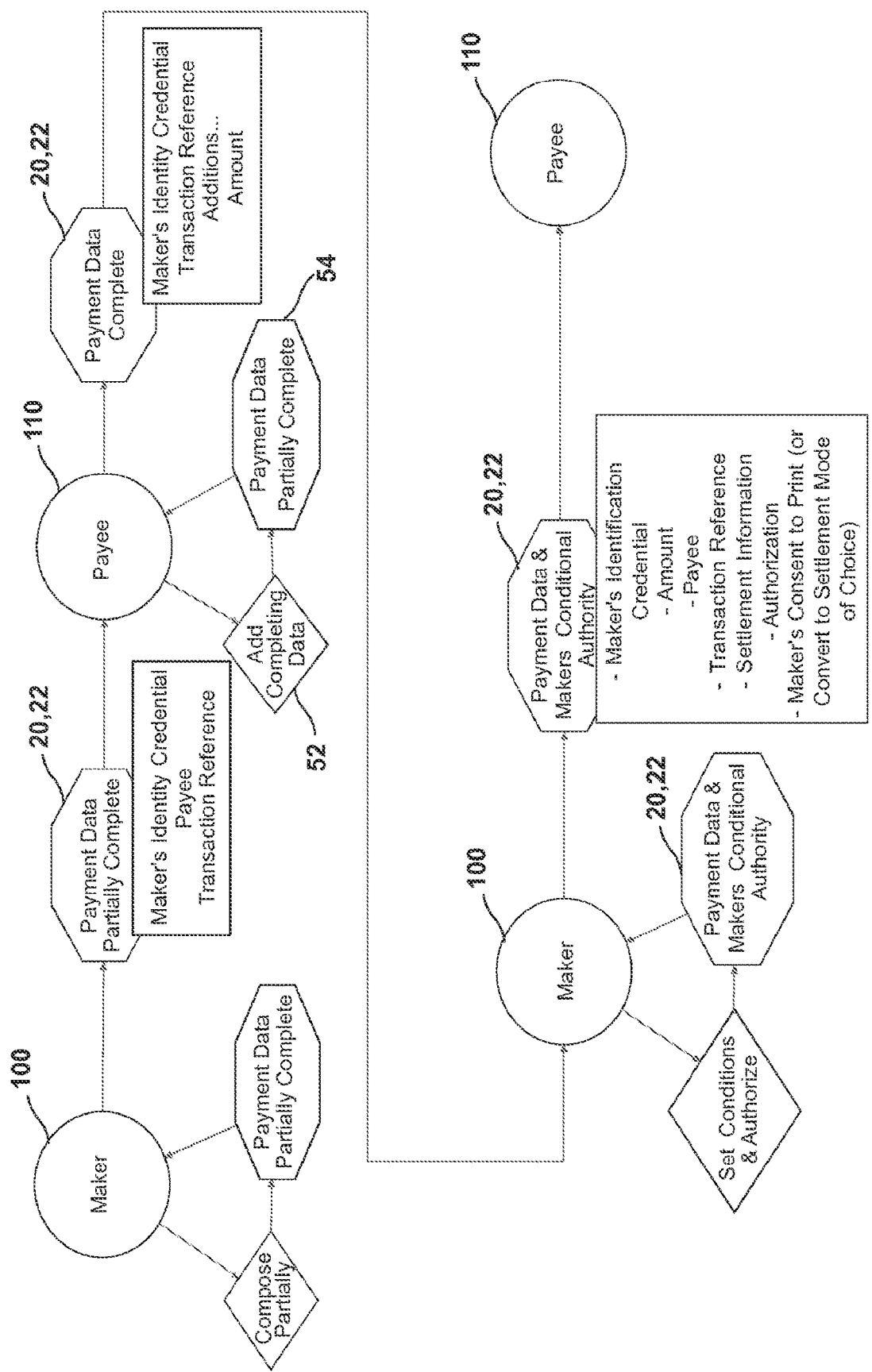
FIG. 12 represents the maker composing a partially complete set of financial transaction information and transmitting the partially-complete set of payment data including the maker's identity credential, the payee, and a transaction reference, to the payee who then adds completing data to create a more-complete set of payment data the maker, wherein the payee retransmits the partially complete set payment data including an amount criterion (or other additional information) back to the maker who sets conditions, authorizes the transaction, and retransmits the payment data and maker's conditional authority to the payee.
Figure 13:
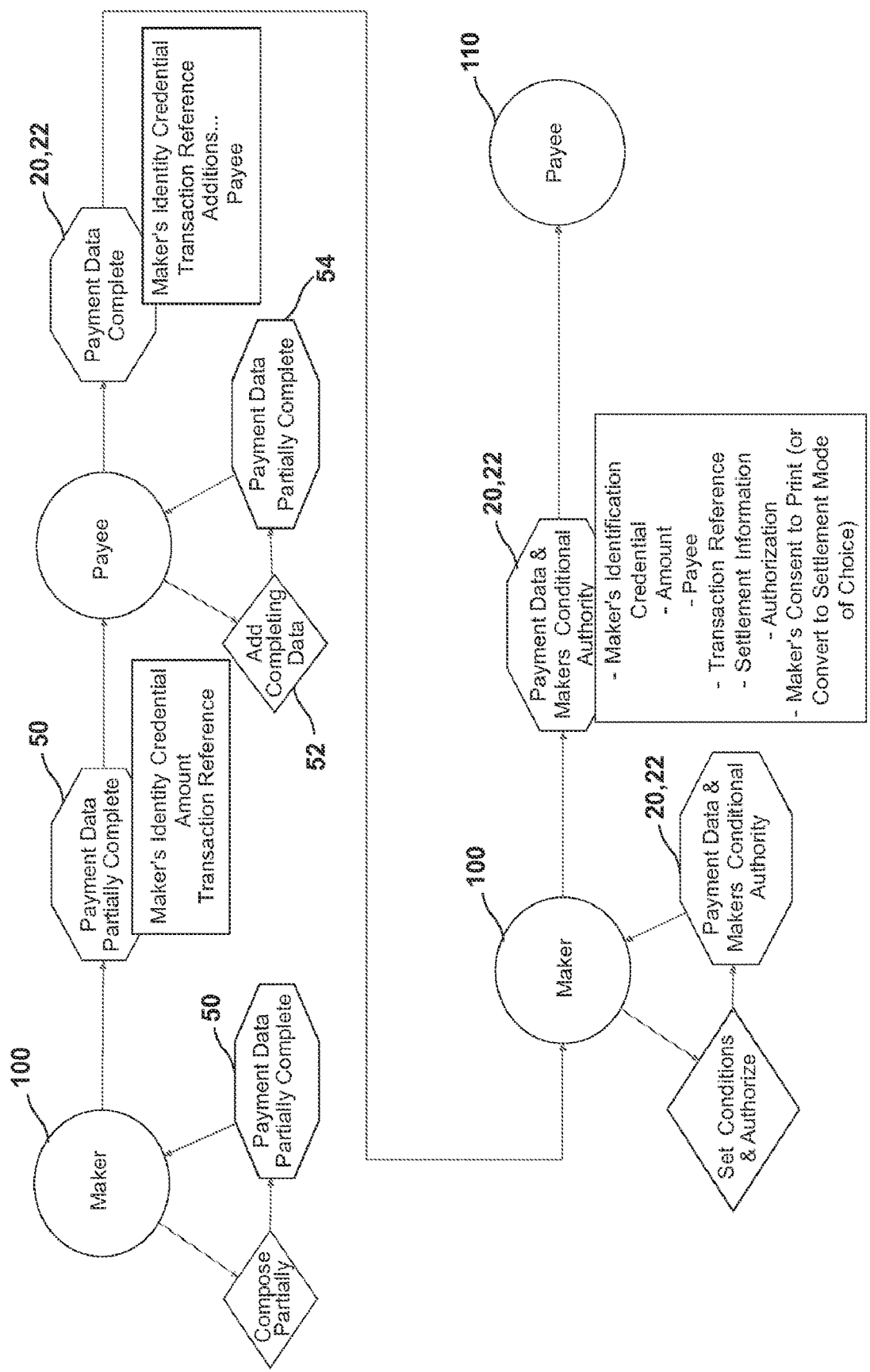
FIG. 13 indicates another example of the partially-complete payment information component of the invention in which the payee adds completing data to a partially complete payment record transmitted from the maker and that the maker pay or adds additional authorization and conditions upon the payment and retransmits a more complete set payment data conditional authority to the payee.

FIGS. 11-13 show examples of the maker 100 transmitting a partially-complete transaction data record 50 to the payee. In each of FIGS. 11-13, the payee 110, upon receipt of the partially-complete transaction 50, provides some completion information 54. In the various embodiments, the completed information 54 is transmitted back to the maker 100. In the example of FIG. 11, the missing information provided by the payee 110 is the payee name and the amount. In the example of FIG. 12, the missing information 54 provided by the payee 110 is the amount of the transaction. In the example of FIG. 13, the missing information 54 provided by the payee 110 is the payee. In any event, the transaction data 20 with the missing information 54 is re-routed back to the maker 100 so that the maker 100 can set optional conditions on, and authorize, the transaction. The maker 100 can then re-transmit the completed payment record and authority 20, 22 back to the payee 110, and processing continues as illustrated with respect to any of the previous examples in FIGS. 3-10.

Figure 14:
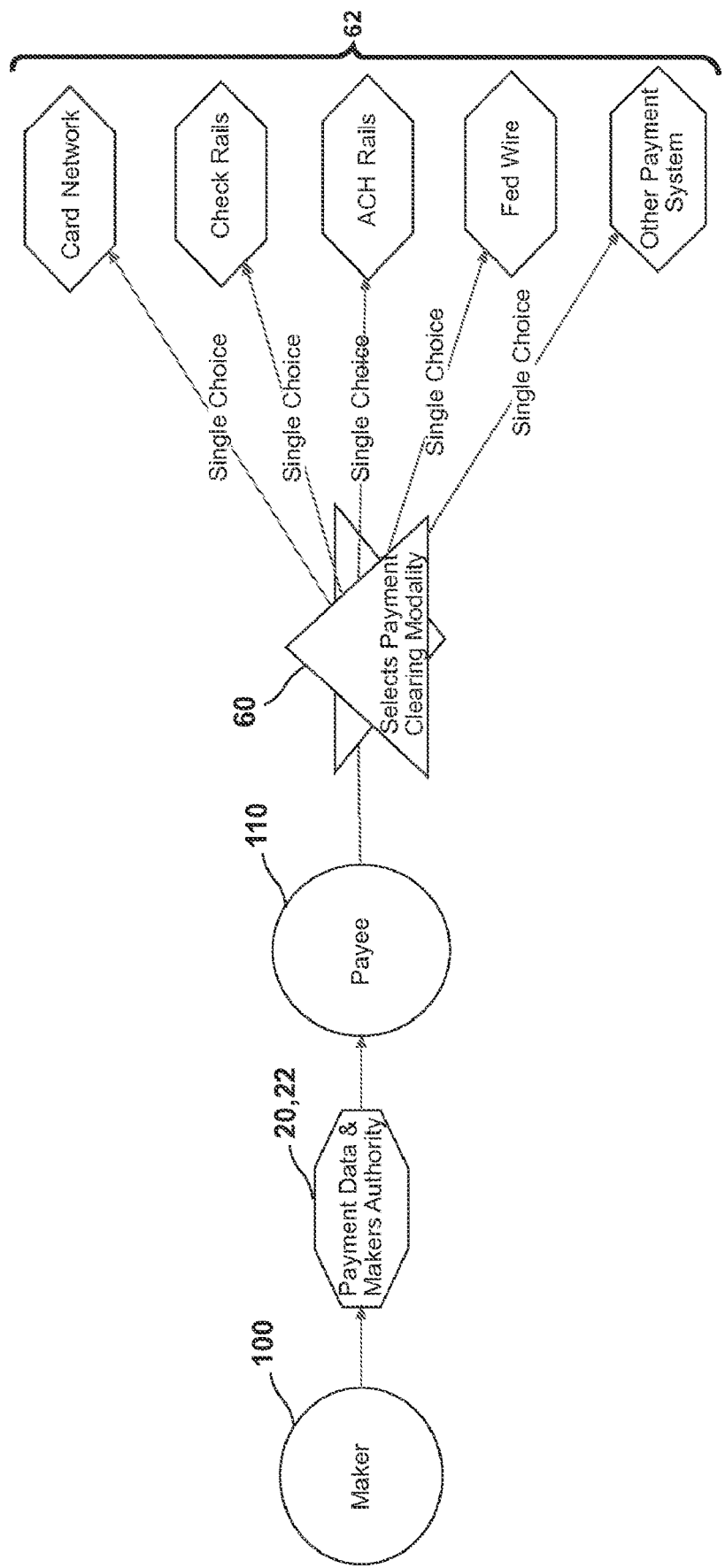
FIG. 14 indicates another example of the system and method according to the invention, in which the maker can set a range of payment settlement types, which can thereafter be elected by the payee.
Figure 15:
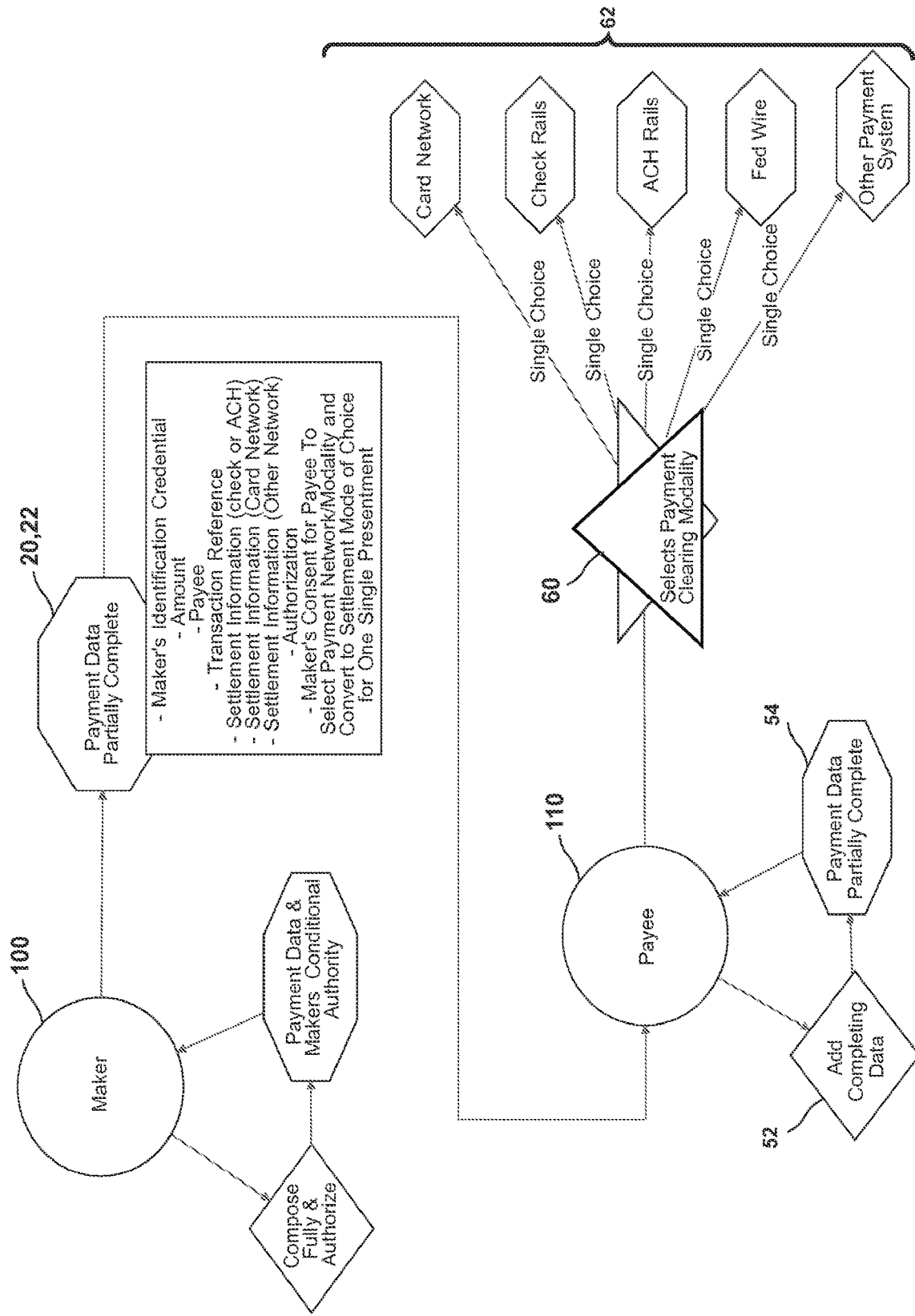
FIG. 15 shows an alternative example of the method shown in FIG. 14 in which the maker can send a partially-complete transaction record to a payee who can thereafter select from a number of payment settlement options.
Figure 16:
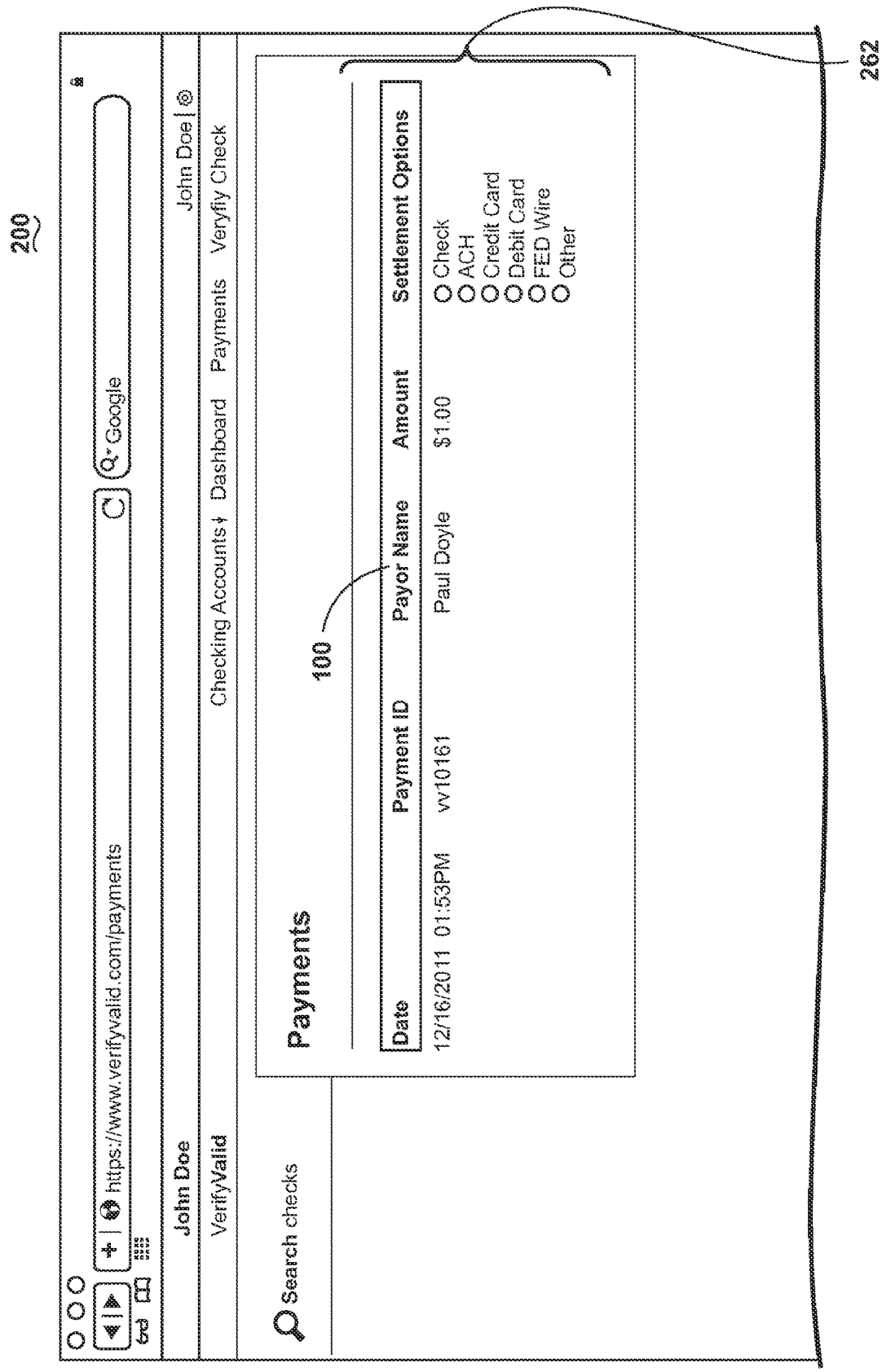
FIG. 16 is an example screenshot for the web interface of FIGS. 3A-3P showing a selection area for the payment settlement types set forth in FIGS. 14-15.

FIGS. 14-16 show another feature of the invention by which the maker 100 can set a number of payment settlement types for the payee 110. Then, after receipt of the transaction, the payee 110 can select from the number of payment settlement types to determine how the transaction will be cleared. For example, turning to FIG. 14, the method 10 is shown where the maker 100 creates a payment data record and authorization 20, 22 and transmits them to the payee 110. Then payee then is presented with a choice 60 among of a number of payment settlement types 62 selected by the maker 100. The payee 110 can then control the form of payment settlement, i.e., including but not limited to a credit card network transaction, a check transaction, an automated clearinghouse (ACH) transaction, a wire transfer, or another payment system. FIG. 15 shows an alternative embodiment whereby the maker 100 transmits a partially complete transaction 50 to the payee 110 which includes, for example, an amount, a payee, a transaction reference, an authorization, a maker's consent to select the final payment modality from a number of modalities 62 presented in the partially-complete transaction. The payee 110 then makes the final payment modality selection 60 from the various options determined by the maker 110 (or provided as a number of default selections). FIG. 16 shows an additional portion of the interface 200 shown in FIGS. 3A-3P wherein the payment settlement modality selections 62 are set out in a list 262 for the user.

The system and method 10 will allow the maker 100 of a payment or transaction to designate a payee 110 and all or a portion of the criteria needed to finally settle the transaction. For example, an amount and a payee could be provided (or only the amount of the transaction and a subsequent holder of the transaction could later determine the payee 110) with a range of settlement options (check, ACH, card network whether credit or debt, federal wire transfer, or some other settlement system) such that the payee 110 or a subsequent holder decides which of the clearing and settlement methods 62, 262 they would prefer to use. The maker 100 sets the value and can thereafter become indifferent as to which method the payee 110 selects, provided the payment is presented for clearing and settlement only once. The payee 110 can determine the settlement that they prefer, based on price or other criteria. The payee 110 could cause the settlement to be bid for by the various final settlement options.

The method 10, as described with respect to any of the examples in FIGS. 3-10, includes an instance where the maker 100 identifies themselves (e.g. a customer loyalty card/token) to a payee 110 (e.g. retail merchant) and the merchant assembles the bulk of the information with the final step being the maker 100 approving the check (transaction/payment) at the point of sale. Either the maker 100 or the payee 110 could send a communication/message to the other (including via an email address or text message) indicating that they want to perform a payment (give or receive) whereby the two parties could exchange the elements via the initial or an alternate communication channel or they could meet at a third-party service to work to complete all the steps which is not final and official until the maker 100 signifies approval and evidences same via a signature.

The service could be performed via multiple communication channels. The payee or maker could for example initiate via a web or email interface that causes the other party to be contacted via another channel such as receiving a telephone call on their POTS, IP or cellular phone and the process completed by means of oral/verbal interaction with the other party directly or through a 3rd party service 140. A business or individual wishing to pay another party (pay a bill or invoice) sends the other party a check via this method. A business or individual wishing to be paid for requests a payment via this method.

A first example is that a business wants to pay a bill or invoice to another party, vendor, employee, etc. and performs all the steps of compositing a check as a digital item/object and sends this to the other party via the communication network, thereby avoiding the costly, inefficient steps of printing a physical document, putting it in an envelope, supplying postage, depositing it with a courier or the US Mail, etc. Another example is a private party to private party transaction: it is often the case in youth athletics that team members have to pay for things like tournaments, or uniforms, etc. and they may have to pay an intermediary like the team manager. This method would allow for the manager to collect payments via checks either remotely or in person and could forward them on to the final party such as the tournament director or uniform vendor.

Yet another example is a private party to merchant transaction where a shopper in a retail grocery store could proceed to checkout with their selected items, and identify themselves to the store via the method of choice (including their customer loyalty card) and their purchase could be processed as a check for payment without using the credit network but with all the conveniences of credit/debit cards.

A further example is a private party through an intermediary (their child) to a business/merchant transaction. Parents of college age children are often asked for money by their kids for emergencies or for supplies. By this method, the parent could authorize a purchase being made by their child, remotely, in real-time (at the book store or the auto repair shop, etc.) without needing to give their kids a credit card or cash.

Yet another example is a private party to private party where often organizations run fund-raisers (boy scouts and popcorn, girl scouts and cookies, etc.) and they go door to door. When they make these sales they often are given cash (which is dangerous and hard to manage for some) or physical checks. This method could allow the orders to be taken remotely (via email or phone) and the payments collected electronically without the need for credit/debit card capabilities. In another example, a consumer or business to business via the web where individuals and businesses that shop and make purchases via a website could pay via a check where they would otherwise ordinarily only have the option to pay via a credit card.

As a final example, parents are often asked to pay for miscellaneous items/activities for their children (field trips, supplies, special events, etc.) and they could pay via this method without risking giving their child a payment to deliver to school that may be lost in-route.

As highlighted in the examples of usage above, there are several advantages to the disclosed method 10, in that it does not require a piece of paper (a physical paper check) be generated at all but it can be converted (printed) into paper if desired by a party in the process. Therefore, it relieves the maker of the check from the costs and burdens of generating a physical artifact and the burden and costs of conveying a physical item to the payee. Additionally, it can be sent via a communications network to the payee and uses a very well established and legal form of payment in the form of a check. However, it does not suffer from the deficiencies of a conventional check which would need to be fully composited, printed and signed by the maker.

An advantage of the disclosed system and method is that it is fast, efficient, and economical. Furthermore, the transaction can be executed in a highly reliable and secure manner when used in conjunction with other fraud prevention services. The payee can assemble the item (draft check . . . payee, amount, memo, date, etc.) and present it to the maker for them to complete (with their bank routing number, account information check number and evidence of authorization (signature), etc.) and, therefore, presents the advantage of being able to come to agreement, compile information, and complete the transaction in an iterative manner between two parties. As a further advantage, the transaction can be conducted via a 3rd party service which either or both parties use to facilitate and allow for additional efficiencies, accuracy, convenience and speed.

One aspect of the invention is that the maker starts with a need to make a disbursement (payment) and to do so, the maker needs to know the identity of the entity to which they are disbursing and the amount to be disbursed. In current prior art transactions, the disbursing party must determine the final mode by which the payee will receive the payment, including on which set of transactional or institutional rails the transaction will run (i.e., check, ACH, debit card, and the like). In the method contemplated by the invention herein, the maker can allow the disburser to set key elements of the disbursement (most importantly, the payee and amount) and they can allow the final modality of payment to be determined by the payee.

Figure 17:
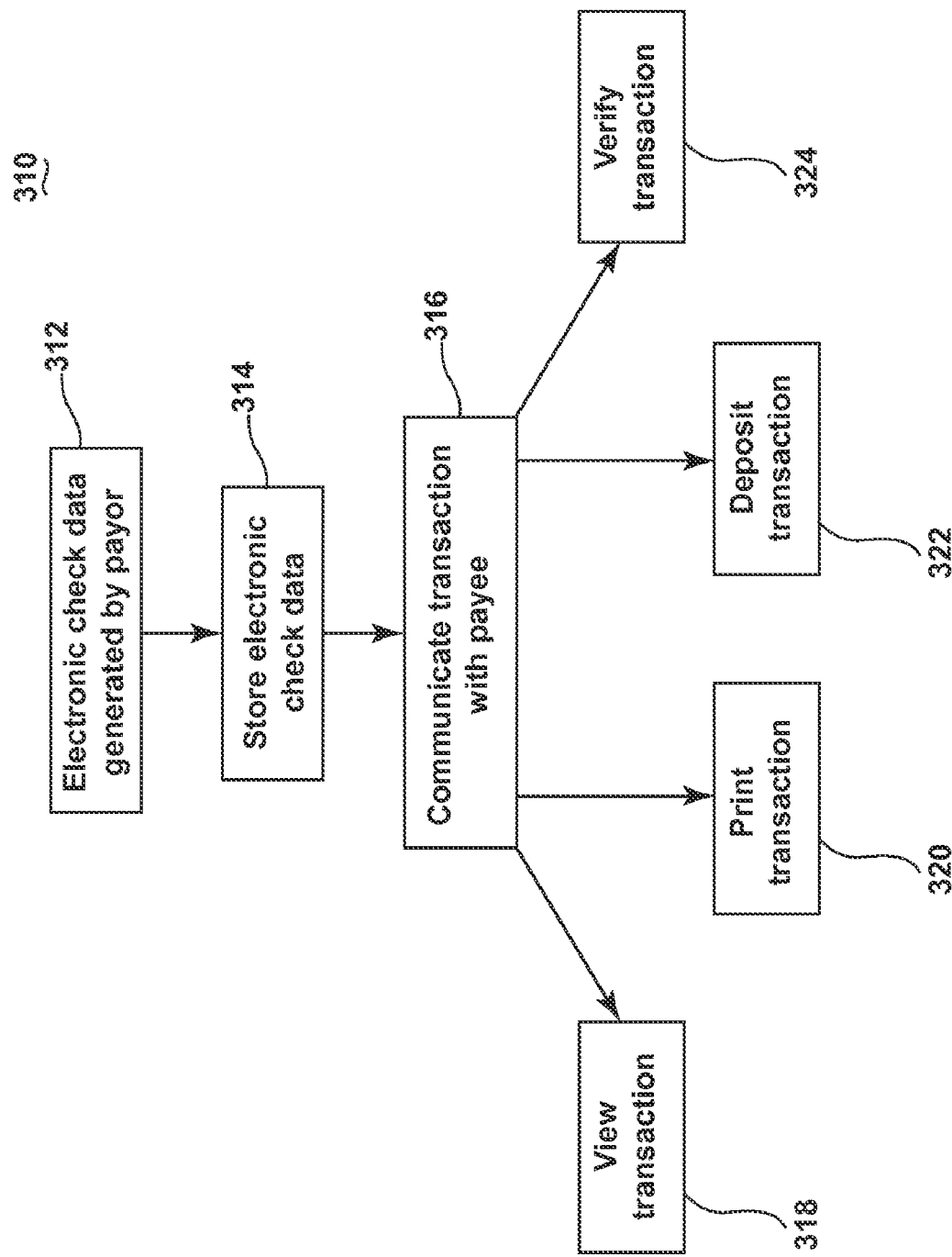
FIG. 17 is a flow chart illustrating a process and system for managing financial transactions based on electronic check data according to an embodiment of the invention.

The embodiments of the invention relate to systems and methods for managing financial transactions based on electronic check data between a payor to a payee. The systems and methods described herein can be used to transmit a check-type payment between a payor and a payee using a third-party service. As used herein, a check-type payment refers to both a physical, printed check item and an electronic representation of a check which may or may not ever be printed as a physical check item. A check as used herein refers to a draft, payable on demand, and drawn on a bank. Referring now to FIG. 17, a process and system for managing financial transactions 310 based on electronic check data is illustrated. The process and system 310 can be provided by a third-party service for use by the payor for transmitting a check-type payment to a payee. While the process and system 310 is described in the context of being provided by a third-party service that is separate from the payor or the payee's financial institution, it will be understood that the process and system 310 can also be implemented by a financial institution.

The process and system 310 assumes that the payor is registered with the system and has provided at least one bank account from which funds can be drawn by a check-type payment process. The originating electronic check data for each transaction can be generated by a payor at 312 and stored at 314 by the system. Generating the electronic check data for a transaction can be considered a request from the payor to the system for a check-type payment. At least a portion of the originating electronic check data generated at 312 is based on information provided by the payor. Such information is similar to the information typically provided on a physical, paper check and can include information such as the name of the payee, the date the electronic check data is generated, check number, payor bank account and routing number, an amount, payor signature and/or payor identification, for example. Some information, such as the amount, for example, may be provided by the payee at a later step in the process. The system 310 can generate a unique identifier that is associated with the stored check-type payment information.

The originating electronic check data can be electronically communicated with a payee as a transaction or payment notice at 316. The payee can view the transaction at 318, print the transaction in a format suitable for presenting to a bank of first deposit at 320 and/or format the transaction for electronic deposit with a bank of first deposit at 322. The deposit process at 322 can include receiving a request to a selected deposit account through the system 310 and generating a depositable item based on the check-type payment information and the payor's bank account information that the payee can use to deposit the check-type payment. At 324, the payee and/or the bank of first deposit can verify that the electronic check data associated with the transaction matches the originating electronic check data stored at 314.

Figure 18:
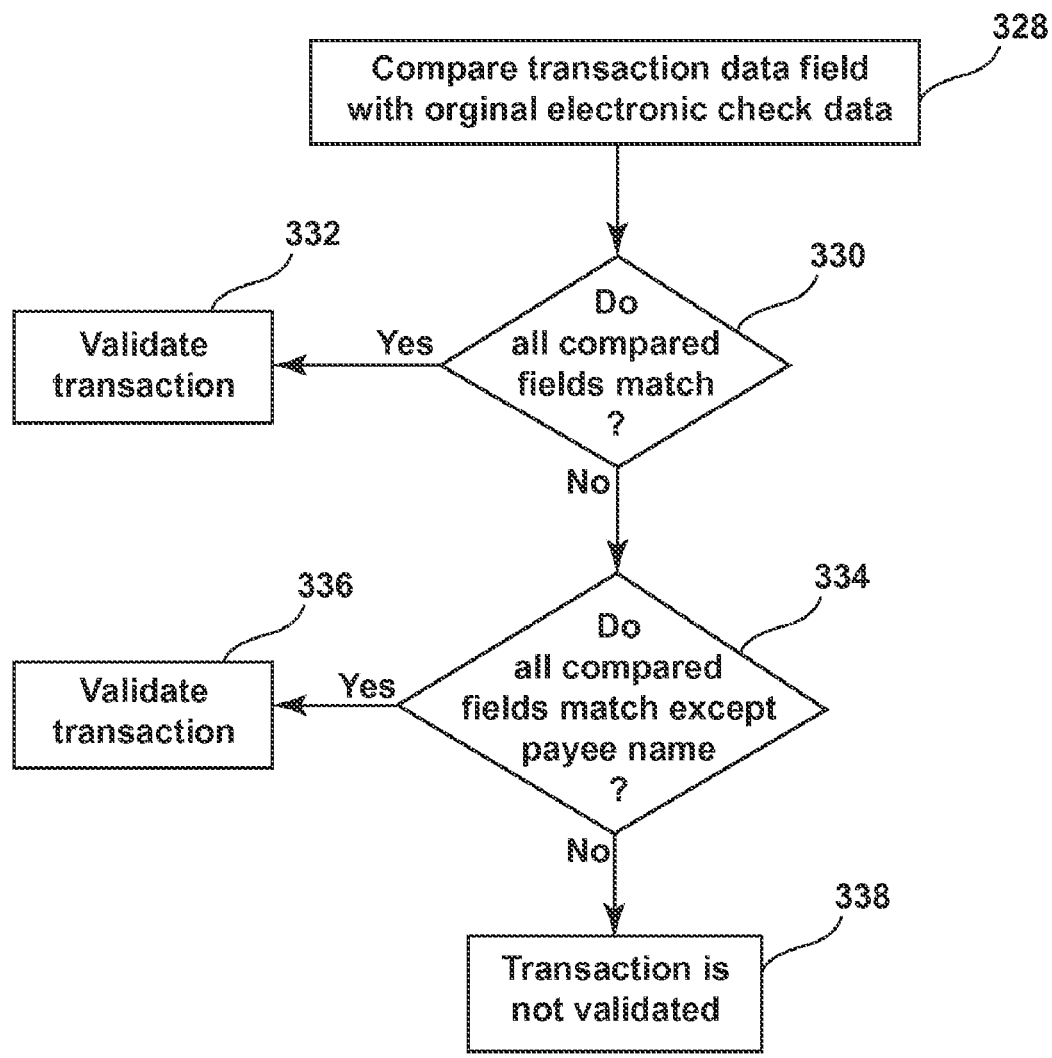
FIG. 18 is a flowchart illustrating a transaction verification process according to an embodiment of the invention.

FIG. 18 illustrates a transaction verification process 326 that can be used at step 324 as part of the transaction management process 310 for verifying a transaction associated with electronic check data. The sequence of steps depicted for this process and the subsequent processes are for illustrative purposes only, and are not meant to limit any of the processes in any way as it is understood that the steps may proceed in a different logical order or additional or intervening steps may be included without detracting from the invention.

At 328, one or more data fields associated with the transaction can be compared with one or more data fields associated with the originating electronic check data stored at 314. At 330, it can be determined whether all of the data fields compared at 328 match; if all of the compared data fields match, it can be determined at 332 the transaction is valid. If it is determined that one or more of the compared data fields do not match, at 334 it can be determined whether all of the compared fields match except for payee name. If all of the compared fields match except payee name, it can be determined that the transaction is valid at 336; if fields other than or in addition to payee name do not match, it can be determined at 338 that the transaction is not valid.

One of the most common data fields to be mistakenly entered without ill intent is the payee name. For example, the payee may be "Dr. Smith," but the user may incorrectly enter "Mr. Smith." In another example, the payee may be "Jonathon Doe," but the user may enter "Jon Doe." The transaction verification process 326 can be configured to verify all of the remaining data fields and notify the user that all of the compared data fields were verified except for the payee. However, because changing the payee name is one type of fraud, the payee name should also still be verified. The process 326 can further prompt the user to double check the payee name as entered and can further prompt the user with additional checks such as checking spelling, title or nicknames, for example. If the payee name cannot be verified, the transaction can be determined at 338 to not be valid and the user can be prompted to take additional action to verify or cancel the transaction.

In one example, determining whether all of the data fields compared at 328 match can include use of a cryptographic fingerprint associated with the electronic check data. The cryptographic fingerprint can be compared to a list of verified, time-stamped fingerprints. The comparison of the cryptographic fingerprint can also be used to verify that the check has not previously been recorded as void or previously accepted by a bank of first deposit or otherwise negotiated in conjunction with a deposit process by a bank or check-cashing service.

The transaction management process 310 and transaction verification process 326 can be implemented locally or remotely by an electronic device provided with software programmed to carry out one or more of the steps of processes 310 and/or 326. Non-limiting examples of an electronic device, include a computer, tablet, phone or laptop. The software can be programmed to provide a graphical user interface (GUI), displayed on the electronic device, to prompt a user to enter information and for communicating information with the user according to the processes 310 and/or 326. The software can also be programmed to automatically download information from a website or a database, for example. The processes 310 and/or 326 can be web-based such that data can be input and shared among different groups such as between a payor and payee, between a payor/payee and one or more financial institutions, such as a bank of first deposit, and/or between different financial institutions, for example. When the software program is located remotely or is browser based, the electronic device can include the appropriate software and hardware to connect the electronic device with a network and/or the internet for accessing the program, as is known in the art. While the GUI is described in the context of a browser-based application, it will be understood that the GUI can be used in a similar manner as part of a locally or remotely run software program.

While the GUI is described in the context of a series of windows, it will be understood that the GUI and the methods described herein are not limited to the sequence of windows illustrated in the figures. It will be understood that the GUI can include appropriate icons, buttons or links for navigation through the application in sequences other than what is illustrated in the figures, and that some windows may be combined or split into multiple windows without deviating from the scope of the invention. As used herein, a window refers to a visual area containing the GUI which displays output to a user and/or allows a user to provide input to the application.

Figure 19:
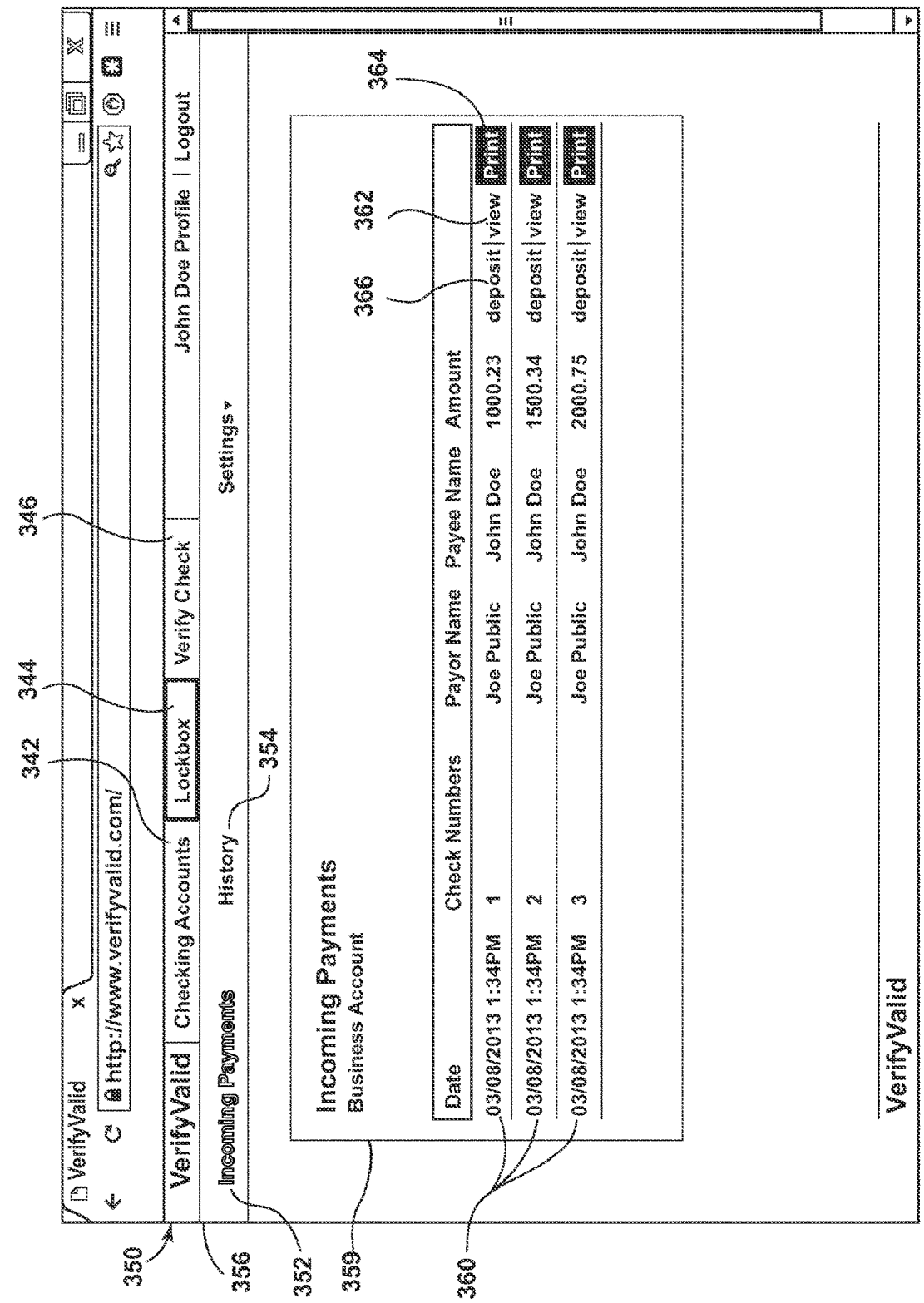
FIG. 19 illustrate a user interface incoming payments transaction management window according to an embodiment of the invention.
Figure 20:
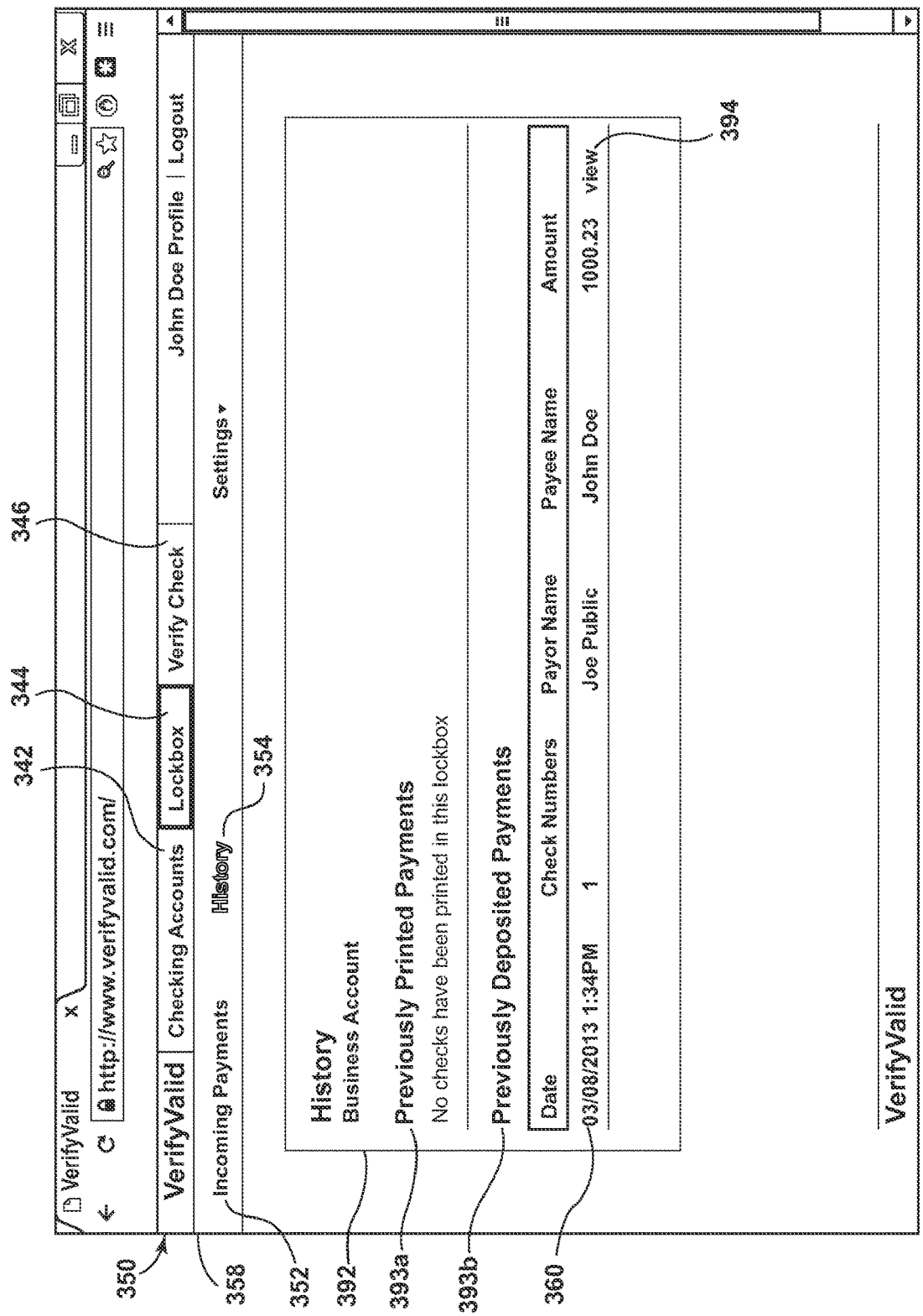
FIG. 20 illustrates a user interface history transaction management window according to an embodiment of the invention.

FIGS. 19 and 20 illustrate an exemplary graphical user interface (GUI) for managing check-type transactions based on electronic check data according to the process 310. The GUI can include navigation tabs 342, 344, and 346 for navigating between available features of the system. When a Lockboxes tab 344 is selected, a transaction management window 350 is displayed, as illustrated in FIGS. 19 and 20. The transaction management window 350 includes selectable icons 352 and 354 to navigate between an incoming payments window 356 (FIG. 19) and a history window 358 (FIG. 20), respectively. The selectable icons 352 and 354 can be in the form of selectable text (shown), radial buttons, selectable graphics, and/or drop-down menus.

Referring now to FIG. 19, the incoming payments window 356 includes an electronic check data transaction table 359 listing each transaction 360, also referred to as a payment notice, received by the payee and corresponding selectable action icons 362, 364 and 366. Each transaction 360 can be identified by date, transaction number and/or payor information, for example. The selectable action icons include a View icon 362, a Print icon 364 and a Deposit icon 366. The selectable action icons 362, 364 and 366 can be in the form of selectable text, such as illustrated for action icons 362 and 366, or in the form of a selectable graphic, such as the "Print" button of action icon 364, or a selectable radial button or check box, for example.

Figure 21:
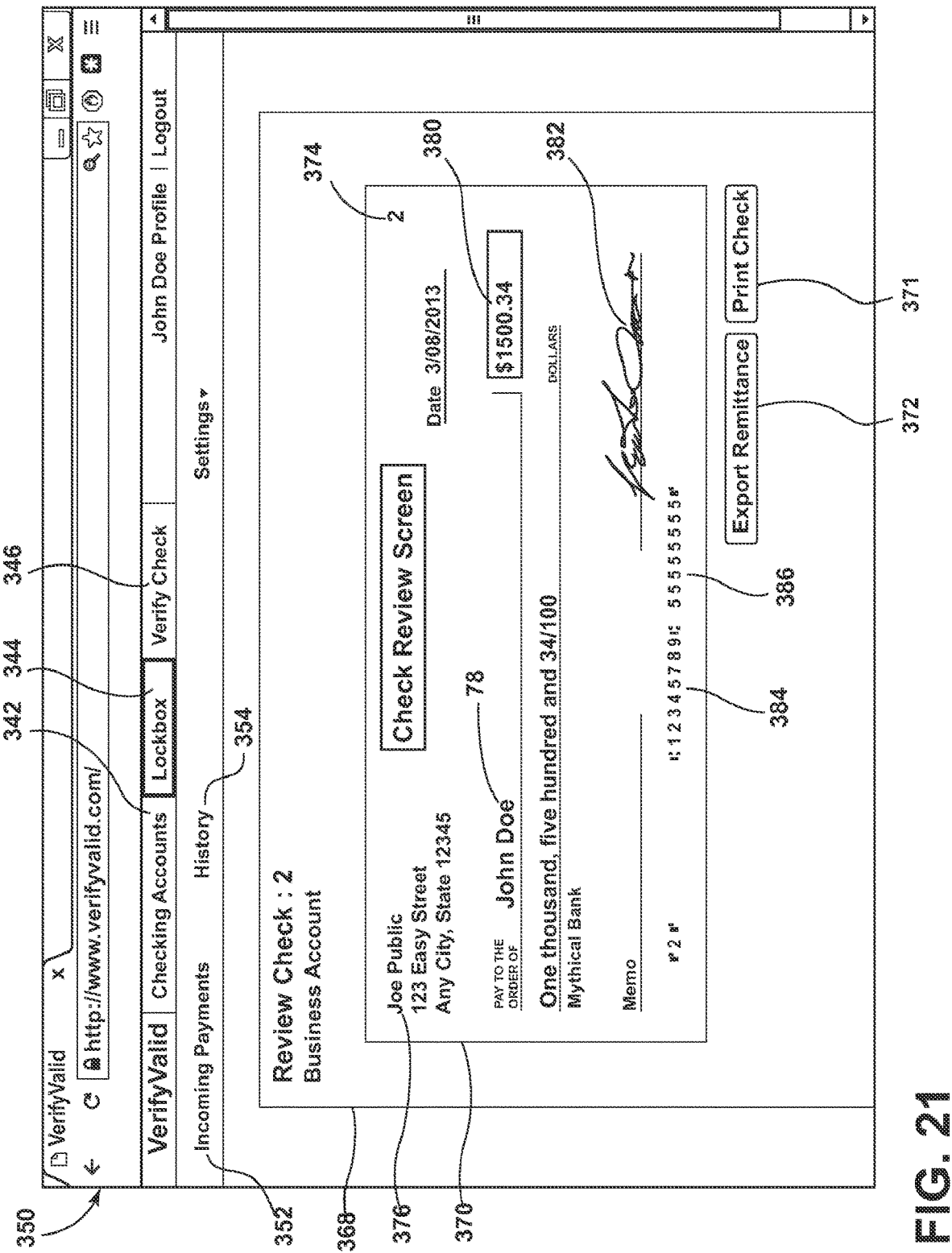
FIG. 21 illustrates a user interface check review window according to an embodiment of the invention.

Referring now to FIG. 21, selecting the Print icon 364 opens a review check window 368 which can be a separate window that is navigated to from the incoming payments window 356 of FIG. 19 or a pop-up window that is displayed over the incoming payments window 356. The review check window 368 can include a check form 370 in which the electronic check data has been used to automatically populate the data fields of the check form, a print check icon 371 and an export remittance icon 372. The print check icon 371 and export remittance icon 372 can be in the form of selectable graphics, such as a button, as illustrated or any other selectable icon, including selectable text, radial buttons, check boxes and/or drop-down menus. While the embodiments of the invention are described in the context of printing a single, individual check, it will be understood that batch printing processes in which more than one check can be printed at a time are also within the scope of the invention.

The electronic check data associated with the transaction can be used to populate all or a portion of the data fields typically found on a check such that the bank of first deposit has enough information to process the transaction. Non-limiting examples of the data fields that can be included on the check 370 include check number 374, payor information 376, payee name 378, amount 380, signature line 382, routing number 384 and account number 386. It will be understood that as banking practices evolve, the data fields necessary for processing of the check 370 may change and that different banks may require additional or different data fields in order to process the check 370. It will also be understood that some information may not be included on the check 370 to avoid providing the payee with access to the information. For example, as described above, some of the data, such as the payor's bank account and routing information can be separated from the remainder of the electronic check data such that the payee does not have access to this sensitive information. However, the separated data remains associated with the electronic check data such that the data is still accessible by financial institutions for use in completing the settlement process for the check-type data.

The user can review the information associated with the check in the check review window 368 prior to printing and decide whether to continue with the printing process. If the user decides to print the check 370, the user can select the print check icon 371.

Figure 22:
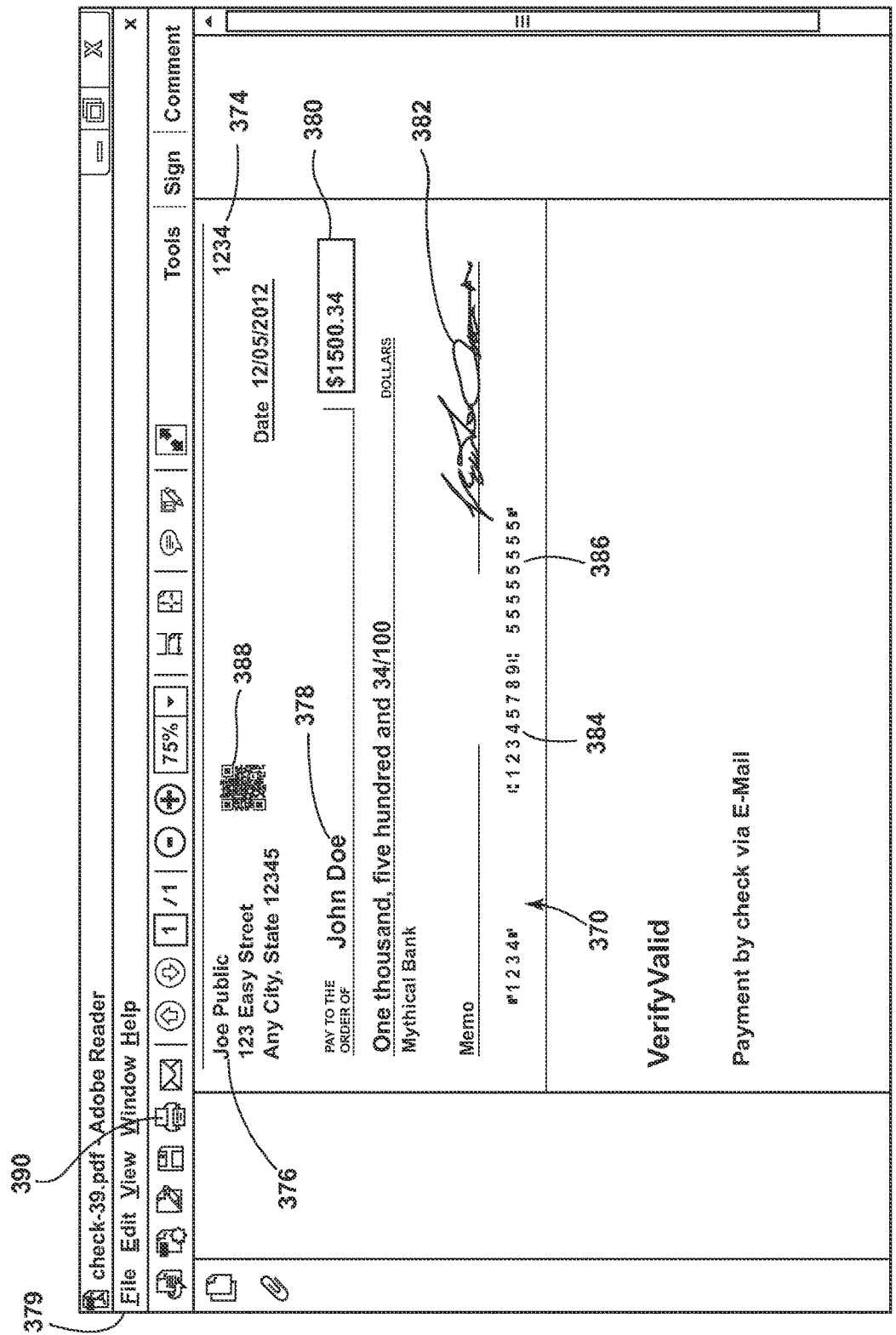
FIG. 22 illustrates a user interface print window according to an embodiment of the invention.

Referring now to FIG. 22, selecting the print check icon 371 opens a print window 379 which displays the check 370 in a format that is suitable for printing and presenting to a bank of first deposit, such as a check 370. The check 370 can be displayed within any suitable program capable of displaying and printing image and/or text data. In the exemplary print window 379 of FIG. 22, the check 370 is displayed as a PDF file (Portable Document Format) in Adobe Reader. The PDF file format can be used to represent documents in a manner independent of application software, hardware and operating system and encapsulates a complete description of a fixed-layout flat document, including the text, fonts, graphics, and other information needed to display it. Alternatively, the check 370 can be displayed in an image file format that can be viewed and printed in a suitable image viewer program, such as XPS, for example, or any other format suitable for printing.

As illustrated in FIG. 22, when the check 370 is provided in a printable format, a scannable code 388, such as a QR code, can be included on the check for printing with the check 370. As will be described in more detail below, the scannable code 388 can be a code that a payee can scan to direct the payee to a website where the payee can verify the electronic check data.

Still referring to FIG. 22, the payee can make the appropriate selections within the print window 379 to print the check 370. In the exemplary window 379 in Adobe Reader, the payee can select the printer icon 390 or select File>Print, as is known in the art. The software program supporting the print window 370 can be programmed to only allow the check 370 to be printed once. For example, the software program supporting the print window 379 can include digital rights management software to allow for only a single printing of the check 370. A confirmation window (not shown) can appear when the payee select the print option that prompts the payee to confirm that the check 370 was indeed printed as a paper check at the selected printer. The check 370 can be printed such that the printed document calls to the user's attention that the document includes a physical check for deposit. For example, the printed document can include warning text or the check 370 can be printed upside down at the top of the document to draw the user's attention to the check 370. In addition, the check 370 can be printed along the edge of the paper to improve the reliability of aligning a magnetic ink character recognition (MICR) line, for example, according to x9.100-160, such that the payee does not have to worry about inadvertently damaging the MICR line when separating the check 370 from the remainder of the page. In another example, the software program supporting the print window 379 can be programmed to immediately print the check 370 or to save it locally.

Once a check 370 has been printed for a given transaction 360, the Print icon 364 and the Deposit icon 366 corresponding to the transaction 360 in the transaction table 359 of the incoming payments window 356 can be disabled such that it is no longer selectable (e.g. grayed out) and/or removed the incoming payments window 356. This will indicate to the payee that a paper copy of the check 370 for that transaction has already been printed. The Deposit icon 366 can also be disabled so as to prevent duplicate deposit of the same check by electronically depositing a check and depositing a printed version of the same check. As will be described in more detail below with reference to the history window 358 FIG. 20, once a check for a given transaction 360 has been printed or deposited, the transaction is listed in the history window 358 and may optionally be removed from the incoming payments window 356.

Still referring to FIG. 22, the scannable code 388 can be used by the payee to verify that the field data of the check 370 matches the original electronic check data corresponding to the transaction. In this manner the payee can verify that none of the electronic check data from the original transaction was lost or altered, which can minimize fraud and potential processing errors.

Figure 23:
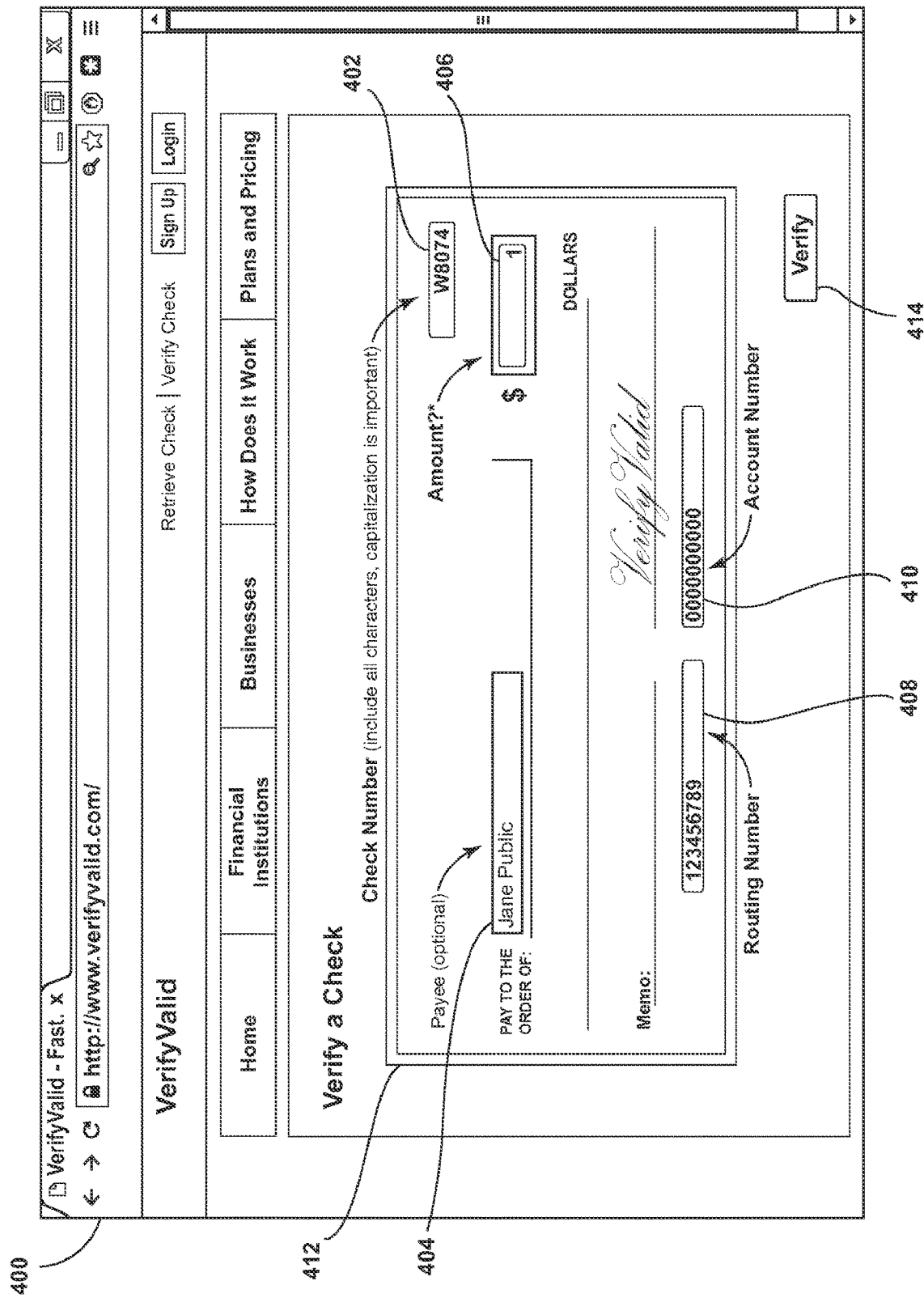

Scanning the QR code 388 directs the payee to a verification window 400, illustrated in FIG. 23, which is part of a verification software program. Alternatively, or in addition, the check 370 can include a website address that directs the payee to a website displaying the verification window 400. The verification program can be part of a software program run locally or remotely on an electronic device having a display, or can be part of an internet browser-based software application. The verification program can be configured to verify a transaction according to the transaction verification process 326 described above with respect to FIG. 18.

The QR code 388 and/or the website address can be unique to that particular check 370 such that scanning the QR code 388 or entering the website address into a browser directs a user to a verification window 400 in which data fields 402-410 for verifying the transaction have been prepopulated with the stored, originating electronic check data corresponding to the transaction identified by the specific QR code 388 or website address. The payee can then compare the information displayed in the verification window 400 to the information on the check 370 to verify that the originating electronic check data for the transaction was not lost or modified prior to printing the check 370. In another example, the QR code 388 can be a unique code such that the electronic check data corresponding to the transaction are looked up on a server, which allows data for verifying the transaction to be stored without having to retain the data associated with the transaction.

Alternatively, the QR code 388 and/or the website address can direct the payee to a generic verification window 400 in which the data fields 402-410 are blank, editable text boxes. The verification window 400 can display a representation of a check 412 with the data fields 402-410 generally corresponding to their typical location on a standard physical check document. Non-limiting examples of data fields that can be used in verification of the check 370 include the check number 402, payee name 404, amount 406, routing number 408 and account number 410. The payee can enter the information from the printed check 370 into the blank data fields 402-410 and select a Verify action button 414 to verify the entered information.

The verification program implementing the transaction verification process 326 can compare the information entered into the data fields 402-410 with the stored, originating electronic check data corresponding to the transaction 334 based on the information entered in one or more data fields 402-410. For example, the verification program can use the number entered in the check number data field 402 to look-up originating electronic check data stored according to check number. The stored originating electronic check data corresponding to the searched check number can be compared with the information entered in one or more of the other data fields 404-410 to determine whether the information entered into the data fields 402-410 from the printed check 370 match the stored originating electronic check data. In addition, or alternatively, a similar comparison can be made for any one of the other data fields 404-410 or a combination of two or more data fields 402-410.

Figure 24:
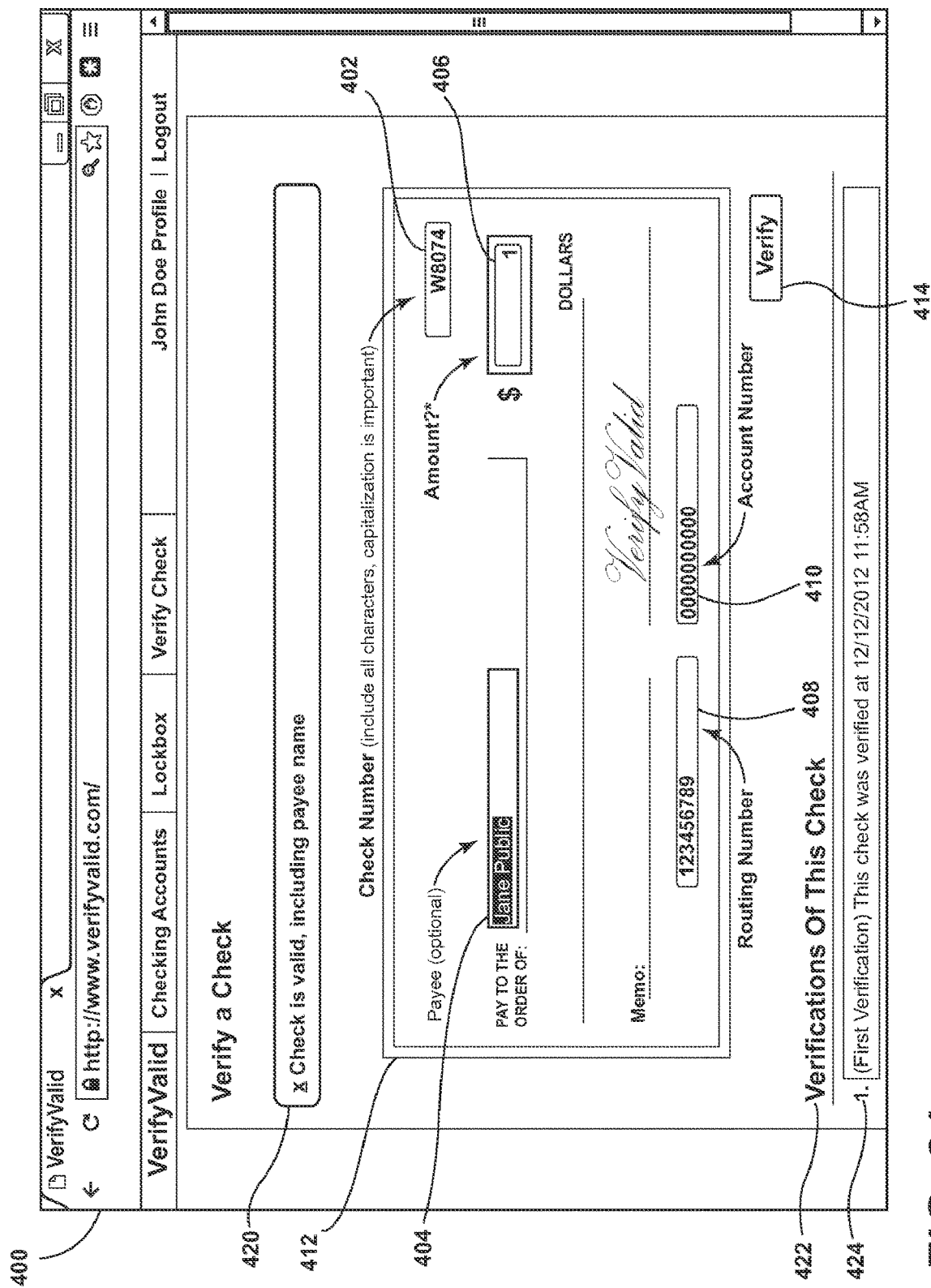

Referring now to FIG. 24, if the verification program determines that the information entered into one or more of the data fields 402-410 match the corresponding stored electronic check data, a verification text box 420 can be displayed in the verification window 400 indicating that the verification program has determined that the check 370 is valid. The verification window 400 can also include a verification log 422 which includes a dated and time stamped entry 424 for each time a verification process for that particular check 370 is performed. The verification log 422 can be configured to show that a verification process has been performed and optionally show the results of the verification process, i.e. verified or not verified.

In another example, the transaction verification process 326 can also additionally, or alternatively, be configured to allow a financial institution to indicate that the check 370 is or has been deposited by the financial institution. This would allow future verifiers, such as a different financial institution to see whether the check 370 has been previously verified and/or deposited by another financial institution. If the check 370 is indicated as already having been deposited by another financial institution, the second financial institution can be alerted that the check 370 is being re-presented at the second financial institution and appropriate action can be taken.

Figure 25:
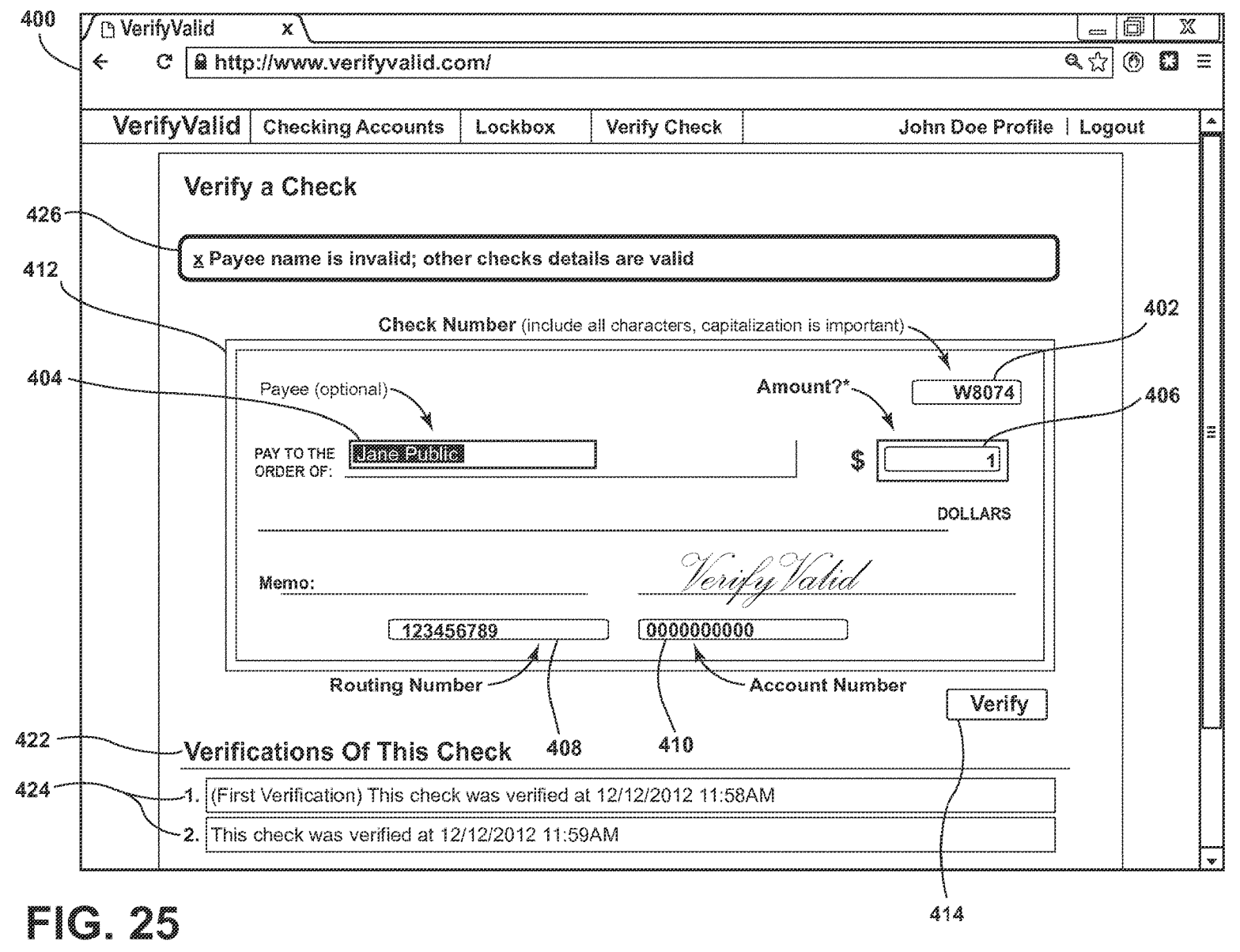

Referring now to FIG. 25, if the verification program determines that the information entered into the payee name data field 404 does not match the stored payee name for the original electronic check data, but that all of the other data fields 402 and 406-410 do match the original electronic check data, a partial verification window 426 can be displayed indicating that the payee name is invalid but that the other remaining check details are valid. It is not uncommon for individuals to be known by different, but valid names or for an individual's name to be unintentionally misspelled. For example, there are some names for which it may be common to be known by a nickname or a shortened version of a formal name (e.g. Robert may be known as Bob or John Smith, III may be known to many as John Smith). If the verification program is too strict in rejecting information as invalid based on the spelling of a payee's name, this could be undesirable for a user. The verification program can optionally be programmed to communicate to the user of the verification program that only the payee's name is invalid and the user of the verification program can decide whether or not the check 370 should be rejected as invalid based on an invalid payee name.

Figure 26:
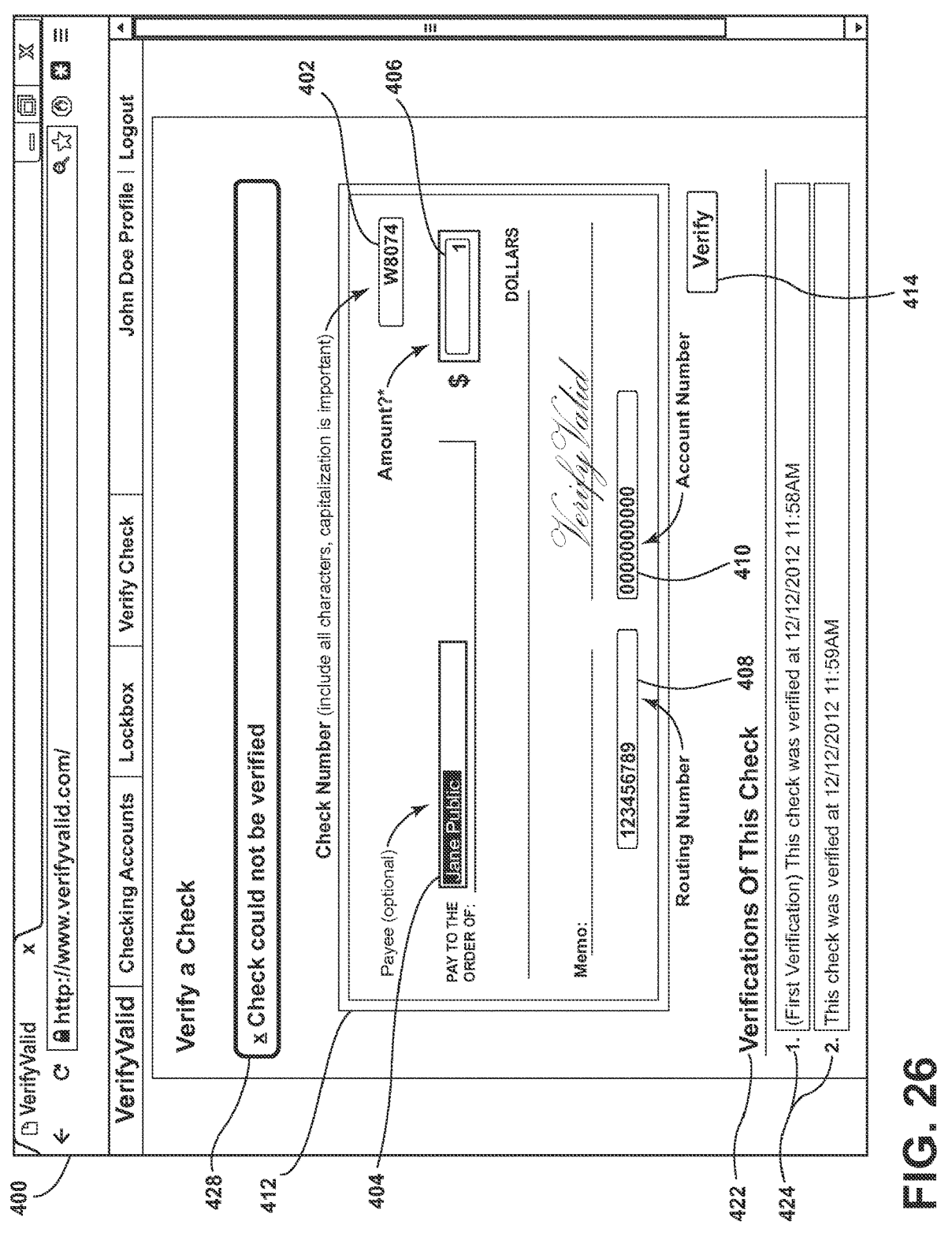

Referring now to FIG. 26, if the verification program determines that the information entered into one or more of the data fields 402-410 does not match the corresponding stored original electronic check data, the verification program can display an invalid check window 428 indicating that the entered information corresponding to the check 370 could not be verified based on the stored original electronic check data.

Figure 27:
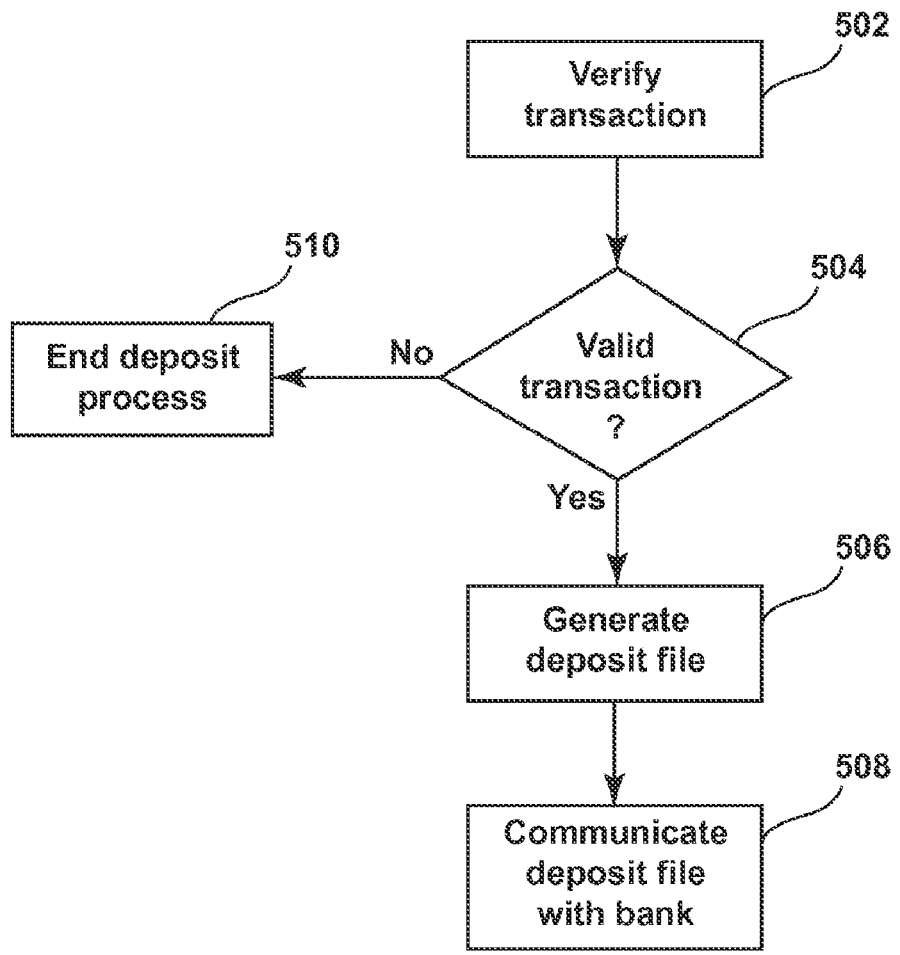
FIG. 27 is a flowchart illustrating a deposit process according to an embodiment of the invention.

FIG. 27 illustrates a deposit process 500 for electronically depositing a transaction with a bank of first deposit which can be used with the transaction management process 310 at step 322. The deposit process 500 can include automatically verifying electronic check data corresponding to a selected transaction at 502 according the transaction verification process 326 described above with respect to FIG. 18. If the verification step 502 determines that the electronic check data is valid at 504, the verified electronic check data can be used to generate a deposit file at 506. At 508 the deposit file generated at 506 can be communicated with a selected bank for depositing. If the verification step 502 determines that the electronic check data is not valid, the deposit process can be ended at 510 and the payee can be notified that the data could not be verified through a suitable error window or the like.

Figure 28A:
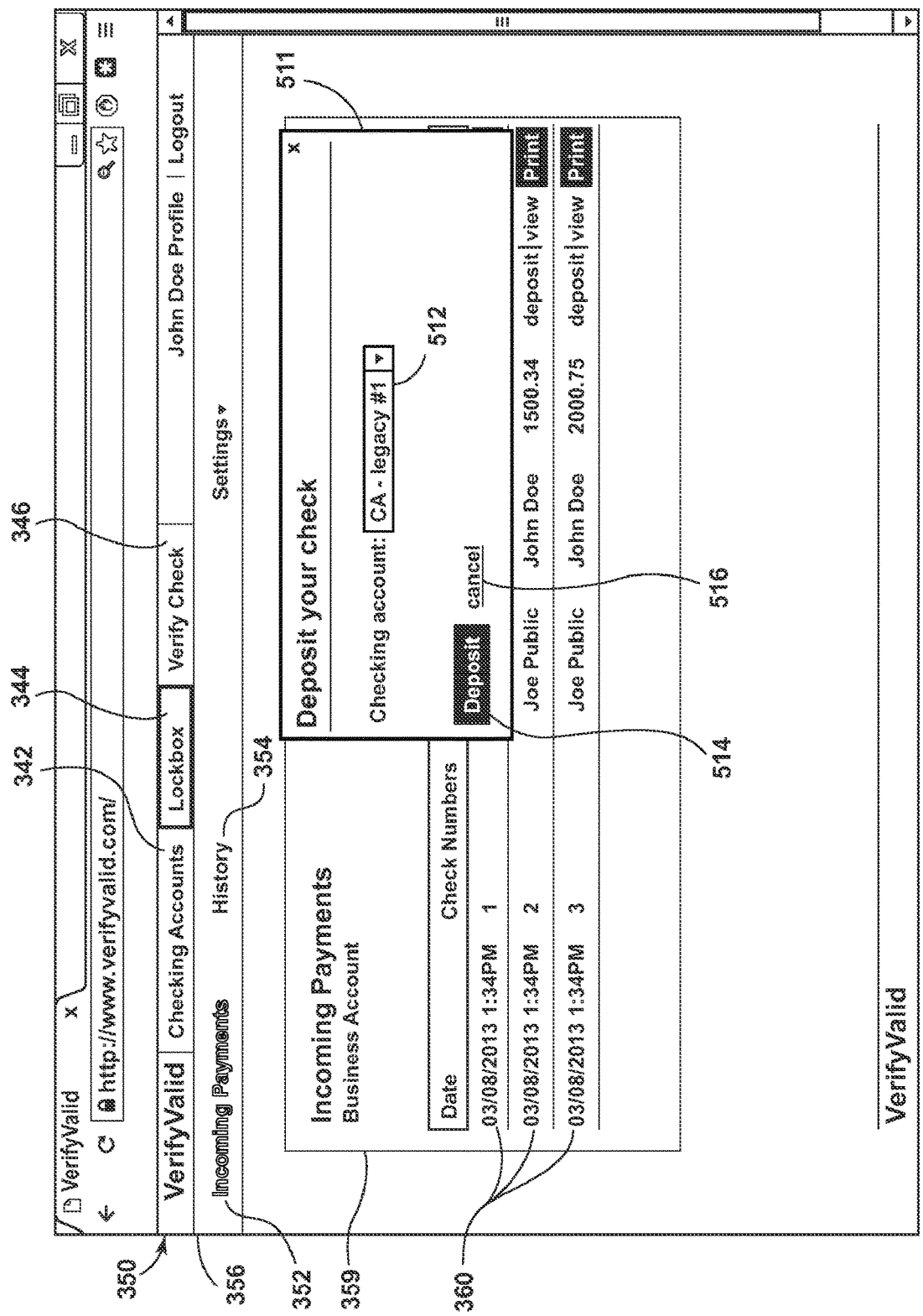
FIGS. 28A-28D illustrate a user interface deposit window according to an embodiment of the invention.

Referring again to FIG. 19, the deposit process 500 can be implemented as part of the transaction management software through the transaction management window 350. A payee can elect to electronically deposit a transaction 360 by selecting the Deposit icon 366 in the electronic check data transaction table 359. Selection of the Deposit icon 366 can open a bank account selection window 511, which can be a separate window navigated to from the incoming payments window 356 (not shown), or a pop-up window overlaying the incoming payments window 356, as illustrated in FIG. 28A. The deposit process can also be programmed to allow batch depositing of multiple items in a single operation.

Referring now to FIG. 28A, the bank account selection window 511 can include an account selection menu 512 which allows a payee to select an account for depositing the selected transaction 360. The account selection menu 512 can be in the form of a drop-down menu, as illustrated, or any other suitable selection format, such as a list of accounts selectable by radial button or check box, or an editable text box, for example. The payee can begin the deposit process for the selected account by selecting a deposit icon 514, or cancel the process by selecting the cancel icon 516.

Figure 28B:
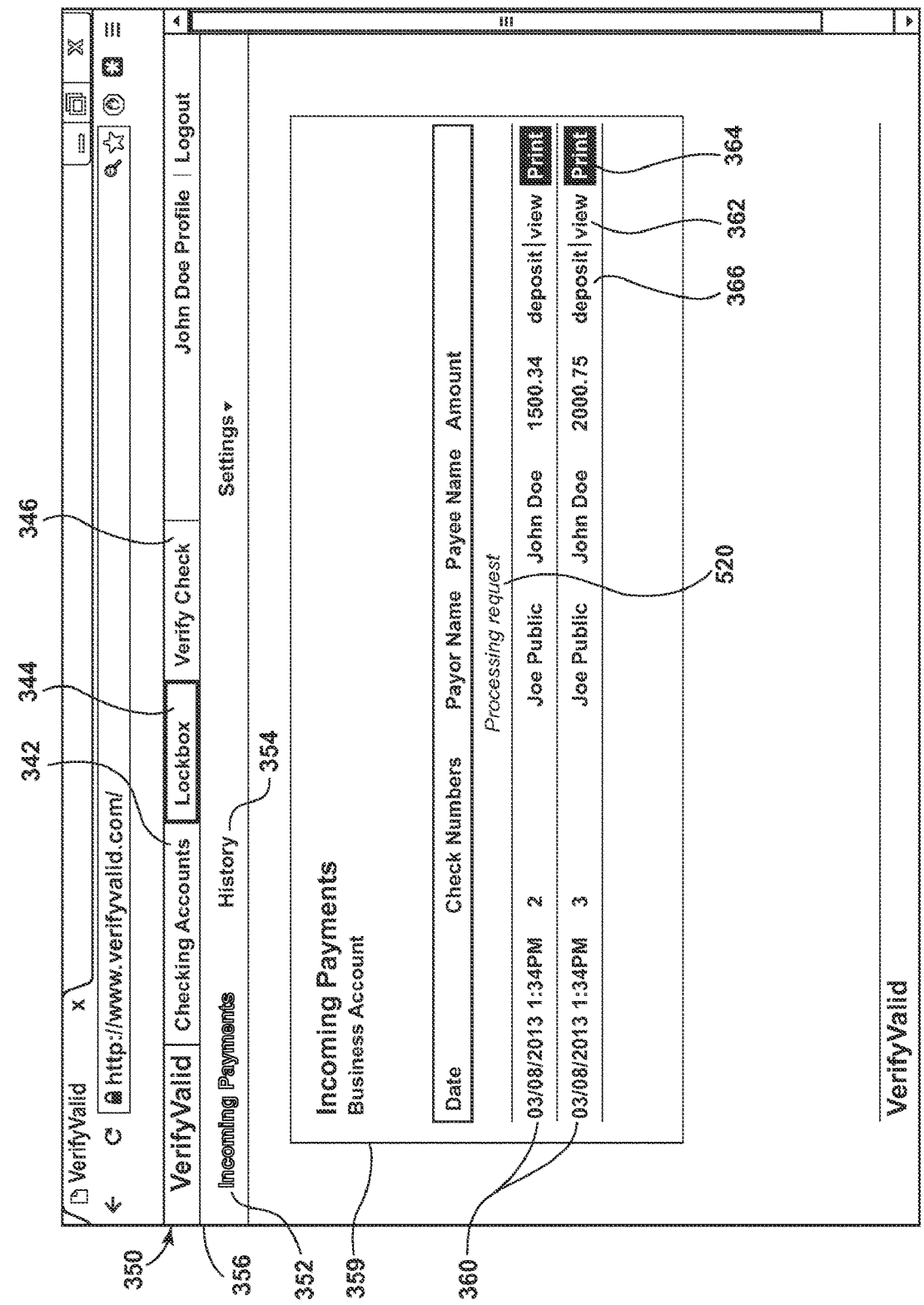
Figure 28C:
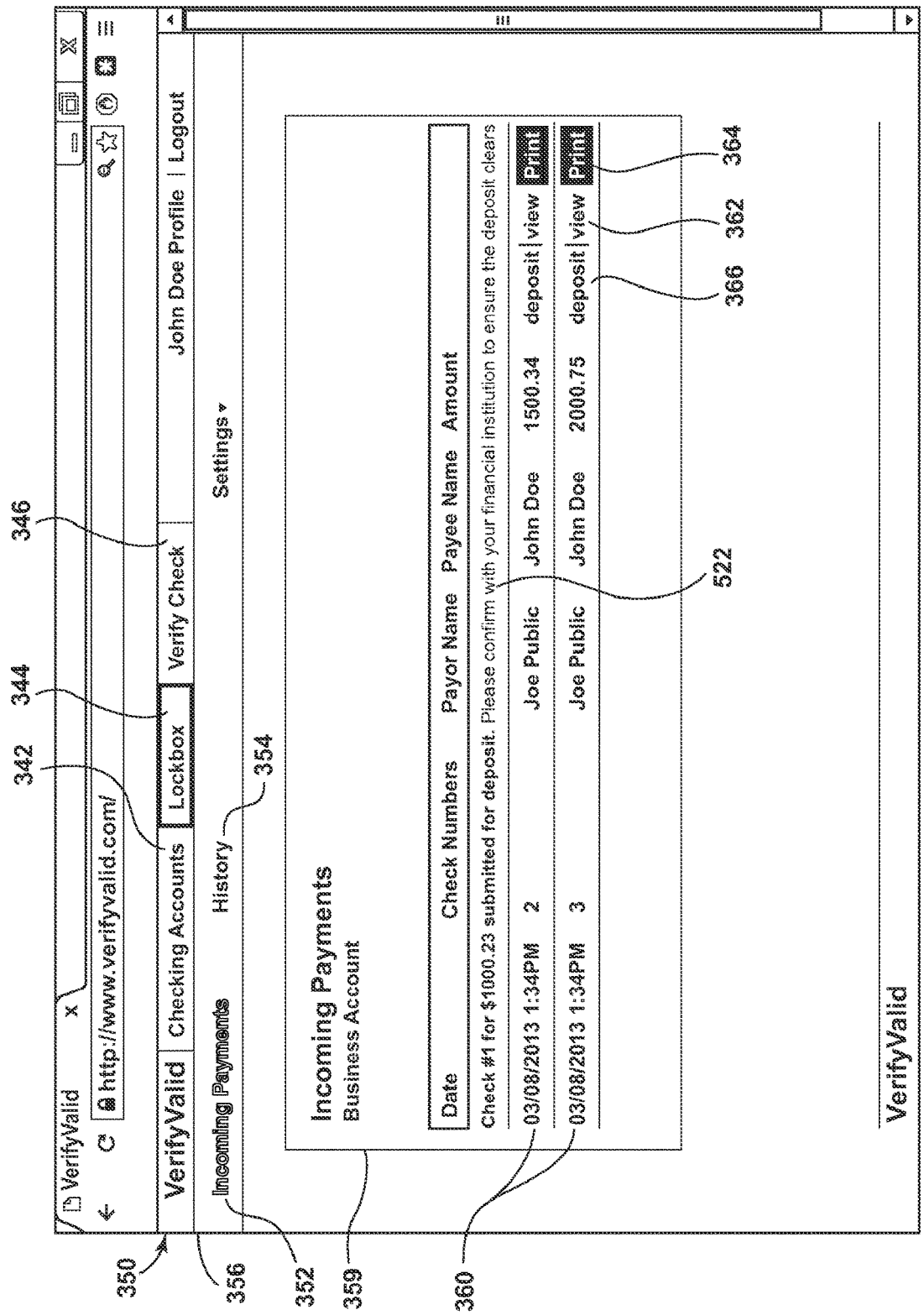
Figure 28D:
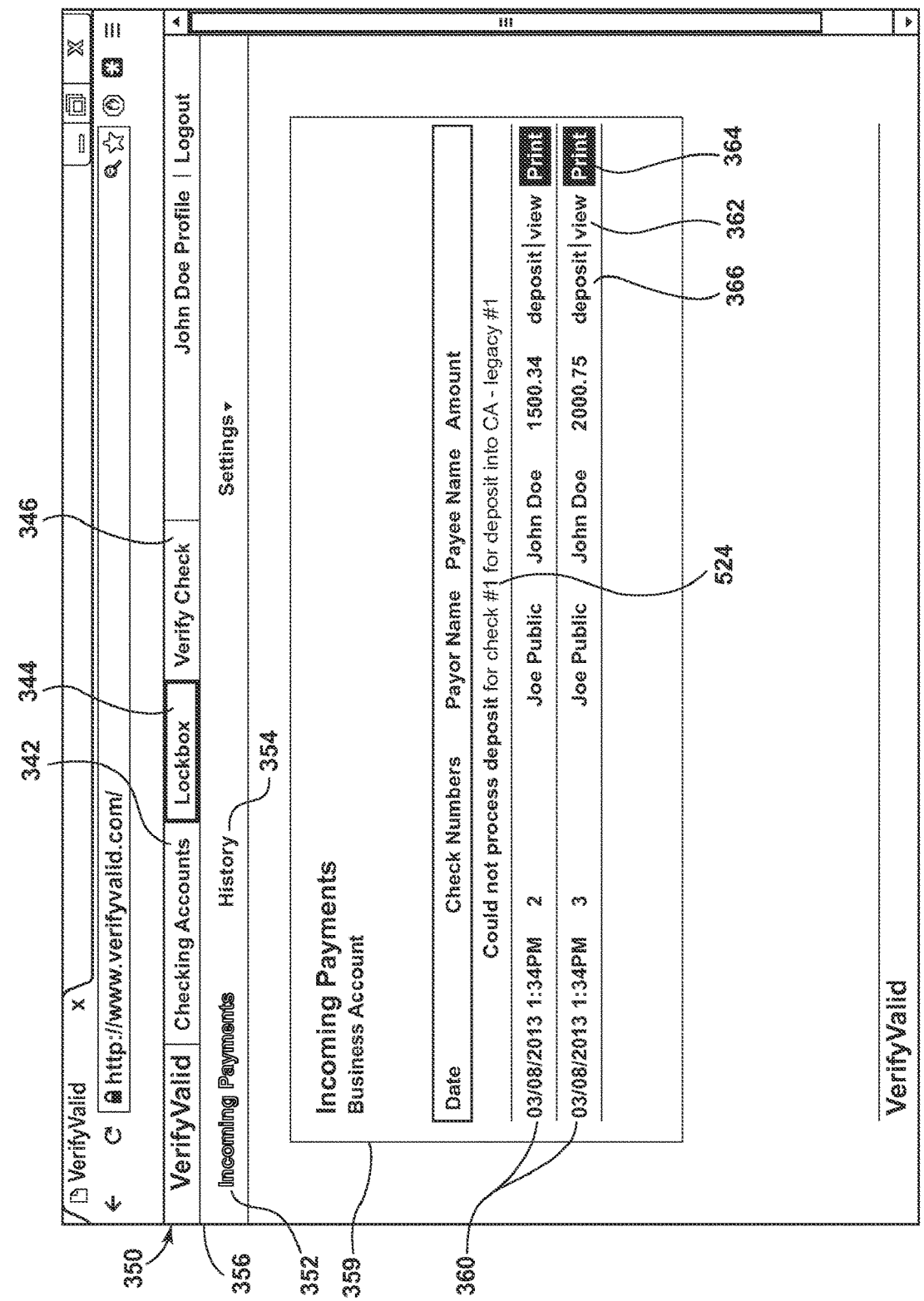

Referring now to FIG. 28B, when the payee selects the deposit icon 514, the system 310 receives a deposit request to a deposit account selected by the payee and the deposit process 500 begins and the bank account selection window 511 closes. The deposit process 500 may be carried out according to the flowchart 600 of FIG. 30, which will be described below, or any other suitable process. As illustrated in FIG. 28B, a status indicator 520 can be displayed in the incoming payments window 356 while the deposit is processing. The status indicator 520 can be displayed in place of the transaction 360 in the transaction table 359 in the form of text, as illustrated in FIG. 28B. Alternatively, the status indicator 520 can be displayed as an overlay window or as a graphic, such as an indicator bar, timer icon or hour glass icon, for example. If the deposit process is completed, a deposit completion indicator 522 can be displayed in the transaction table 359, as illustrated in FIG. 28C. The deposit completion indicator 522 can be in the form of text indicating that the deposit process was completed and can optionally include information regarding the deposit, non-limiting examples of which include check number and amount, as well as a recommendation to confirm that the deposit clears with the selected bank of deposit, as shown. If the deposit process cannot be completed an incomplete deposit indicator 524 can be displayed, as illustrated in FIG. 28D, in the form of text indicating that the deposit process for the selected transaction could not be completed. The incomplete deposit indicator 524 can also optionally include information regarding the deposit, non-limiting examples of which include check number and bank account.

Referring again to FIG. 20, once a transaction 360 has been printed or deposited, the transaction 360 can be displayed in the history window 358. As described above, the printed or deposited transaction 360 can remain in the incoming payments window 356 with the Print and Deposit icons 364 and 366 changed to a non-selectable status and the transaction 360 can also be displayed in the history window 358. In one example, the printed or deposited transaction 360 can be displayed in both the incoming payments window 356 and the history window 358 for a predetermined period of time, after which the transaction 360 is removed from incoming payments window 356 and only displayed in the history window 358. In another example, the transaction 360 can immediately be removed from the incoming payments window 356 upon completion of the printing or depositing process of the transaction 360.

The history window 358 can include a transaction history table 392 which lists the transactions 360 which have already been printed or deposited. In one example, the transaction history table 392 can be divided into sections: a previously printed payments section 393a and a previously deposited payments section 393b, as illustrated in FIG. 20. Alternatively, the transaction history table 392 can include a list of transactions with a suitable icon to indicate whether the payment was deposited or printed. The information for each transaction 360 can be the same or different than that listed for the transaction 360 when displayed in the incoming payments window 356. Each transaction 360 displayed in the transaction history table 392 can include a view icon 394. Selecting the view icon 394 navigates the payee to the review check window 96 for that transaction, as illustrated in FIG. 29.

Figure 29:
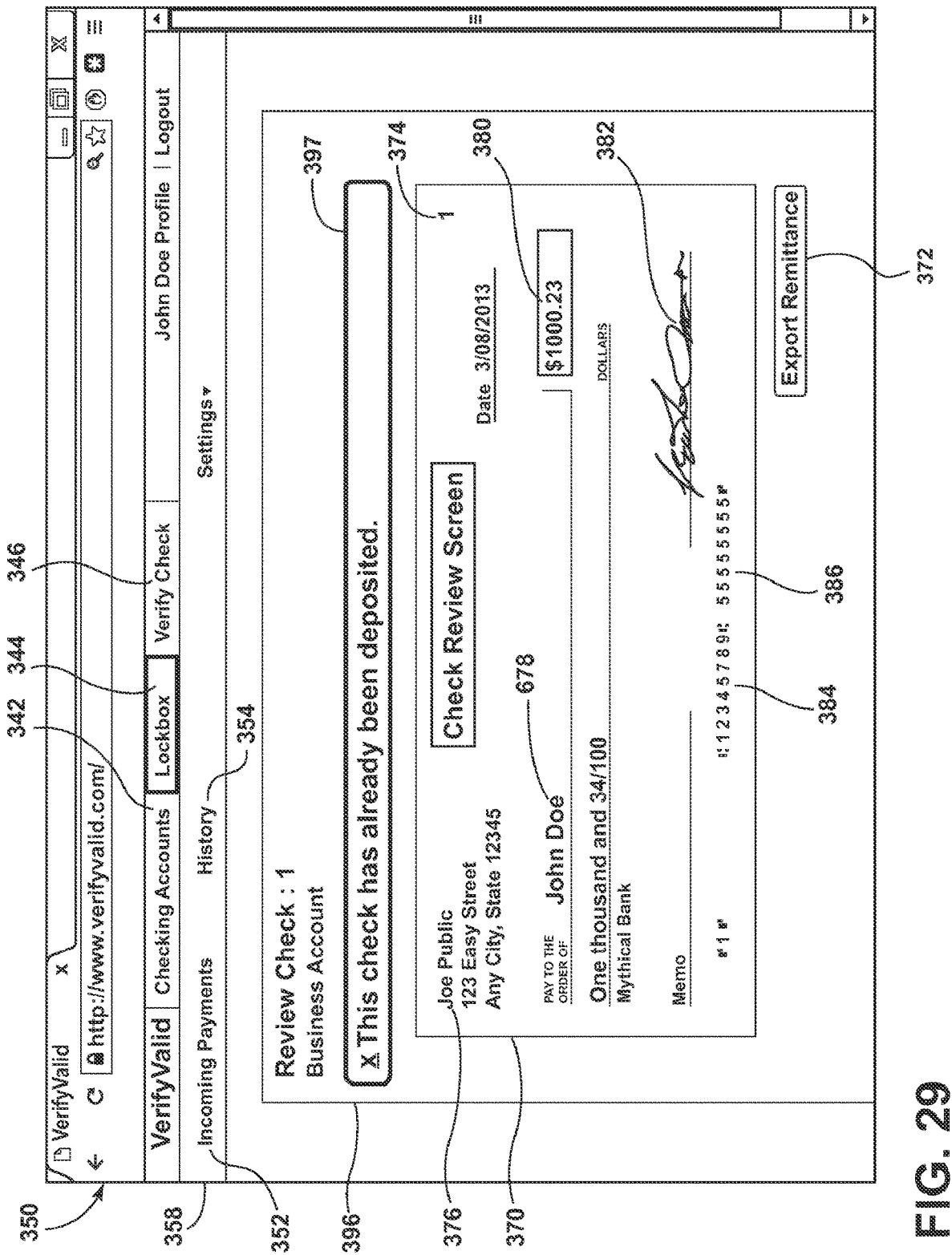
FIG. 29 illustrates a user interface check review window according to an embodiment of the invention.
Figure 30:
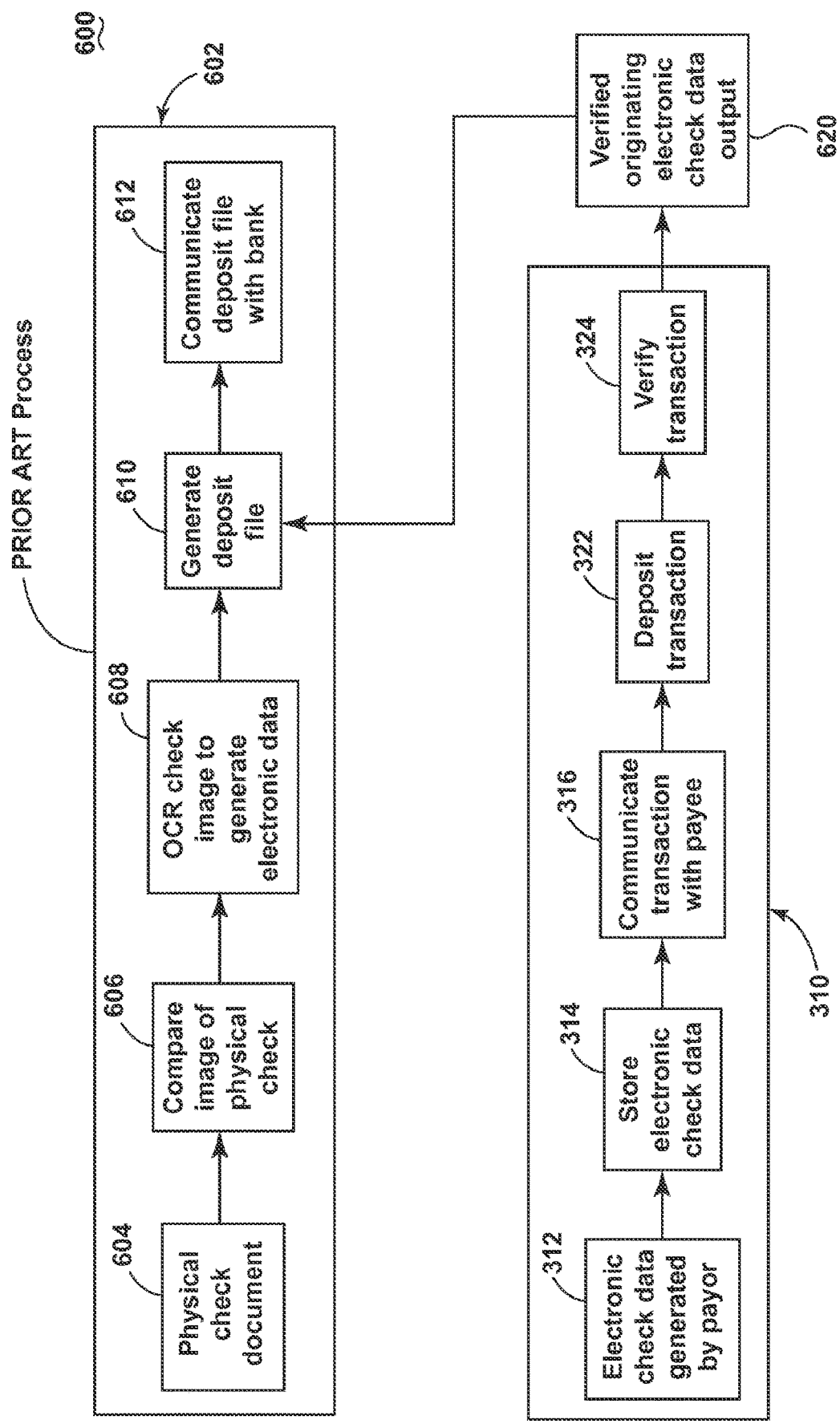

Still referring to FIG. 29, the review check window 396 is similar to the review check window 368 except that the review check window 396 includes a check status indicator 397 and does not include the print check button 371. The check status indicator 397 can include text indicating to the payee that the check has already been deposited (as illustrated) or printed (not shown), as the case may be. In this manner the payee can view the details of the transaction 360 and also optionally export the remittance information related to the transaction using the export remittance icon 372. The print check button 371 is not included in the review check window 396 because the check 370 corresponding to the selected transaction 360 has already been deposited, or printed, as the case may be and thus should not be printed again in order to avoid duplicate presentment of the check 370.

The export remittance icon 372 allows the payee to export remittance data in a format usable by the payee. Remittance data typically provides information as to what services or goods the payor is paying for with the funds such that the payee and/or payor can track outstanding and paid invoices and match invoices with the correct payments. Non-limiting examples of remittance data include payor name, invoice numbers, discounts, date, item number/description, shipping terms, price, and quantity. Typically, when a business sends checks to pay outstanding invoices, they often need to include information about what invoices are being paid, what discounts are being applied, etc. This remittance data is one of the primary reasons why businesses prefer paper checks.

For example, a book seller (payor) may have individual invoice numbers for each of the books they've bought in which they need to tell the book supplier (payee) how many of each book they are paying for (and with what discounts, shipping terms, etc.). Typically, this information would be submitted on a separate document that is submitted by the book seller to the book supplier with the paper check. In the present exemplary check 370, this remittance data can be associated electronically with the check data such that the payee and/or the payor can easily track invoices and payments. Typically, the export remittance feature is used by the payee, which allows the payee to export the remittance data in a usable file format so that it can then be imported into the payee's accounts payable system. In a traditional paper-based check system, the remittance data would have to be either entered by hand or scanned into the system, which uses valuable time and resources and can result in errors. In contrast, with the present invention, the remittance data is already available in a usable format that does not require additional resources to enter and does not rely on scanned information, and thus the payee can obtain the remittance data more easily and more accurately and immediately know what items or services the payor is paying for with each given payment.

Figure 30:
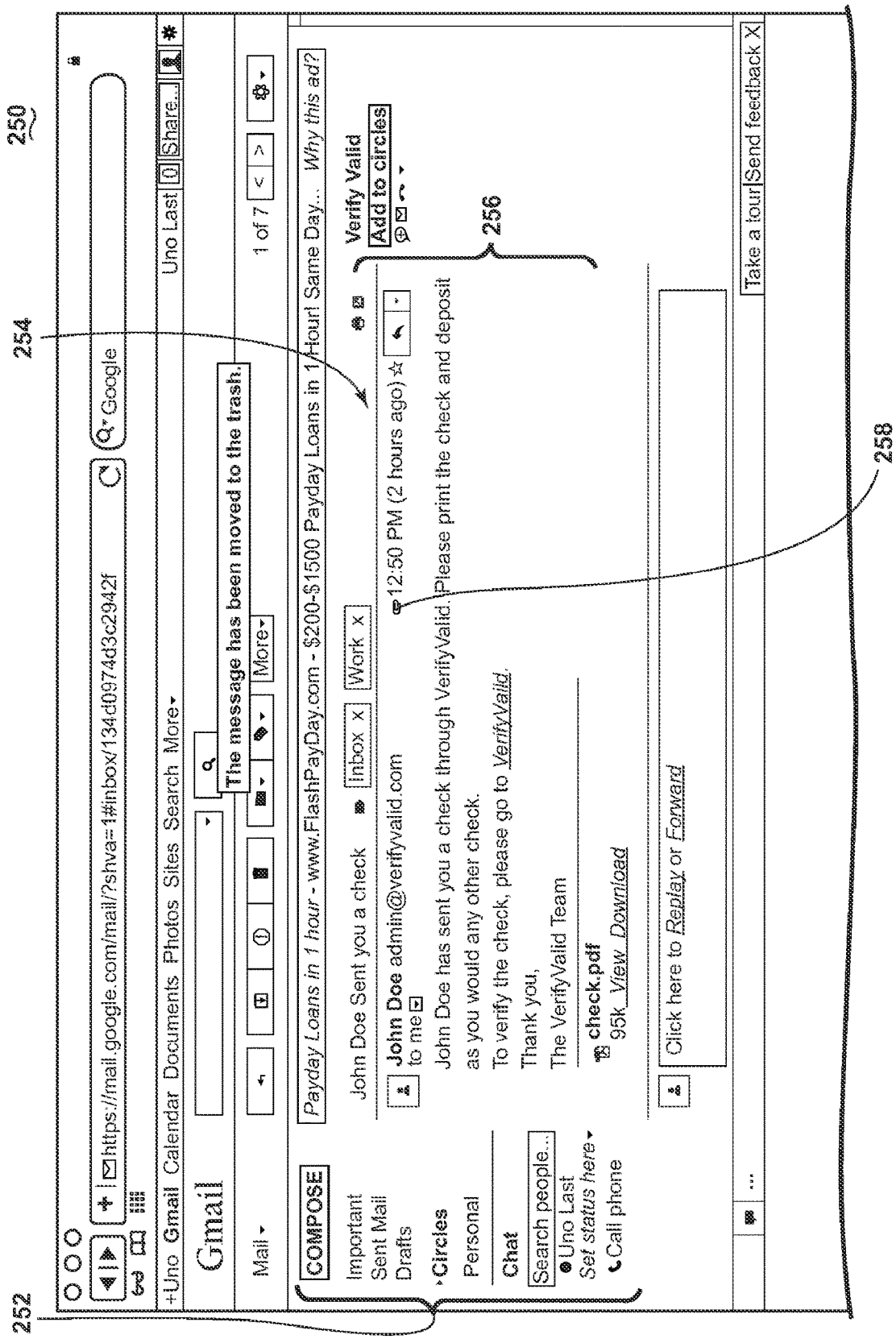
FIG. 30 is a flowchart illustrating a process for electronically depositing a transaction according to an embodiment of the invention.

Referring now to FIG. 30, a flowchart 600 illustrating how the deposit process 500 can be used with a bank's existing Remote Deposit Capture (RDC) process for electronically depositing a transaction 360 is illustrated. In this manner, the deposit process 500 of FIG. 27 can be used with any bank that has already been configured for RDC transactions without requiring the bank to invest in developing new software or hardware. The sequence of steps depicted in the flowchart 600 are for illustrative purposes only, and are not meant to limit the process in any way as it is understood that the steps may proceed in a different logical order or additional or intervening steps may be included without detracting from the invention.

As illustrated in FIG. 30, the RDC process 602 begins with a physical document, such as a physical check, at 604. At 606, an image of the physical document is captured. Typically this involves image scanning or taking a digital photo of a front and reverse side of the physical check. Optical character recognition (OCR) is then performed on the image(s) of the physical check to generate electronic data from the image of the physical check at 608. In addition, or alternatively, some of the data associated with the physical check, such as routing and account numbers, for example, may be printed on the check using magnetic ink (e.g. MICR line) that can be read using an appropriate scanner to generate additional electronic data at 608. The OCR generated electronic data is then used to generate a deposit file that is in a format acceptable to an intended bank of first deposit at 610. At 612 the deposit file is communicated with the bank of first deposit for depositing the funds indicated associated with the physical check document.

Because the transaction management process 310 described herein begins with electronic check data, there is no need to use images to generate electronic data representative of the transaction, as is typically done during an RDC process. The electronic check data communicated to the payee at 316 and verified at 324, using the transaction verification process 326 of FIG. 18, for examples, generates electronic check data that has already been verified as matching the originating electronic check data. In this manner, the transaction management process 310 can be used to generate an output 620 based on verified originating electronic check data, which can be formatted for receipt as input to the RDC process at 610 to generate a deposit file that can be received and processed by the bank at 612.

In one example, the deposit file generated by the RDC process at 610 can be an X9.37 deposit file, which is one example of an industry accepted deposit file, or any other suitable deposit file, such as x9.100-187, for example. In the traditional RDC process 602, the X9.37 deposit file is generated based on image files, such as a TIFF file, for example, of the front and back of the physical check. The output 620 from the transaction management process 310 can be in the form of a tiff file of a front and back of a check that is generated from the originating electronic data provided by the payor at step 312 of the process 310.

In a typical RDC process, the deposit file is generated based on images of a physical check document that have gone through an OCR process to provide the data for the deposit file. During the RDC process, the images of the physical check document are used to generate metadata (e.g. payor, check amount, check number) and an imbedded TIFF file. As with any OCR process, there can be errors during the scanning process which can result in incomplete or incorrect data fields in the deposit file. The RDC process also requires additional equipment, such as a digital camera or scanner, in order to capture images of the physical check. In addition, the RDC process is susceptible to fraud by tampering with the images that are used to generate the deposit file. For example, an individual can capture an image of a valid physical check, modify the captured image, such as by changing the payee name and/or amount, and submit the modified image for use in generating a deposit file.

In contrast, the transaction management process described herein uses electronic check data to generate a deposit file that can be deposited with a bank through the RDC process. The embodiments of the invention generate a deposit file without the use of additional equipment, such as scanners or digital cameras, and without the need to OCR a document, thus avoiding potential OCR-related errors. In addition, the transaction management process provides as output electronic check data that has already been verified as matching the originating electronic check data. In this manner, the output provided by the transaction management process for input into the RDC process for depositing into a bank has already been verified, decreasing the likelihood of fraud. Because the transaction management process is based on native electronic data and not data generated based on a digital image, an individual cannot interject a fraudulent deposit into the system simply by manipulating an image.

Figure 31A:
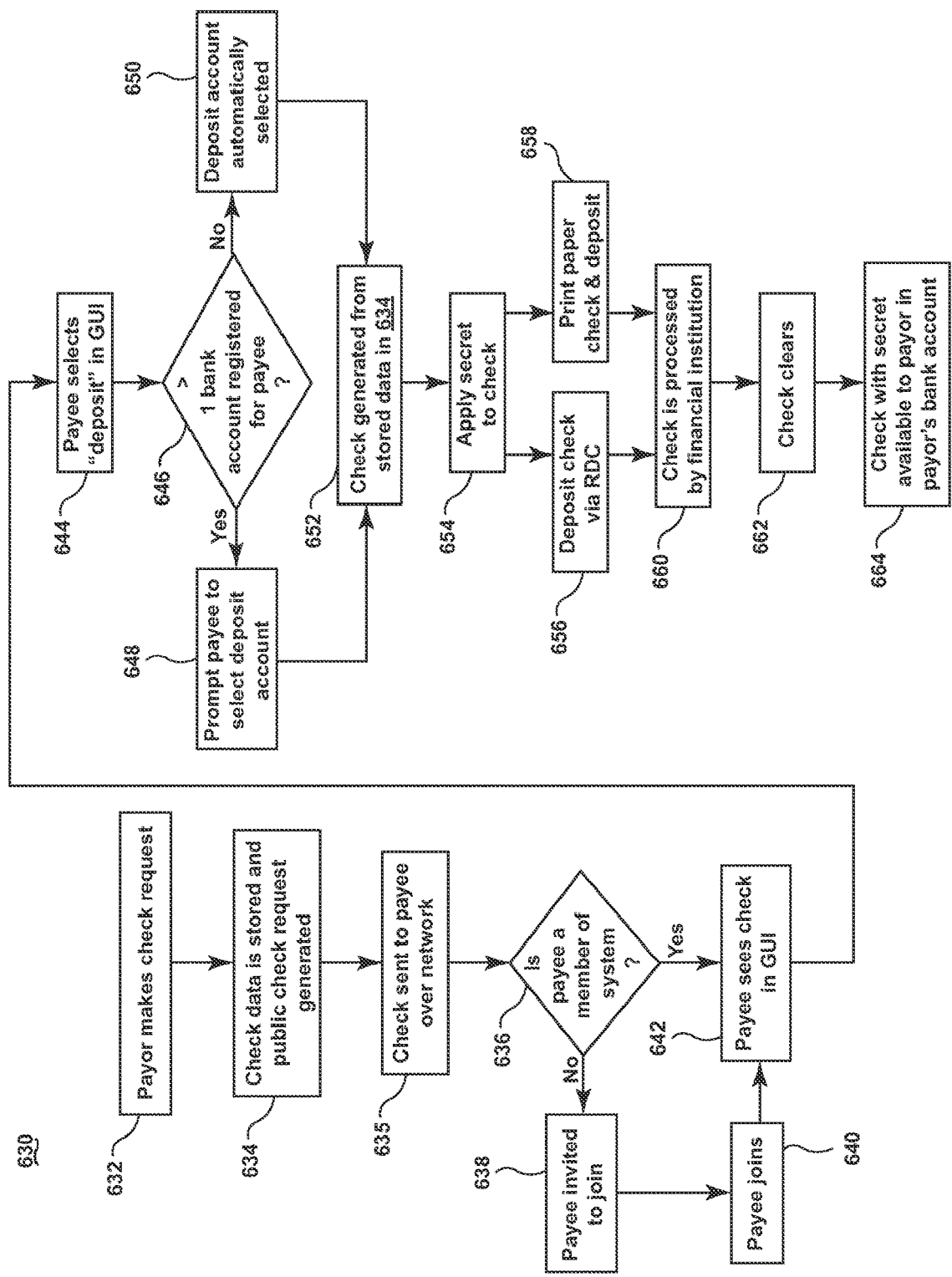

FIG. 31A illustrates a process 630, which can be used with the system and process 310 of FIG. 17, by which a user's authority to access or make changes to a financial account can be verified. The process 630 can be implemented at any point during the deposit transaction process 322 of a check-type payment. Most financial institutions have processes by which the payor is capable of viewing checks drafted by the payor that have been processed by the financial institution, such as occurs when the check is deposited by the payee. A secret code or graphic can be provided on the check when the check is processed for deposit. The secret then becomes a part of the deposited check that is only visible payor after the check has been deposited. This secret can then be used by the payor for authentication or validation purposes.

The process 630 begins at 632 with the payor making a check request through the system 310, as described above at block 312 of the process and system 310 of FIG. 17. The check request can include information such as payee, amount, email address of the payee and the bank account number from which the funds are intended to be drawn. Remittance data can also be associated with the check, as described below with respect to FIGS. 32-38. At 634, the check request can be registered with the system and a unique identifier associated with the check request. The electronic check data associated with the check request can be stored by the system and identifiable by the using the unique identifier. A payment notice based on the electronic check data can then be sent to the designated payee over the network at 635, such as via email or SMS text. The payee can be prompted to view the payment notice within the system GUI by providing an appropriate link or web address or directing the payee to an appropriate software application. The payment notice sent to the payee may include only a portion of the data associated with the unique identifier registering the check request with the system. For example, information such as payee, amount, and payor may be sent to the payee and accessible by the payee, whereas the some information, such as the payor's bank account and routing numbers associated with the unique identifier registering the check request may not be sent in the payment notice to the payee. In this manner, sensitive information that is not necessary for the payee to have access to in order to complete the deposit process can remain secret and inaccessible to the payee, thus increasing the security associated with the system, as described above.

At 636, the system can determine whether the payee is already a member of the system. If the payee is not a member, the payee can be invited join the third-party service at 638. Once the payee joins the service at 640, the payment notice, in the form of a check in this example, can be displayed to the payee using the GUI described herein.

At 644, the payee can select the deposit icon 366 in the GUI (see FIGS. 19 and 28A-D). At 646, the system can determine if the payee has more than one bank account registered with the system. If the payee has more than one bank account, the payee can be prompted to select a deposit account at 648, such as described with respect to the bank account selection window 511 of FIG. 28A. If the payee only has a single deposit account registered, the system can automatically select the registered deposit account at 650. At 652 a depositable item is generated from the check-type payment data stored at 634 of the process 630 in the form of a check.

At 635, a secret code or graphic can be added to the check generated at 3652. The secret can be added by the payee during the deposit process 644 or added by the third-party service after the payee has initiated the deposit process at 644. At 656, the payee can deposit the check with the financial institution holding the selected deposit account in the form of an electronic check which is based on the check data stored at 634 and includes the secret applied at 654. The electronic check can be deposited by the system 310 according to the process 600 using the RDC process 602 as described in FIG. 30. Alternatively, at 658, the payee can elect to print the check and deposit the printed check with the bank. The check can be printed by the payee using the system 310 as described in FIGS. 19-22. Alternatively, the check can be printed by the third-party service and provided to the selected payee bank or the payee bank itself can print the check and process the check according to normal check clearing processes.

At 660, the check can be processed by the financial institution and cleared at 662 using normal check clearing processes. At 664, the cleared check, which now includes the secret added at 654 is available to the payor in the payor's bank account. The secret is part of the deposited item and thus only becomes accessible to the payor after the deposit request has been processed. When the payee adds the secret, the secret can be used by the payee to verify the payor's identity or authority over the bank account from which the funds were drawn. When the secret is added by the third-party service, depending on how the secret is added, the secret may or may not be visible to the payee, but is visible to the payor.

When the payment note is in exchange for access to a system, then the secret can be used to prove that the bearer of the secret is the original payor. For example, the secret can be used in place of a ticket for an event to show that the payor has already paid to enter the event, as a key to refer to transaction details, or as a code to activate a service or piece of software, etc.

In another example, the secret can be used as a final authorization step for a purchase by requiring the secret to be provided to complete the transaction. By requiring a secret that could only be available to the payor, the system confirms that the original account holder authorized the transaction. This supports strong confirmation of purchase and can also be used to support non-repudiation of payment for equity investment, for example.

In another example, the secret could be used to authorize changes to a payor's account that has security or risk implications. For example, the administrator of a payor's account can impose a limit on the amount of checks issued for the corresponding checking account. Changing that limit could require presentation of a check secret to ensure that the checking account owner authorized the change. A secret used for authorization does not require a specific transaction for the sole purpose of authorization. For example, if a payor pays a payee with an electronic check for performing a service, such as babysitting, and the payee electronically deposits the check, a secret can be affixed to that check and used by the payor at some later time for a purpose that is unrelated to the service which the payment was sent for. For example, the system might require the secret from the check in order to authorize a later account change requested by the payor simply because it is the most recent check that has cleared.

In yet another example, the secret could be used to authenticate an account holder to account support personnel in order to authorize an account-related conversation. Instead of widely known confirmation information (such as the account holder's birthday), the support personnel can request the check secret from a previously deposited check. For example, the support personnel could request: "To confirm that you are authorized to discuss this account, please tell me the secret from check #43554."

The secret adds no additional costs to the payment processing system. Thus it can be affixed to any or every check that gets deposited, prior to having a purpose for that particular secret, allowing it to flow through the bank clearing system prior to its need. Thus when a request requires a secret, a secret that was affixed to a prior check and that has already propagated through the bank clearing system can be used, which can reduce settlement time. By contrast, for example, requiring a new transaction by ACH for authorization requests imposes a multiple-day transmission time for the request, precluding many valuable uses, as well as imposes additional costs.

In the preferred embodiment, the secret data is kept is separate from the other electronic check data (e.g. payee, amount, etc.) and is combined with the other check data at the time the check is produced for deposit. This means that the original check document includes the secret. In alternative, although not preferred process, the process could be used to affix the secret to a paper check prior to or during the image capture where the secret is affixed to the check image after image capture.

Some financial institutions may not reliably support providing the payor with the check images for deposited checks. Because the routing number for the checking account indicates the payor's financial institution, the system 310 can know whether secret process at 654 will work and can fallback to other verification and authorization mechanisms if needed.

Figure 31B:
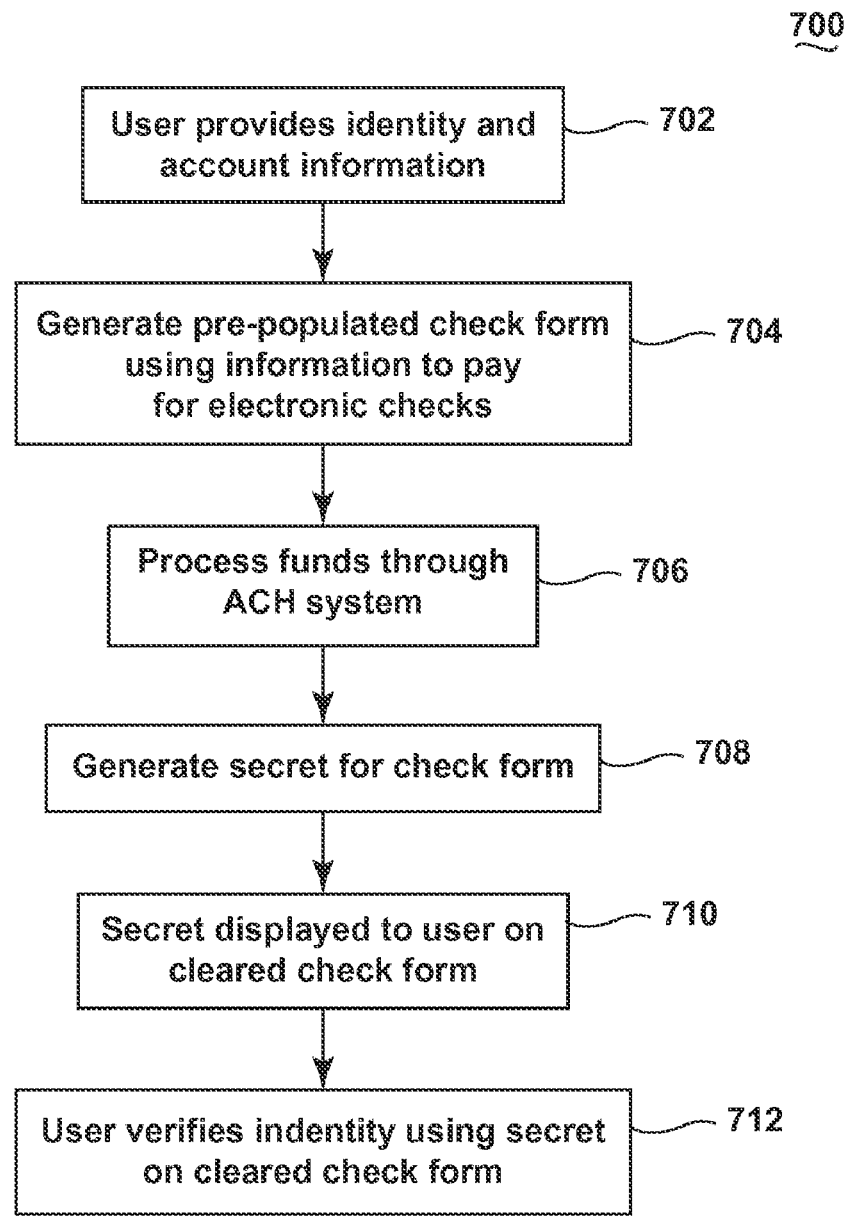

FIG. 31B illustrates a new account set-up process 700 by which a user can purchase electronic checks for providing to a payee for payment. The process 700 begins with assuming that a user has accessed the electronic transaction management system either locally or remotely, such as through a web browser, and selected an option to setup an account to purchase electronic checks. At 702, the user can provide information regarding the user's identity and bank account with which the user desires to associate the electronic checks with. Non-limiting examples of identity and bank account information include user mailing address, user e-mail address, user name, user phone number, bank name, bank account number, and bank account routing number. At 704, the user identity and account information can be used to generate an electronic check form that is pre-populated with the user information to pay for a selected number of electronic checks.

The funds identified on the pre-populated check at 704 can be processed to transfer the funds to the provider of the electronic checks, such as through normal Automated Clearing House (ACH) channels at 706. ACH is an electronic network that traditionally processes credit and debit transactions. Typically, an ACH transaction begins with a receiver authorizing an originator to issue ACH debit or credit to an account. In this case the receiver is the user who is authorizing the provider of the electronic checks to access an account to withdraw the funds indicated on the prepopulated check to pay for the electronic checks. This process also links the electronic checks with the account such that payments issued by the user to payees using the electronic checks will be authorized to be withdrawn from the indicated account.

At 708 a secret is generated and associated with the pre-populated check form generated at 704. The secret can be generated prior to or subsequent to processing of the funds at 706. The secret can then be displayed on the cleared check form at 710 which can be viewed by the user. The user can then use the secret provided on the cleared check to verify the user's identity for use in issuing the electronic checks at 712. In this manner, the user who initiated the request for the electronic checks can be verified as being authorized to access the account with which the electronic checks are to be associated with.

Figure 32:
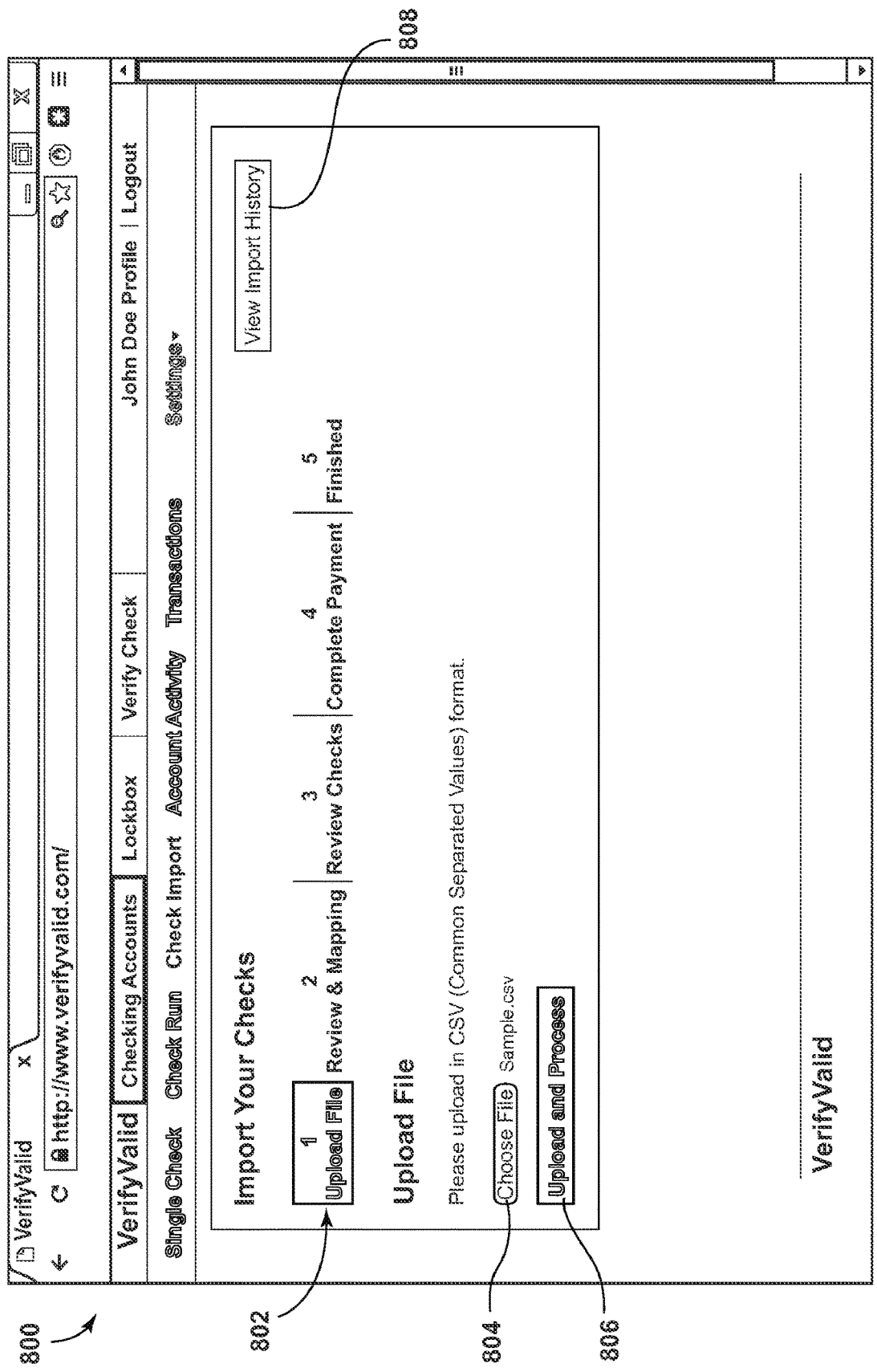

FIG. 32 illustrates an import checks window 800 which can be used to upload a file containing information regarding payments to be made using electronic check data. The import checks window 800 can include a process map 802 which indicates which step in the check import process the user is at, a Choose File action button 804 and an Upload and Process action button 806. Selection of the Choose File action button 804 directs the user to either a pop-up window overlaid on the import checks window 800 or a new window in which the user can select a file to import. In the example of FIG. 32, the file is in the standard comma separated values (.csv) format, although it will be understood that other formats of tabular or text data can also be used in a similar manner without deviating from the scope of the invention. Once the user has selected a file to import, the name of the file can be displayed in the import checks window 800 and the user can select the Upload and Process action button 806 to start the import process. A View Import History action button 808 can also be provided to allow a user to review a history of previous check imports.

Figure 33A:
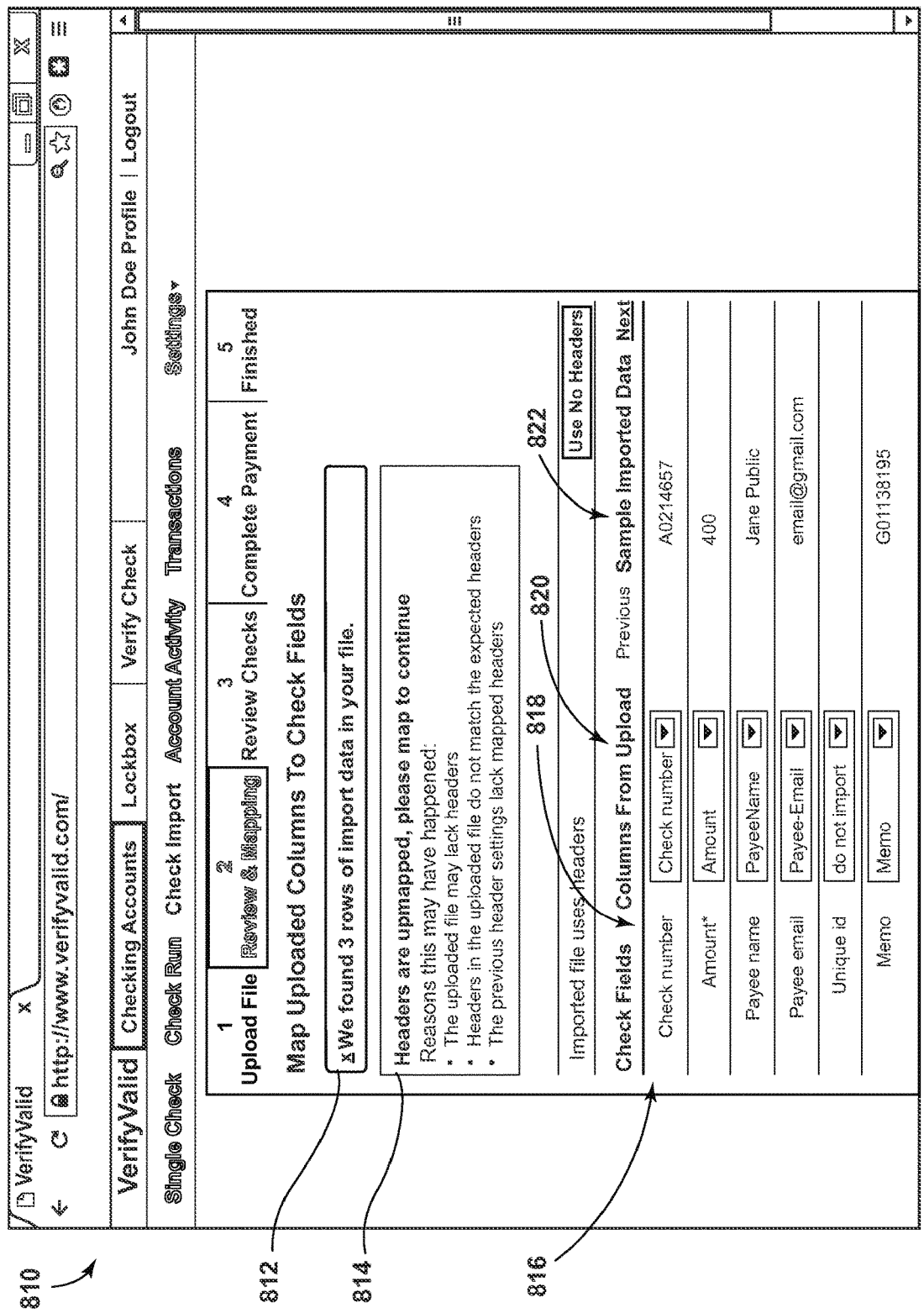

Referring now to FIGS. 33A and B, a column mapping window 810 allows the user to identify columns from their imported file for mapping to check fields used in creating electronic checks. The column mapping window 810 can include a result field 812 which indicates how many rows of data were identified in the check import process and a header mapping instruction window 814 with options for how to address data with unmapped headers. A check fields mapping table 816 allows a user to correlate headers in the imported data file with check fields that can be used in creating checks and for accounting purposes. The check fields mapping table 816 can include a check fields column 818 which lists the check fields used to generate the electronic check, an upload column 820 and a sample imported data column 822. The upload column 820 can include selectable drop-down menus that allow a user to select which column in the imported data to match with each check field. The sample imported data column 822 displays an example of the data that will be used for each check field from the selected upload column. For example, the user's data may include a column identified as "vendor" that the user wants to use in the payee name in the check field for each electronic check. The user can use the upload column drop-down menu 820, which is automatically populated with the column headers identified during the file import process, to select the desired data column for each check field. The user can also select to not import data for a selected check field, such as the Unique Id field in the exemplary window in FIG. 33A.

Figure 33B:
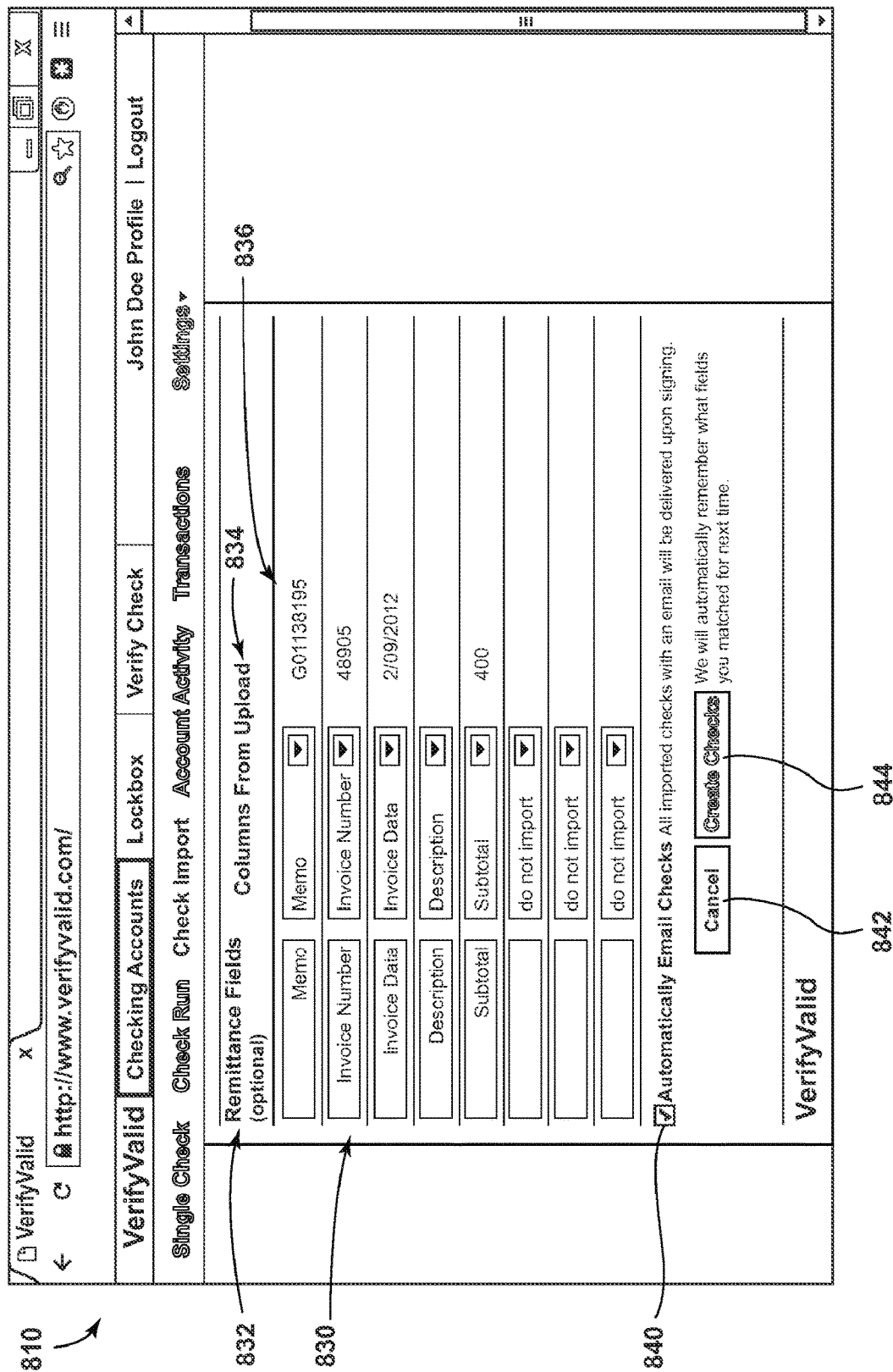

Referring now to FIG. 33B, the column mapping window 810 also includes a remittance data mapping table 830 which allows a user to map columns from the import data with remittance fields that can optionally be included with each electronic check. The table 830 can include a remittance fields column 832, which allows a user to enter a desired remittance field name, a columns from upload column 834 which allows a user to select from a pre-populated list of data columns identified during the file import, and a sample remittance data column 836 which displays a sample of the data selected by the user for each remittance field. The user can also select to not import data for remittance fields.

The column mapping window 810 can also include an automatic email option 840 which allows a user to select to automatically email checks that are generated with the import data that include a payee email address upon signing. The user can then either select a Cancel action button 842 or a Create Checks action button 844 to proceed to the next step in the upload process. The software can be programmed to remember the user's check and remittance field mapping for the next import process.

Figure 34A:
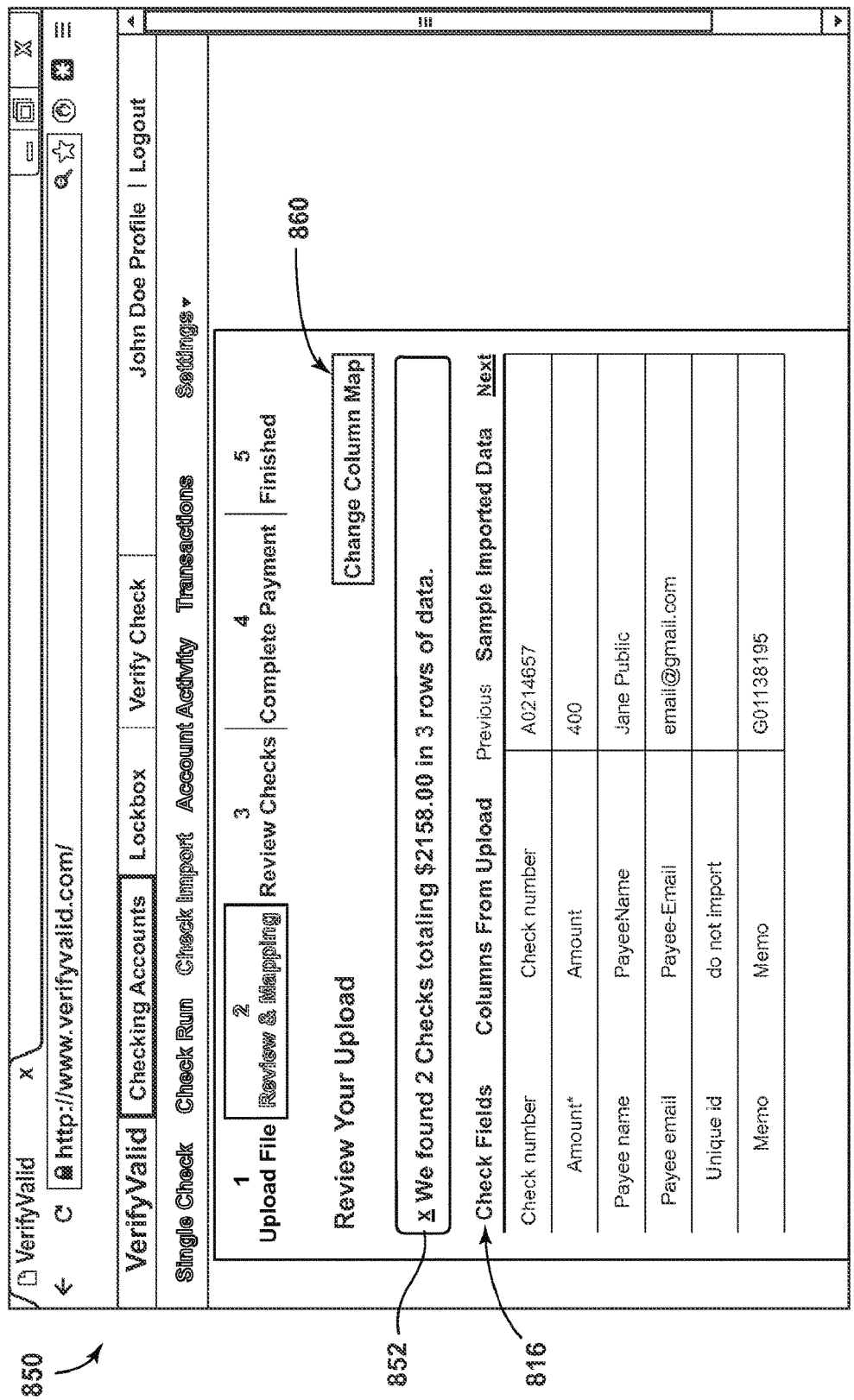

For example, as illustrated in FIGS. 34A and B, after the user has completed the column mapping once, the next time the user starts the file import process, an upload review window 850 is displayed in which the software automatically maps the import column data with check and remittance fields as previously identified by the user. The upload review window 850 can include a summary pop-up 852 informing the user of the total number of identified checks, total check amount and rows of data found in the current import process. The check fields table 816 (FIG. 34A) and remittance fields table 830 (FIG. 34B) display the mapping used during the current import process. If the user wants to change one or more the mapping fields, the user can select the Change Column Map action button 860 to be directed to the column mapping window 810 (FIG. 33A-B) to repeat the mapping process similar to that described above.

Figure 35:
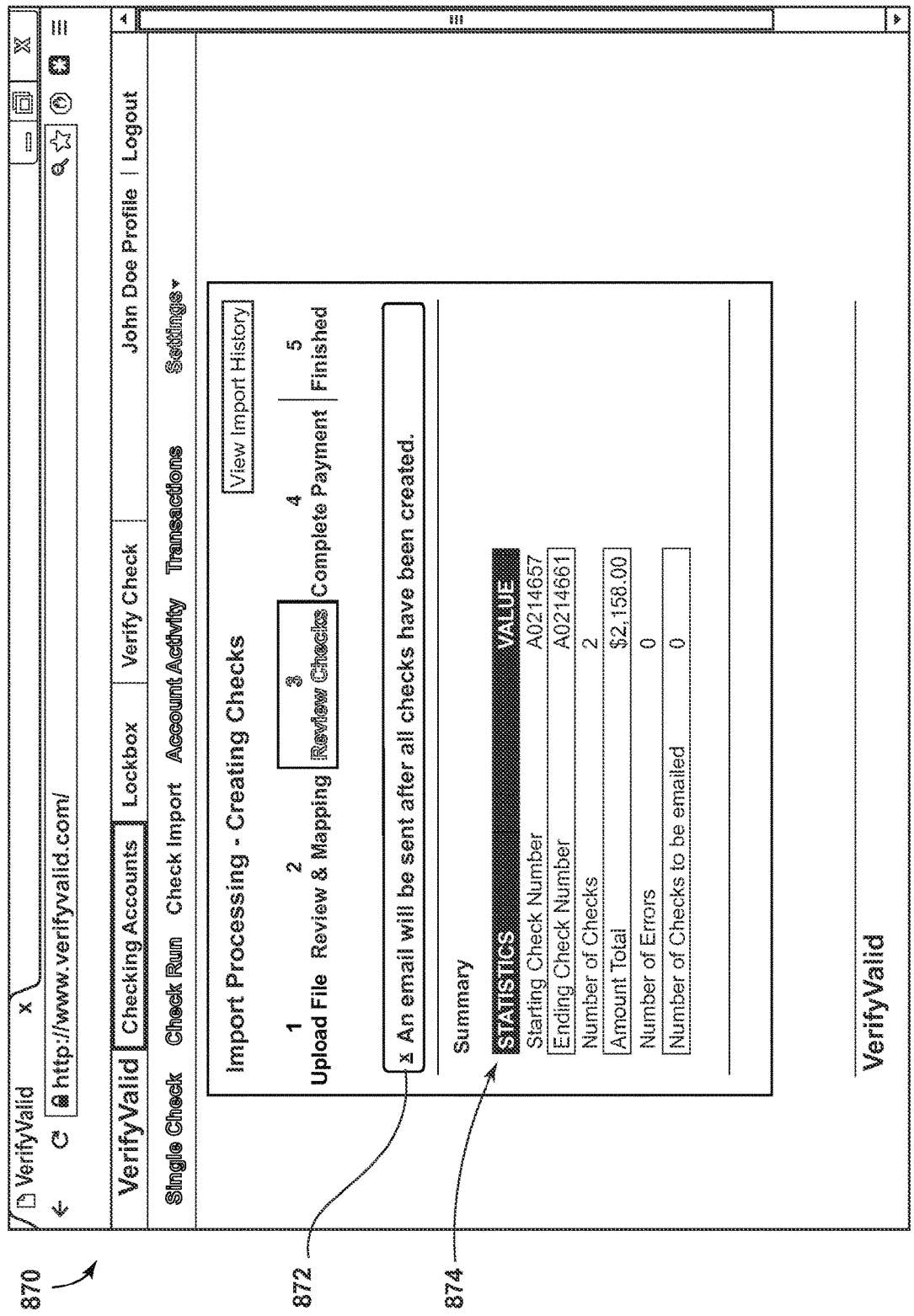

Referring now to FIG. 35, during the import and check creating process, the lines of the import data are scanned, data corresponding to each check to be created is recognized and identified errors, such as entries without corresponding payee email addresses, are reported to the user. A summary window 870 can be displayed during the import and check creating process which includes an information pop-up window 872 informing the user that an email will be sent to a previously identified email address once all of the checks have been created. The email address may correspond to the email address of the user who is importing the data and creating the checks, or the email address may correspond to a different individual(s) responsible for reviewing, authorizing and/or sending the checks. The summary window 870 can also include a summary table 874 summarizing the import and check creating process currently running.

Figure 36:
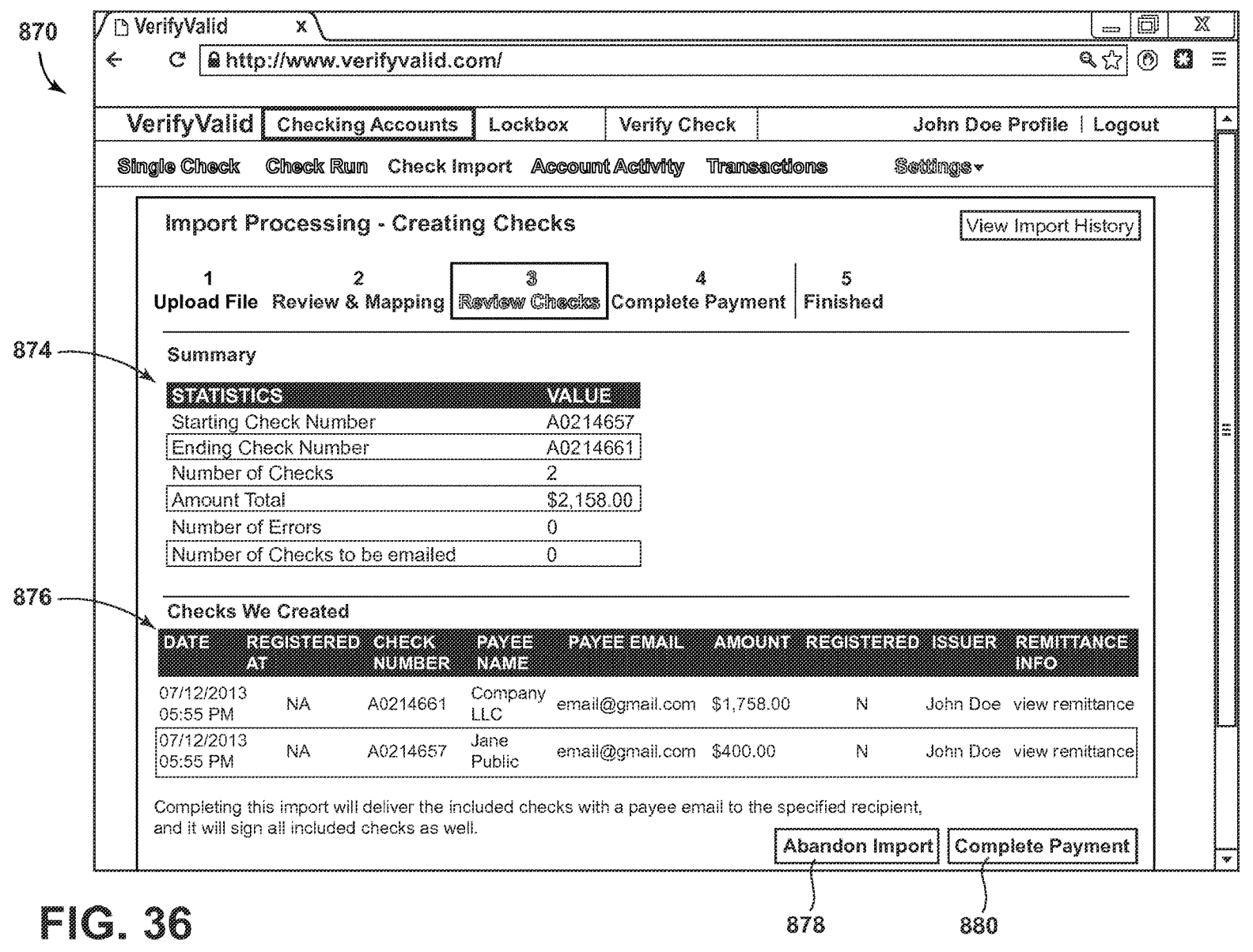
Figure 37:
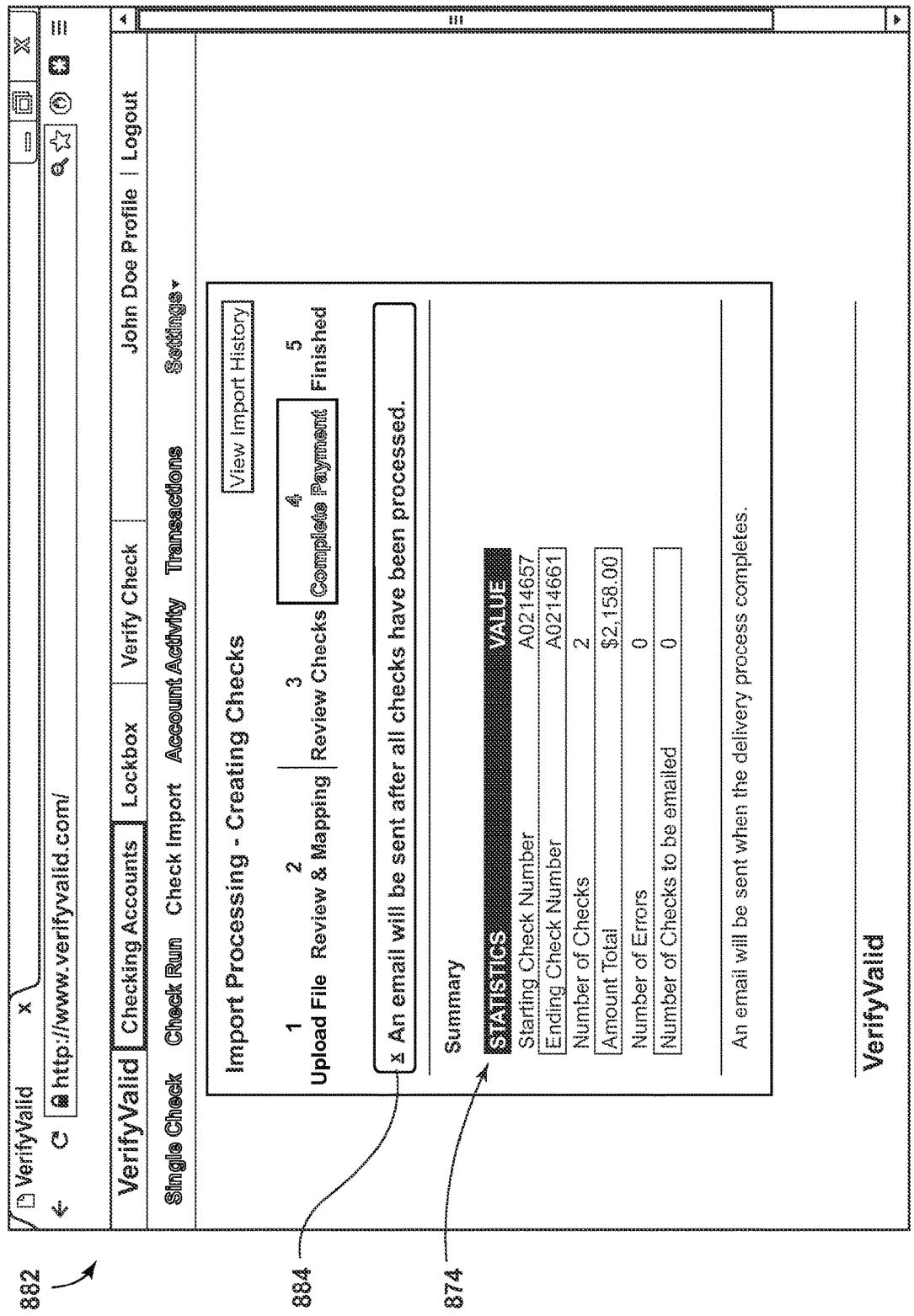

Once the import process is complete, a created check table 876 is displayed in the summary window 870, as illustrated in FIG. 36, summarizing information for each check created. A user who is authorized to sign and send checks can then either select an Abandon Import action button 878 to stop the payment process or a Complete Payment action button 880 to complete payments with the electronically generated checks. If the user selects the Complete Payment action button 880, a complete payment window 882 is displayed which includes an information pop-up window 884 informing the user that an email will be sent once all of the checks have been processed, as illustrated in FIG. 37. Once the process is complete, a finished import window 890 can be displayed, which includes a New Import action button 892 to start a new check data import process as illustrated in FIG. 38.

FIG. 39 illustrates a check review window 900 in which a user can review each check created by the check data import process and any associated remittance data. The features of the check review window 900 can be similar to those described above with respect to the check review screens 368 and 396 of FIGS. 21 and 29, respectively. The check review window 900 can include a check form 902 in which the check fields have been automatically prepopulated with information from the check data import process and a remittance table 904 displaying the associated remittance data. The payee who receives the check can use the export remittance feature as described above with respect to FIG. 29 to automatically export the remittance data associated with the check into a file format, such as a .csv or .txt file, to the payee's accounting software.

Financial Transaction Validation

Figure 40:
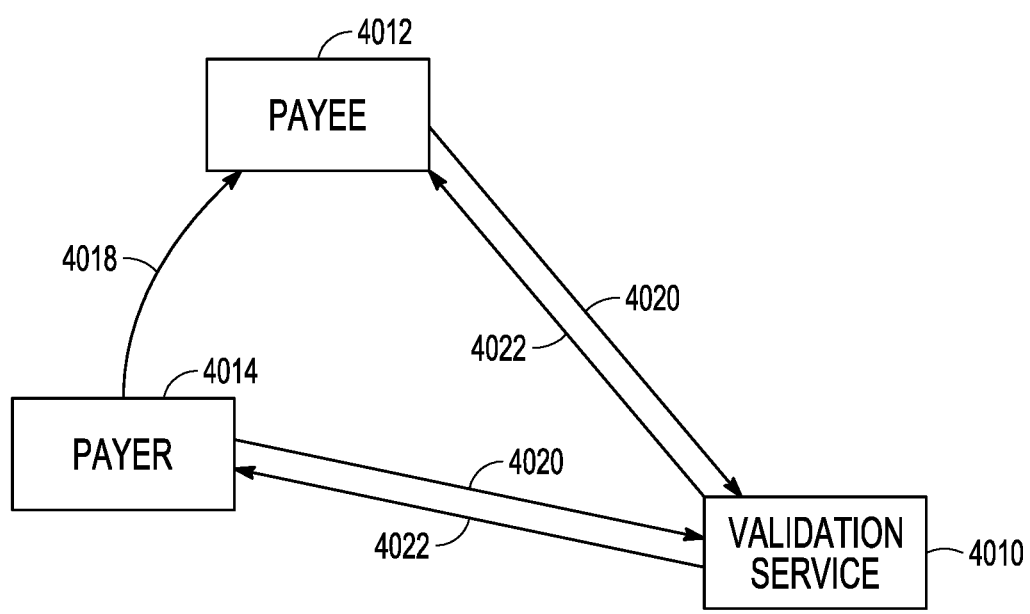
FIG. 40 depicts a schematic view of a check validation service and method according to the invention being used to validate a check being transferred from a payer to a payee.

FIG. 40 illustrates a validation service and method 4010 according to the invention. A payer 4014 is an entity who desires to send a payment to a payee 4012, such as for a good or service. The payee 4012 and payer 4014 can each be an individual, a group of individuals, a business, or a group of businesses. The validation service 4010 can be accessed via the internet, telephone, a dedicated line, a computer network, or any other means of communication enabling the communication of information to and from the validation service 4010.

Figure 41:
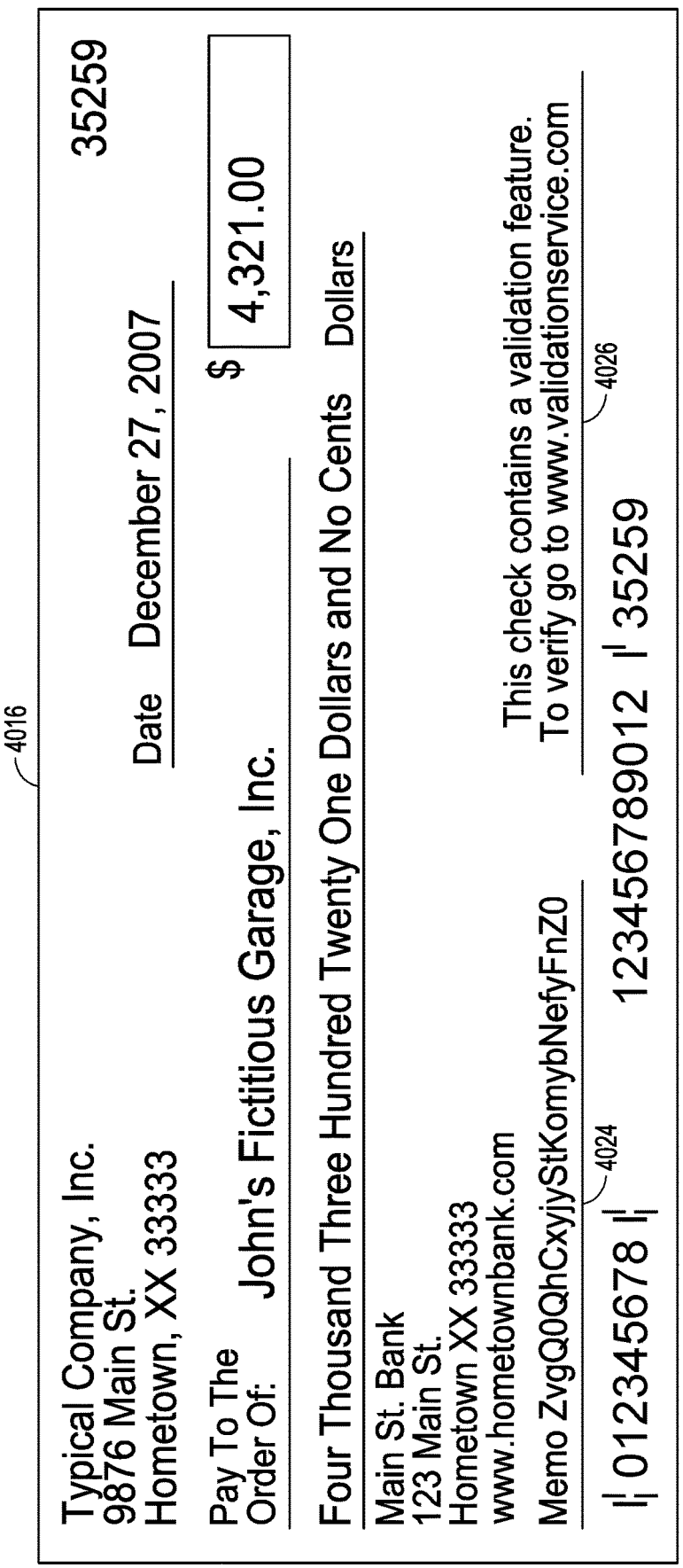
FIG. 41 illustrates the check that is transferred from the payer to the payee of FIG. 40.

The payer 4014 can send payment to the payee 4012 in the form of an enhanced check 4016, an example of which is illustrated in detail in FIG. 41. The payer 4014 defines the check 4016 payment information for a given check number on a given account. Specific information, which can comprise one or more information items associated with and included on the check 4016 in the form of indicia, is shown by example in FIG. 41, although it will be understood that the invention contemplates that any particular information can be applied to the check in the form of a payor, a payee, an amount (in numbers), an amount (written out in words), a date, a check number, a signature, a URL, a routing number, an account number, a check number, a bank name, an address, a telephone number, and the like singularly or in any combination thereof. The information can comprise numbers, letters, symbols, data, images, scannable information (e.g. a barcode), and the like. For example, the illustrative example check 4016 shown in FIG. 41 is check number 35259 for account number 123456789012 for a bank having the routing number 012345678. The date of the check 4016 is Dec. 27, 2007. The payee 4012 is John's Fictitious Garage, Inc., and the check is for $4,321.00, which is written out as "Four Thousand Three Hundred Twenty One Dollars and No Cents."

In addition to payor, payee, and the like, other terms like originating party and subsequent processing party are used herein. It will be understood that the term originating party is not limited to the author of a document or the originator of a transaction, but also to the party first invoking the validation service 4010, even if the originating party was not the author of a document or the originator of a transaction.

The validation service 4010 is used by the payer 4014 to generate a hash value 4024 or cryptographic digest, which is an identifier corresponding to the information contained on the check 4016. The validation service 4010 can comprise a program or a portion thereof, a computer, a server, or any other entity suitable for the purposes described herein. Although the validation service 4010 is illustrated herein as remote from the payer 4014, other possible embodiments of the invention not described in detail herein can incorporate the validation service 4010 or an additional instance enabling the functionality of the validation service 4010 into any party that utilizes the inventive method and that is in communication with other parties utilizing the inventive method, such as the payee 4012, payer 4014, payee's bank 4030, Federal Reserve 4032, or payer's bank 4034. For example, in an alternative embodiment in which the payor 4014 has local access to an instance of the validation service 4010, the check information is used to locally compute the hash value 4024, and the hash value 4024, either alone or together with the check information, is sent or provided to the remote validation service 4010. The hash value 4024 can be used as a security control to send a request 4020 for validation of the check 4016 by the validation service 4010, which stores information pertaining to the check 4016. This hash value 4024 is included on the check 4016, such as by the payer 4014 writing the hash value 4024 in the memo portion of the check 4016. The information on the check 4016 can also include contact information 4026 for the validation service 4010.

The hash value 4024 is generated by a cryptographic hash function, which can be included on a server or computer that is associated with or accessible to the validation service 4010 and/or the party computing the hash value 4024. A cryptographic hash function is a deterministic procedure that takes data/information associated with the check 4016 returns the hash value 4024 in the form of a fixed-size bit string. Typically, the cryptographic hash function takes a string of any length as input and produces a fixed-length hash value 4024.

The ideal hash function has four main properties: it is easy to compute the hash for any given data, it is extremely difficult to construct a text that has a given hash, it is extremely difficult to modify a given text without changing its hash, and it is extremely unlikely that two different messages will have the same hash. These requirements call for the use of advanced cryptography techniques, hence the name. Any accidental or intentional change to the data/information will almost certainly change the hash value 4024. Cryptographic hash functions and hash values 4024 have many applications, such as message integrity checks, digital signatures, authentication, and various information security applications. Hash values 4024 can also be used as fingerprints for detecting duplicate data files, file version changes, and similar applications, or as checksums to guard against accidental data corruption.

The validation service 4010 can perform a number of additional cryptographic operations, such as generating a trusted timestamp by any appropriate method, such as those disclosed in U.S. Pat. Nos. 7,047,415, 7,017,046, and 6,381,696, which are incorporated by reference herein in their entirety. For example, the timestamp can be generated using American National Standard X9.95-2005. Other exemplary methods include digital signature, linked token, linked token and digitally signed, and transient key, and other cryptographic techniques which would be apparent to one skilled in the art. The validation service 4010 can also digitally sign according to the PKI Certificate Authority Method.

Alternatively, it is not a requirement that cryptography be employed to create the identifier according to the invention. For example, any information items can simply be self-reflecting and self-reference to the information that is original to the at least one of a document and a transaction and a data item. It is preferable that the identifier, in any form, be a meaningful representation of at least one information item on the at least one of a document and a transaction and a data item. The meaningful nature of the identifier would preferably be meaningful to a human reader or a machine-reader of the identifier.

After the transfer 4018 of the check 4016 from the payer 4014 to the payee 4012 as shown in FIG. 40, the payee 4012 can send a request 4020 for validation of the check 4016 to the validation service 4010. At least some of the information on the check 4016 is used to generate the request 4020. The information on the check 4016 can include the hash value 4024. This information can be sent to the validation service 4010 as a data set. Validation of the check 4016 can be accomplished in any suitable manner. Additional hash value 4024 reference information, such as a source identifier, a token identifier, or other such information which associates the hash value 4024 with the particular validation service 4010, can be used to validate the check 4016.

For example, the hash value 4024 can be sent to the validation service 4010, and the validation service 4010 can perform a validation process on the hash value 4024 by comparing the hash value 4024 to a hash value 4024 stored in memory or otherwise obtained by the validation service 4010. Alternatively, the check information can be sent to the validation service 4010 and then the validation service 4010 can validate the check 4016 based on the received check information. For example, the validation service 4010 can use the cryptographic hash function to attempt to generate the same hash value 4024 by inputting the information items on the check 4016 into the cryptographic has function. The validation service 4010 can then compare the received hash value 4024 and the newly generated hash value 4024, and if the hash values 4024 match, then the validation service 4010 can establish that the integrity of the check 4016 has not been compromised.

Validation of the check 4016 can also be accomplished by sending a request 4020 based on the bank routing number and account number to see if the numbers correspond to a user account. If a corresponding user account is located, then the payee 4012 can query for the check number to validate if a hash value 4024 had been generated for the specific check 4016. Then the payee 4012 can send a request 4020 for a copy of the hash value 4024 so that a local computation and comparison can be performed using a local instance of the validation service 4010. This last method is especially useful in an instance where the payer 4014 neglects to add the hash value 4024 to the check 4016, or if someone nefariously attempts to remove the hash value 4024 from the check 4016 to interfere with validation.

Once the validation service 4010 has performed the validation, a validity response 4022 is returned. The validity response 4022 can be employed by the payee 4012 to determine if the check is valid and legitimate and that the integrity of the information on the check 4016 has not been compromised. If the validation fails, the payee 4012 can then determine whether to refuse the check or take additional measures as a corrective action, such as by returning the check 4016 to the payor 4014.

As illustrated in FIGS. 42-45, the validation service 4010 is also accessible to any other entities that may be involved in the processing of the payment, such as the payee's bank 4030, the Federal Reserve 4032, and the payer's bank 4034. This ability for all involved entities to access the validation system 4010 at every step of the process prevents any criminal behavior. Regardless of which method of validation is used, any change to the check 4016 is easily detected because the check 4016 is validated at every step during payment processing.

Figure 42:
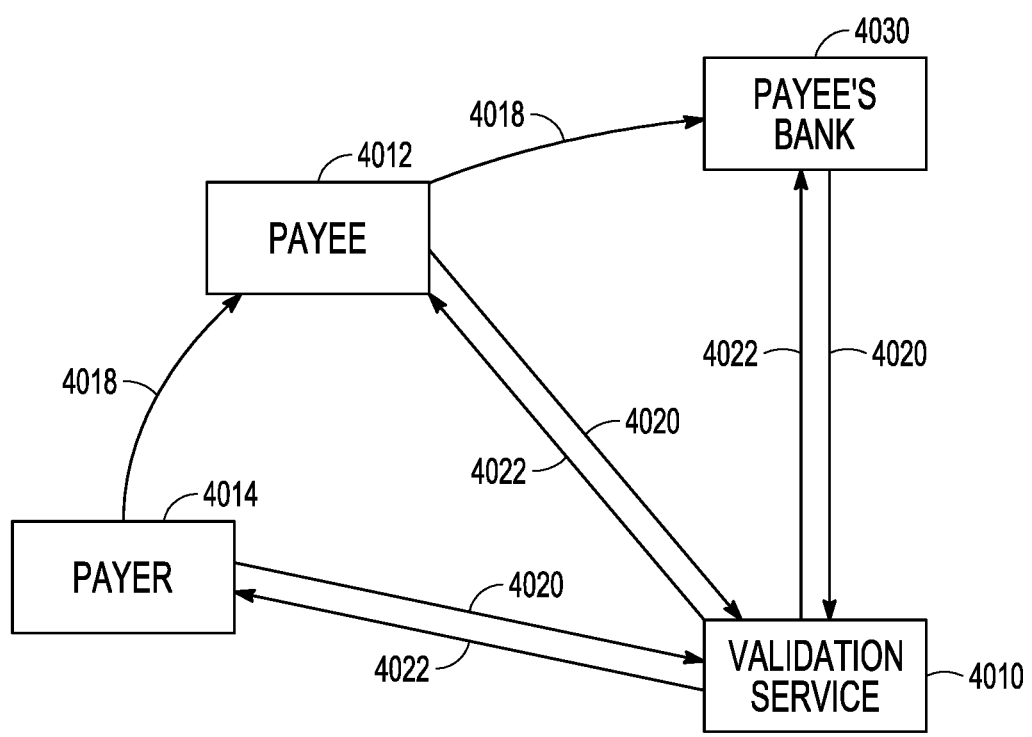
FIG. 42 depicts a schematic view of the check validation service and method according to the invention being used to validate the check of FIG. 41 as it is transferred from the payee to a payee's bank.

After the transfer 4018 of the check 4016 from the payer 4014 to the payee 4012 illustrated in FIG. 40, the payee 4012 can present the check 4016 to the payee's bank 4030 for deposit. The payee's bank 4030 can then access the validation service 4010 and validate the check 4016 prior to accepting a transfer 4018 of the check 4016 from the payee 4012, which is illustrated in FIG. 42.

Figure 43:
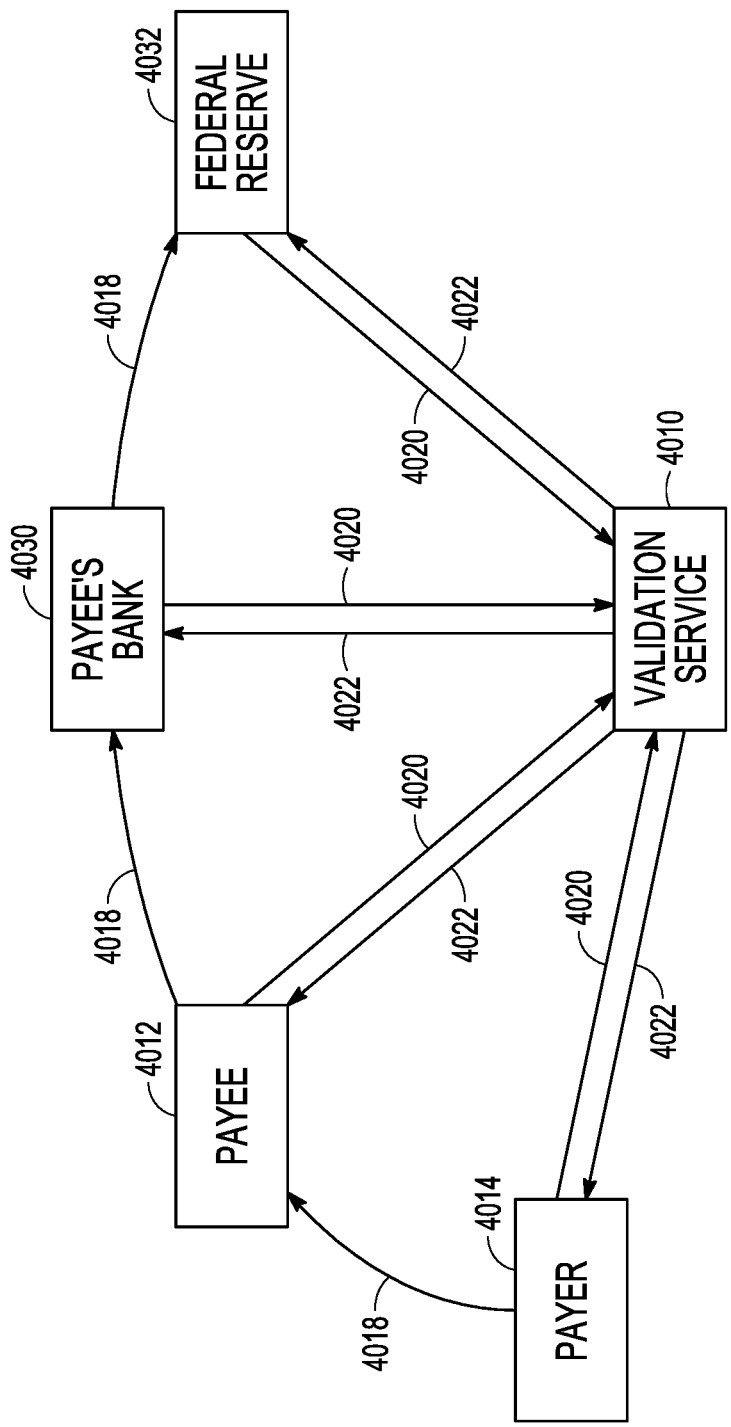
FIG. 43 depicts a schematic view of the check validation service and method according to the invention and being used to validate the check of FIG. 41 as it is transferred from the payee's bank to the Federal Reserve.

Looking now to FIG. 43, the payee's bank 4030 can the present the check 4016 to the Federal Reserve 4032 for clearing and settlement. The Federal Reserve 4032 can then access the validation service 4010 and validate the check 4016 prior to accepting a transfer 4018 of the check 4016 from the payee's bank 4030.

Figure 44:
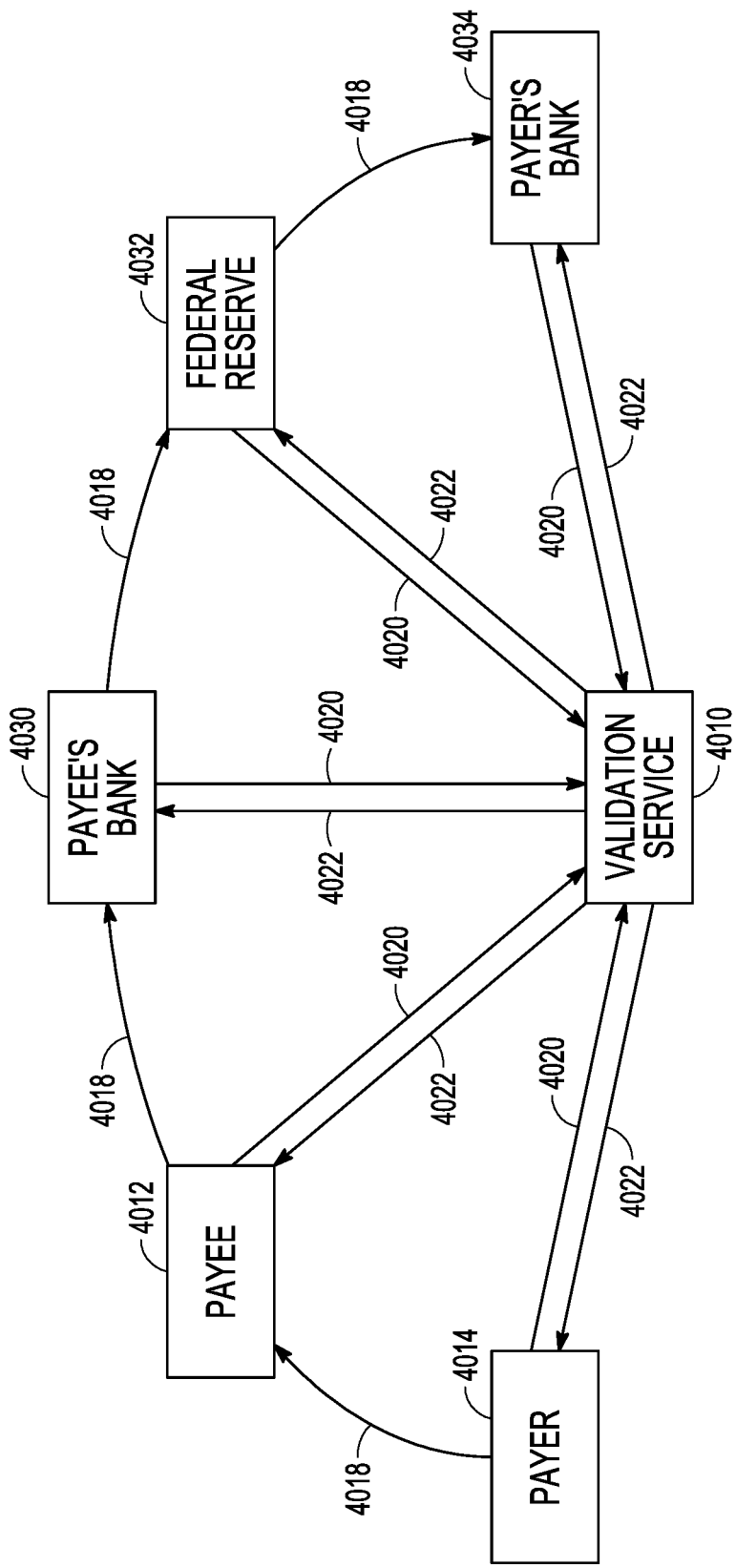
FIG. 44 depicts a schematic view of the check validation service and method according to the invention being used to validate the check of FIG. 41 as it is transferred from the Federal Reserve to a payer's bank.

Next, as shown in FIG. 44, the Federal Reserve 4032 can present the check 4016 to the payer's bank 4034 for clearing and settlement. The payer's bank 4034 can then access the validation service 4010 and validate the check 4016 prior to accepting a transfer 4018 of the check 4016 from the Federal Reserve 4032.

Figure 45:
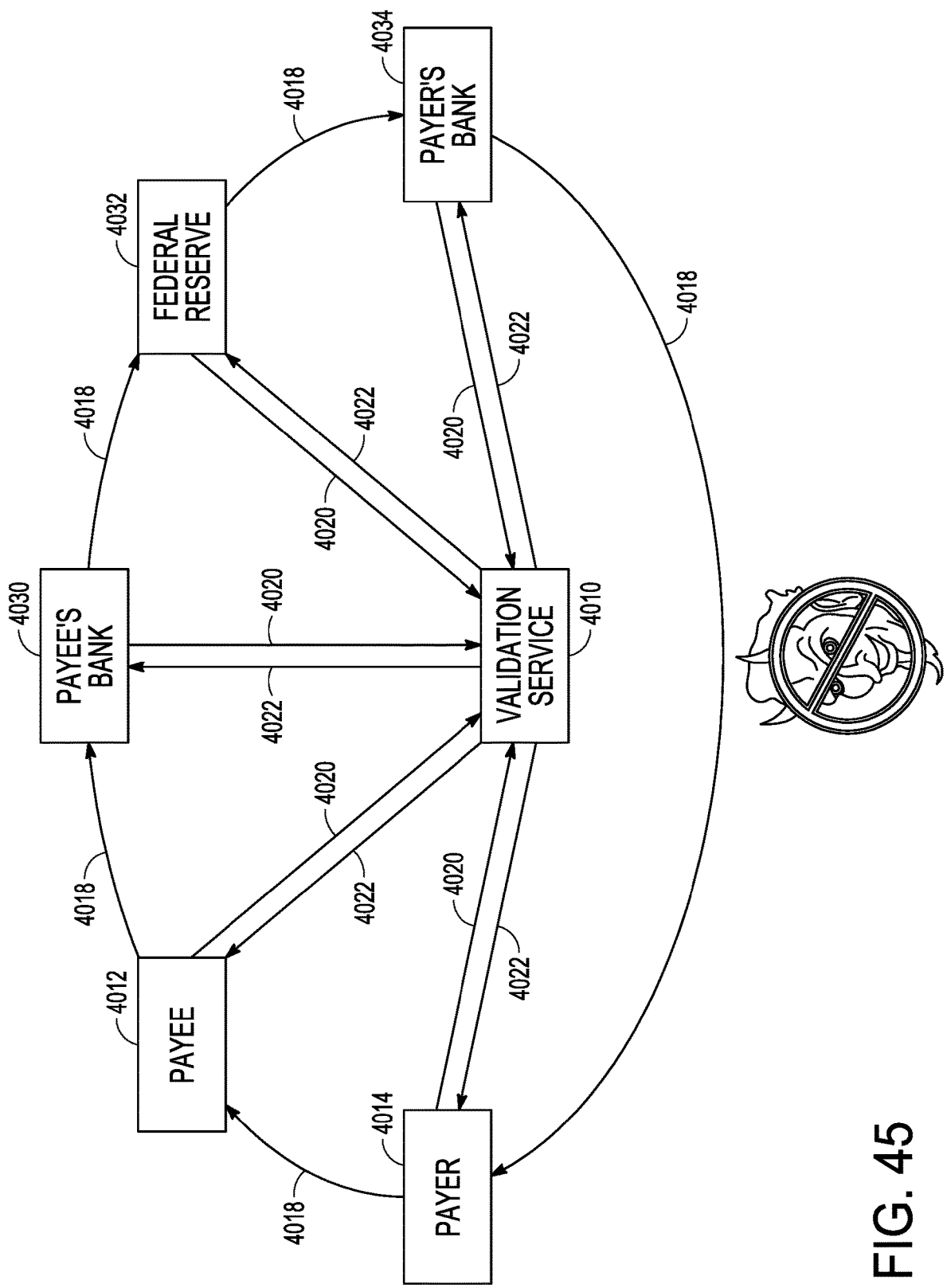
FIG. 45 depicts a schematic view of the check validation service and method according to the invention being used to validate the check of FIG. 41 as it is transferred from the payee's bank back to the payee.

Finally, as shown in FIG. 45, the payer's bank 4034 can notify the payer 4014 of the payment, and the payer 4014 can compare the payment to its own records or validate the payment against its account with the validation service 4010.

The validation service 4010 and method according to the invention serves to block nefarious entities from injecting false and fraudulent checks into the payment processing system at each and every step. For example, if an employee at the payee's bank 4030 alters the check 4016 so as to make the check payable to a different entity than the payee 4012, the Federal Reserve 4032 will detect this change upon attempting to validate the check 4016. This helps to increase the efficiency with which checks can be processed.

As can be seen, a benefit of the invention described herein is that the particular hash value 4024 applied to a financial transaction, such as the check 4016, can associate a trusted timestamp and cryptographic code with the information applied to the financial transaction. Alteration of either the hash value 4024 or any of the information associated with the financial transaction (e.g. payor, payee, amount, and the like) will cause the validation step to fail. A nefarious transaction forger will be foiled in any attempt to divert the funds from the financial transaction, change the amount of the financial transaction, or to change the properties of the financial transaction, because any change to the information contained in the original financial transaction will cause the validation to fail and the transaction to be refused. An important feature of this invention is that the payor, payee, various banking institutions involved in the financial transaction, and the Federal Reserve are protected from clearing a bad or altered financial transaction before the transaction is processed by each individual entity, as opposed to current transaction clearance procedures that often leave any forgery or other alteration of information associated with the financial transaction undiscovered for some time, which prevents corrective action from being taken in a timely manner. This invention provides for the security of the financial transaction at each step of processing by requiring that the validation process is completed before the financial transaction is cleared and passed along for subsequent processing.

Although use of the validation service is discussed with respect to payment by check, the validation service can be used to validate any financial transaction or event, such as credit card transactions, ACH transactions, and electronic funds transfers. In addition, the validation service can be used to validate documents. For example, the validation service can be used to validate drivers' licenses, passports, birth certificates, or other such documents related to an individual's identity, emails, memos, and other business records, and medical records or prescriptions. The use of this validation service for documents, transactions, and sets of data beyond a check-related financial transaction would be apparent to one skilled in the art, and the particular check-related example provided herein shall not be construed to limit the scope of this invention.

Use of the validation service 4010 can create meaningful information helpful in preventing counterfeits or authenticating genuine information. For example, the identifier and information items sent to and from the validation service 4010 can identify not only the identity or asserted identity of a party, it can also include information relating to products (such as in a prescription), or geography, such as a check location. Therefore, fraud tracking and validation of information can be quickly tracked and accumulated to determine whether fraudulent, illegal or out-of-the-ordinary behavior is occurring in real-time, and often prior to an irrevocable event relating to a transaction, document or set of data (such as the cashing of a check or the dispensation of a prescription). Examples of such unexpected or fraudulent activity could be multiple checks for the same check number and account being attempted to be cashed at multiple locations, or prescriptions from a doctor spiking in frequency and drug type in a particular location (especially if remote from the doctor's office), or a passport or driver's license, e.g., being presented to an official at multiple contemporaneous locations (such as in an airport at multiple disparate locations). These and other beneficial fraud, illegal or behavioral-tracking data can all be accumulated as a result of the benefits afforded by the validation service 4010. It should be noted that the converse to this accumulated data benefit is also valuable, such as if a credential, identity or otherwise, is being presented for the first time (such as if a driver's license being presented for the first time anywhere) an alert could be raised as well.

To the extent not already described, the different features and structures of the various embodiments may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly disclosed.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A method of electronically transmitting a check-type payment between a payor and a payee using a validation service comprising the steps of:
    electronically receiving, by the validation server, a check-type payment request from the payor, wherein the check-type payment request comprises payment information comprising at least a payee identifier, an amount for the check-type payment, and a bank account identifier representative of one of the at least one bank account identity supplied by the payor;
    generating, using one or more processors of the validation service, a unique identifier associated with the check-type payment request, wherein the unique identifier corresponds to the payment information;
    electronically transmitting, by the validation service to the payor, the unique identifier for transfer to the payee with the check-type payment request;
    electronically receiving, by the validation service from the payee, a deposit request to a deposit account instructed by the payee for the check-type payment, wherein the deposit request includes associated with the unique identifier corresponding to the payment information;
    validating, using the one or more processors of the validation service, the unique identifier received from the payee;
    in response to validating the unique identifier, electronically transmitting, by the validation service to the payee, a payment notice, the payment notice indicative of a payment to be made to the payee in response to the check-type payment request;
    generating, using the one or more processors of the validation service, electronic data representing a depositable item responsive to the deposit request by associating the payment information and the supplied bank account identity associated with the payment information; and
    electronically transmitting, by the validation service, the electronic data representing the depositable item, wherein the electronic data representing the depositable item is converted into the depositable item for depositing into the deposit account.

2. The method of claim 1 and further comprising the step of withholding information representative of the payor's at least one bank account identity from the payee.

3. The method of claim 1 and further comprising the step of checking whether the payee is registered with the validation service and, if not, registering the payee with the validation service and receiving at least one bank account identity to the validation service.

4. The method of claim 1 wherein the step of receiving the deposit request further includes the step of providing a list of check-type payments received by the validation service from a plurality of payees and providing an interface for selecting at least one check-type payment for deposit.

5. The method of claim 1 and further comprising the step of adding a secret to the depositable item after the step of transmission of the payment notice to the payee.

6. The method of claim 5 wherein the secret is added by the payee at the time of generating the deposit request.

7. The method of claim 5 wherein the secret is added by the validation service after the deposit request is received from the payee.

8. The method of claim 7 wherein the secret is accessible by the payor after the check-type payment has cleared the specified payor bank account.

9. The method of claim 8 and further comprising the step of validating the identity of the payor by asking the payor for the secret associated with the payment information.

10. The method of claim 8 and further comprising the step of verifying that the payor has authority over the specified payor bank account by asking the payor for the secret associated with the payment information.

11. The method of claim 1 wherein the check-type transaction comprises one of a check or an electronic check.

12. The method of claim 1 wherein the step of depositing the depositable item into the deposit account by the validation service further comprises one of the steps of (1) printing the depositable item on paper and presenting the printed depositable item to the banking institution associated with the deposit account; or (2) generating an electronic representation of the depositable item and transmitting the depositable item to the banking institution associated with the deposit account via remote deposit capture.

13. The method of claim 1 and further comprising the step of receiving remittance information from the payor and associating the remittance information with the payment notice transmitted to the payee.

14. The method of claim 13 and further comprising the step of mapping fields contained in the remittance information provided by the payor to fields acceptable to the payee using an interface provided by the validation service.

15. The method of claim 1 wherein the validation service prohibits printing of the depositable item once an electronic deposit request is received from the payee.

16. The method of claim 1 wherein the unique identifier comprises at least one of a hash value and a cryptographic digest.

* * * * *